United States Patent
Edge et al.

(10) Patent No.: US 12,150,085 B2
(45) Date of Patent: *Nov. 19, 2024

(54) METHODS AND APPARATUS FOR LOW LATENCY LOCATION VIA SCHEDULING IN ADVANCE

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,605

(22) Filed: Mar. 2, 2023

(65) Prior Publication Data

US 2023/0209498 A1    Jun. 29, 2023

Related U.S. Application Data

(63) Continuation of application No. 17/389,178, filed on Jul. 29, 2021.

(Continued)

(51) Int. Cl.
*H04W 64/00* (2009.01)
*H04W 4/02* (2018.01)
(Continued)

(52) U.S. Cl.
CPC ......... *H04W 64/003* (2013.01); *H04W 4/025* (2013.01); *H04W 24/02* (2013.01); *H04W 28/0268* (2013.01); *H04W 72/12* (2013.01)

(58) Field of Classification Search
CPC ... H04W 64/003; H04W 4/025; H04W 24/02; H04W 28/0268; H04W 72/12;

(Continued)

(56) References Cited

U.S. PATENT DOCUMENTS 9,119,036 B2 * 8/2015 Kazmi ..................... G01S 5/10
11,483,113 B2 10/2022 Cha et al.
(Continued)

FOREIGN PATENT DOCUMENTS

CN    111132307 A * 5/2020 ............. G01S 5/04
DE       4175375   * 3/2023 ............ H04W 64/00
(Continued)

OTHER PUBLICATIONS

Positioning for the internet of things: A 3GPP Perspective, Xingqin Lin et al., IEEE Communications Magazine, Dec. 2017. (Year: 2017).*

(Continued)

*Primary Examiner* — Yuwen Pan
*Assistant Examiner* — Swati Jain
(74) *Attorney, Agent, or Firm* — QUALCOMM Incorporated

(57) ABSTRACT

Latency in location of a user equipment (UE) is reduced by requesting and scheduling the location of the UE in advance of the time of when it is needed. A positioning request from an external client or the UE may indicate the time that the location is to be determined or measured. A location management function (LMF) may manage and coordinate location measurements for the UE prior to the location determination time. The LMF may schedule downlink and/or uplink measurements to be performed at the desired time. Either the LMF or a location server associated with a serving base station for the UE may be assigned to receive positioning measurements and obtain the location of the UE. The location server or LMF may send the location to the UE or the external client. User plane transport may be used to further reduce latency.

22 Claims, 15 Drawing Sheets

Related U.S. Application Data

(60) Provisional application No. 63/104,501, filed on Oct. 22, 2020, provisional application No. 63/060,325, filed on Aug. 3, 2020.

(51) Int. Cl.
  *H04W 24/02* (2009.01)
  *H04W 28/02* (2009.01)
  *H04W 72/12* (2023.01)

(58) Field of Classification Search
  CPC ....... H04W 4/02; H04W 64/00; H04W 4/029; H04W 24/08; H04W 88/14; G01S 5/0009; H04L 5/0048
  See application file for complete search history.

(56) References Cited

U.S. PATENT DOCUMENTS

| | | | |
|---|---|---|---|
| 11,792,766 B2* | 10/2023 | Ren | H04L 5/0048 455/456.1 |
| 2004/0157621 A1* | 8/2004 | Yamasaki | H04W 64/00 455/67.11 |
| 2004/0185870 A1* | 9/2004 | Matsuda | H04W 64/00 455/433 |
| 2007/0121545 A1* | 5/2007 | Park | G01S 5/018 370/329 |
| 2010/0075610 A1* | 3/2010 | Dennard | H04L 67/306 455/67.11 |
| 2012/0295623 A1* | 11/2012 | Siomina | G01S 5/0263 455/456.2 |
| 2018/0098279 A1* | 4/2018 | Edge | H04W 4/70 |
| 2018/0279347 A1* | 9/2018 | Wang | H04W 72/0446 |
| 2019/0116486 A1* | 4/2019 | Kim | H04W 8/10 |
| 2019/0313406 A1* | 10/2019 | Liu | H04L 5/0092 |
| 2020/0196101 A1 | 6/2020 | Edge | |
| 2021/0084608 A1* | 3/2021 | Cui | H04W 24/10 |
| 2021/0092761 A1* | 3/2021 | Holfeld | H04W 72/04 |
| 2021/0160810 A1* | 5/2021 | Zhang | G01S 5/10 |
| 2021/0266859 A1* | 8/2021 | Yu | H04B 17/27 |
| 2021/0297149 A1* | 9/2021 | Hsieh | H04W 56/005 |
| 2021/0385625 A1* | 12/2021 | Qiao | H04W 64/00 |
| 2022/0015058 A1* | 1/2022 | Li | G01S 5/0236 |
| 2022/0026517 A1* | 1/2022 | Hasegawa | G01S 7/003 |
| 2022/0039053 A1 | 2/2022 | Edge | |
| 2022/0086698 A1* | 3/2022 | Yao | H04L 43/20 |
| 2022/0110085 A1* | 4/2022 | Khoryaev | H04L 5/0051 |
| 2022/0131676 A1* | 4/2022 | Zhang | H04L 5/005 |
| 2022/0146620 A1* | 5/2022 | Alawieh | H04L 5/0051 |
| 2022/0167302 A1* | 5/2022 | Ni | H04W 4/029 |
| 2022/0191764 A1* | 6/2022 | Ni | H04W 36/12 |
| 2022/0264257 A1* | 8/2022 | Hofmann | G01S 5/0249 |
| 2022/0286999 A1* | 9/2022 | Yu | G01S 5/0036 |
| 2022/0349978 A1* | 11/2022 | Baek | H04W 4/02 |
| 2022/0357418 A1* | 11/2022 | Wang | H04W 24/10 |
| 2022/0369095 A1* | 11/2022 | Sotomayor | H04W 8/18 |
| 2022/0369417 A1* | 11/2022 | Park | H04W 28/0268 |
| 2022/0386093 A1* | 12/2022 | Baek | G01S 5/0205 |
| 2023/0038582 A1* | 2/2023 | Lin | H04B 7/18519 |
| 2023/0148189 A1* | 5/2023 | Lee | H04W 24/02 455/456.1 |
| 2024/0172170 A1 | 5/2024 | Manolakos et al. | |

FOREIGN PATENT DOCUMENTS

| | | | |
|---|---|---|---|
| EP | 4057718 A1 * | 9/2022 | G01S 5/0036 |
| EP | 4114101 A1 * | 1/2023 | H04W 4/023 |
| EP | 4167656 A1 * | 4/2023 | |
| WO | WO-2019191318 A1 * | 10/2019 | G01S 5/0036 |
| WO | WO-2020153892 A1 * | 7/2020 | G01S 5/021 |
| WO | WO-2021254887 A1 * | 12/2021 | G01S 5/0036 |
| WO | WO-2022015019 A1 * | 1/2022 | |
| WO | WO-2022031889 A1 * | 2/2022 | |

OTHER PUBLICATIONS

R. Keating, M. Säily, J. Hulkkonen and J. Karjalainen, "Overview of Positioning in 5G New Radio," 2019 16th International Symposium on Wireless Communication Systems (ISWCS), Oulu, Finland, 2019, pp. 320-324. (Year: 2019).*

International Search Report and Written Opinion—PCT/US2021/043972—ISA/EPO—Oct. 29, 2021.

Lin X., et al., "Positioning for the Internet of Things: A 3GPP Perspective", IEEE Communications Magazine, IEEE Service Center, Piscataway, US, vol. 55 (12), Dec. 1, 2017, pp. 179-185, XP011674414, ISSN: 0163-6804, 8 Pages, DOI: 10.1109/MCOM.2017.1700269, [Retrieved on Dec. 13, 2017] the whole document.

Qualcomm Incorporated: "Positioning Latency Reduction", 3GPP TSG-RAN WG2 Meeting #113-e, R2-2101469, 3rd Generation Partnership Project, Mobile Competence Centre, 650, Route Des Lucioles, F-06921 Sophia-Antipolis Cedex, France, vol. Ran WG2, No. Electronic, Jan. 25, 2021-Feb. 5, 2021 Jan. 15, 2021, XP051974350, pp. 1-10.

* cited by examiner

METHODS AND APPARATUS FOR LOW LATENCY LOCATION VIA SCHEDULING IN ADVANCE

RELATED APPLICATIONS

This application is a continuation of U.S. application Ser. No. 17/389,178, filed Jul. 29, 2021, entitled "METHODS AND APPARATUS FOR LOW LATENCY LOCATION VIA SCHEDULING IN ADVANCE", claims the benefit of U.S. Provisional Application No. 63/060,325, filed Aug. 3, 2020, entitled "METHODS AND APPARATUS FOR LOW LATENCY LOCATION VIA SCHEDULING IN ADVANCE", and claims the benefit of U.S. Provisional Application No. 63/104,501, filed Oct. 22, 2020, entitled "METHODS AND APPARATUS FOR LOW LATENCY LOCATION VIA SCHEDULING IN ADVANCE", all of which are assigned to the assignee hereof and incorporated herein by reference in their entirety.

BACKGROUND

Field

Subject matter disclosed herein relates to location determination for a mobile device and more particularly to supporting a location session for a mobile device with low latency.

Relevant Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor.

Obtaining the location of a mobile device that is accessing a wireless (e.g. 5G) network may be useful for many applications including, for example, emergency calls, personal navigation, asset tracking, locating a friend or family member, etc. Locating a mobile device is also becoming increasingly important in fully autonomous scenarios such as a warehouse, automated factory and for drones and self driving vehicles. In many applications (e.g. for the autonomous scenarios) it is desirable or even critical to reduce or limit latency. There are many components in a positioning process that can contribute to latency. It may thus be desirable to reduce as many components that contribute to latency as possible in order to provide a time position fix for a mobile device that meets applicable latency requirements.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Latency in location of a UE is reduced by requesting and scheduling the location of the UE in advance of the time of when it is needed. A positioning request from an external client or the UE may indicate the time that the location is to be determined or measured. A location management function (LMF) may manage and coordinate location measurements for the UE prior to the time at which the location for the UE to be determined. The LMF may schedule downlink and/or uplink measurements to be performed at the desired time. Either the LMF or a location server associated with a serving base station for the UE, may be assigned to receive positioning measurements and to obtain the location of the UE. The location server or LMF associated with the base station may send the location to the UE or the external client. User plane transport may be used to further reduce latency.

In one implementation, a method performed by a Location Management Function (LMF) for supporting a location session for a user equipment (UE) includes receiving a positioning message for the UE from a first entity, the positioning message indicating a time at which a location for the UE is to be measured; and sending request messages to a plurality of entities, the request messages scheduling location measurements for the UE by each of the plurality of entities at or near to the time, wherein the location measurements enable the location for the UE to be measured at the time based on at least one position method.

In one implementation, a Location Management Function (LMF) configured to support a location session for a user equipment (UE), includes an external interface configured to wirelessly communicate with a wireless network; at least one memory; and at least one processor coupled to the external interface and the at least one memory and configured to: receive, via the external interface, a positioning message for the UE from a first entity, the positioning message indicating a time at which a location for the UE is to be measured; and send, via the external interface, request messages to a plurality of entities, the request messages scheduling location measurements for the UE by each of the plurality of entities at or near to the time, wherein the location measurements enable the location for the UE to be measured at the time based on at least one position method.

In one implementation, a Location Management Function (LMF) configured for supporting a location session for a user equipment (UE), includes means for receiving a positioning message for the UE from a first entity, the positioning message indicating a time at which a location for the UE is to be measured; and means for sending request messages to a plurality of entities, the request messages scheduling location measurements for the UE by each of the plurality of entities at or near to the time, wherein the location measurements enable the location for the UE to be measured at the time based on at least one position method.

In one implementation, a non-transitory computer-readable storage medium including program code stored thereon, the program code is operable to configure at least one processor in a Location Management Function (LMF) for supporting a location session for a user equipment (UE), the program code comprising instructions to: receive a positioning message for the UE from a first entity, the positioning message indicating a time at which a location for the UE is to be measured; and send request messages to a plurality of entities, the request messages scheduling location measurements for the UE by each of the plurality of entities at or near to the time, wherein the location measurements enable the location for the UE to be measured at the time based on at least one position method.

In one implementation, a method performed by a location server in a radio access network (RAN) for supporting a location session for a user equipment (UE) includes receiving an assignment message from a Location Management Function (LMF), the assignment message comprising an assignment for the location server to enable a measurement of a location of the UE and indicating a time at which the location of the UE is to be measured; returning an acknowledgment to the LMF indicating the assignment is accepted; receiving location measurements for the UE from a plurality of entities, the location measurements scheduled in the plurality of entities by the LMF, the location measurements obtained by the plurality of entities at or near to the time; enabling the location for the UE to be determined by the location server or by the UE based on the location measurements and at least one position method; and sending a release message to the LMF releasing the assignment of the location server after the location of the UE has been determined.

In one implementation, a location server in a radio access network (RAN) configured to support a location session for a user equipment (UE) includes an external interface configured to wirelessly communicate with a wireless network; at least one memory; and at least one processor coupled to the external interface and the at least one memory and configured to: receive, via the external interface, an assignment message from a Location Management Function (LMF), the assignment message comprising an assignment for the location server to enable a measurement of a location of the UE and indicating a time at which the location of the UE is to be measured; return, via the external interface, an acknowledgment to the LMF indicating the assignment is accepted; receive, via the external interface, location measurements for the UE from a plurality of entities, the location measurements scheduled in the plurality of entities by the LMF, the location measurements obtained by the plurality of entities at or near to the time; enable the location for the UE to be determined by the location server or by the UE based on the location measurements and at least one position method; and send, via the external interface, a release message to the LMF releasing the assignment of the location server after the location of the UE has been determined.

In one implementation, a location server in a radio access network (RAN) configured for supporting a location session for a user equipment (UE), includes means for receiving an assignment message from a Location Management Function (LMF), the assignment message comprising an assignment for the location server to enable a measurement of a location of the UE and indicating a time at which the location of the UE is to be measured; means for returning an acknowledgment to the LMF indicating the assignment is accepted; means for receiving location measurements for the UE from a plurality of entities, the location measurements scheduled in the plurality of entities by the LMF, the location measurements obtained by the plurality of entities at or near to the time; means for enabling the location for the UE to be determined by the location server or by the UE based on the location measurements and at least one position method; and means for sending a release message to the LMF releasing the assignment of the location server after the location of the UE has been determined.

In one implementation, a non-transitory computer-readable storage medium including program code stored thereon, the program code is operable to configure at least one processor in a location server in a radio access network (RAN) for supporting a location session for a user equipment (UE), the program code comprising instructions to: receive an assignment message from a Location Management Function (LMF), the assignment message comprising an assignment for the location server to enable a measurement of a location of the UE and indicating a time at which the location of the UE is to be measured; return an acknowledgment to the LMF indicating the assignment is accepted; receive location measurements for the UE from a plurality of entities, the location measurements scheduled in the plurality of entities by the LMF, the location measurements obtained by the plurality of entities at or near to the time; enable the location for the UE to be determined by the location server or by the UE based on the location measurements and at least one position method; and send a release message to the LMF releasing the assignment of the location server after the location of the UE has been determined.

In one implementation, a method performed by a user equipment (UE) for supporting a location session for the UE includes receiving a location request message from a Location Management Function (LMF) in a wireless network, wherein the location request message requests location measurements by the UE at or near to a time; obtaining the location measurements at or near to the time, wherein the location measurements enable a location for the UE to be determined by the UE or by a location server based at least in part on the location measurements and at least one position method; and sending the location measurements or the location to the location server.

In one implementation, a user equipment (UE) configured to support a location session for the UE includes a wireless transceiver configured to wirelessly communicate with a wireless network; at least one memory; and at least one processor coupled to the wireless transceiver and the at least one memory and configured to: receive, via the wireless transceiver, a location request message from a Location Management Function (LMF) in the wireless network, wherein the location request message requests location measurements by the UE at or near to a time; obtain the location measurements at or near to the time, wherein the location measurements enable a location for the UE to be determined by the UE or by a location server based at least in part on the location measurements and at least one position method; and send, via the wireless transceiver, the location measurements or the location to the location server.

In one implementation, a user equipment (UE) configured for supporting a location session for the UE, includes means for receiving a location request message from a Location Management Function (LMF) in a wireless network, wherein the location request message requests location measurements by the UE at or near to a time; means for obtaining the location measurements at or near to the time, wherein the location measurements enable a location for the UE to be determined by the UE or by a location server based at least in part on the location measurements and at least one position method; and means for sending the location measurements or the location to the location server.

In one implementation, a non-transitory computer-readable storage medium including program code stored thereon, the program code is operable to configure at least one processor in a user equipment (UE) for supporting a location session for the UE, the program code comprising instructions to: receive a location request message from a Location Management Function (LMF) in a wireless network, wherein the location request message requests location measurements by the UE at or near to a time; obtain the location measurements at or near to the time, wherein the location measurements enable a location for the UE to be determined by the UE or by a location server based at least in part on the location measurements and at least one position method; and send the location measurements or the location to the location server.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
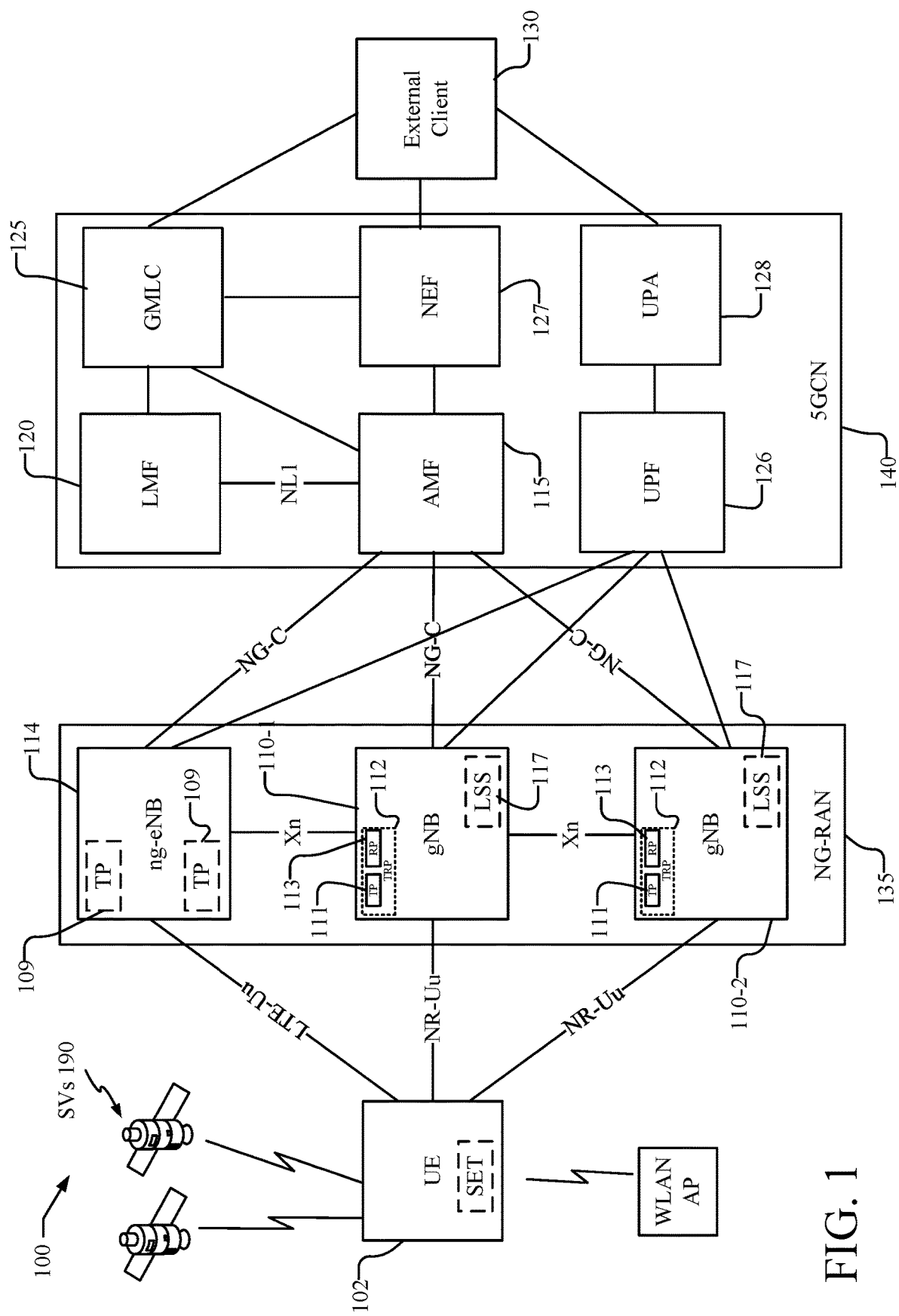
FIG. 1 illustrates a wireless communication system including a Next Generation (NG) Radio Access Network.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1 and 110-2 of a gNB are shown in FIG. 1. A reference to a gNB 110 may then refer to either of gNBs 110-1 and 110-2.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) enabled to communicate over a wireless communications network on behalf of a user, a service or some autonomous function. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using (mainly) existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE, NR, or WiFi.

Both CP and UP location solutions may employ a location server (LS) to support positioning. The LS may be part of or accessible from a serving network or a home network for a UE or may simply be accessible over the Internet or over a local Intranet. If positioning of a UE is needed, an LS may instigate a session (e.g. a location session or a SUPL session) with the UE and coordinate location measurements by the UE and determination of an estimated location of the UE. During a location session, an LS may request positioning capabilities of the UE (or the UE may provide them without a request), may provide assistance data to the UE (e.g. if requested by the UE or in the absence of a request) to assist the UE in obtaining location measurements and/or in calculating a location estimate, and may request a location estimate or location measurements from a UE. To obtain a location estimate, an LS (and a UE) may employ positioning using a Global Navigation Satellite System (GNSS), Assisted GNSS (A-GNSS), Time Difference of Arrival (TDOA), Angle of Departure (AOD), Angle of Arrival (AOA), Round Trip Time (RTT), multi-cell RTT (also referred to as multi-RTT), or a combination thereof or other position methods. Assistance data may be used by a UE to help acquire and measure GNSS signals and/or positioning reference signal (PRS) signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AOD, Multi-RTT, etc.).

In a UE assisted mode of operation, a UE may return location measurements to an LS which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AOD, Multi-RTT, etc.).

During a positioning session between a UE and a location server, there can be several sources of latency. Various sources of latency include, e.g., sending a location request to the location server, scheduling DL PRS and/UL sounding reference signal (SRS) transmissions, scheduling location measurements from the UE and/or from base stations, waiting for DL PRS or UL SRS transmission to be sent, obtaining measurements of DL PRS (in the UE) or UL SRS (in base stations), sending the measurements to the location server, calculating a location estimate, and sending the location estimate to a client, e.g., an external client or the UE. Delays in any of the foregoing may contribute to the overall latency of obtaining a location.

It is desirable in many applications, such as emergency calls, asset management, and for autonomous scenarios such as the Industrial Internet of Things (IIoT) to minimize the latency in position determination. In one implementation, as discussed herein, some of the latency components may be eliminated by requesting and scheduling location in advance of when it is needed. For example, a specific time T may be agreed upon in advance at which location measurements will be obtained. The latency then starts from the time T. In order to reduce implementation impacts of scheduling location at a specific time T in advance, a 5G Core Network (5GCN) Location Management Function (LMF) may be used to perform location coordination and management prior to the time T, based on location procedures and signaling previously defined. In some implementations, the latency may be further reduced by using a location server surrogate (LSS) (also referred to as a location server, location management component, local LMF, or location server function) in or attached to a serving base station (e.g., gNB). The LSS may be used to reduce any latency components that occur after time T. For example, an LMF in the 5GCN may be used for location related procedures associated with latency components that occur before time T, and an LSS may be used for any location related procedures associated with latency components that occur after time T.

FIG. 1 shows a positioning architecture diagram of a communication system 100 that may support a reduction in latency by requesting and scheduling location in advance of when it is needed as well as use of the support of location management functionality in an NG-RAN. The location management functionality in the NG-RAN is referred to here as a "Location Server Surrogate (LSS)" and is in one or more of the gNBs 110 in FIG. 1 or may be external to the gNBs 110 but within the NG-RAN 135.

The communication system 100 may be configured for supporting location of a user equipment (UE) 102. Here, the communication system 100 comprises a UE 102, and components of a Fifth Generation (5G) network comprising a Next Generation (NG) Radio Access Network (RAN) (NG-RAN) 135 and a 5G Core Network (5GCN) 140. A 5G network may also be referred to as a New Radio (NR) network; NG-RAN 135 may be referred to as a 5G RAN or as an NR RAN; and 5GCN 140 may be referred to as an NG Core network (NGC). The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted, as necessary. Specifically, although only one UE 102 is illustrated, it will be understood that many UEs (e.g., hundreds, thousands, millions, etc.) may utilize the communication system 100. Similarly, the communication system 100 may include a larger (or smaller) number of SVs 190, gNBs 110, next generation evolved Node Bs (ng-eNBs) 114, AMFs 115, external location services (LCS) clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology or for other communication technologies and protocols) may be used to configure, in response to receiving a request, an increased quantity of location-related information or resources associated with broadcast communication from wireless nodes (e.g. broadcast of assistance data), transmission of Positioning Reference Signals (PRSs) or some other location related function of the wireless nodes.

The UE 102 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 102 may correspond to a cellphone, smartphone, laptop, tablet, PDA, tracking device, navigation device, Internet of Things (IoT) device, or some other portable or moveable device. Typically, though not necessarily, the UE 102 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and 5GCN 140), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (via elements of 5GCN 140 not shown in FIG. 1, or possibly via a Gateway Mobile Location Center (GMLC) 125) and/or allow the external client 130 to receive location information regarding the UE 102 (e.g., via the GMLC 125).

The UE 102 may include a single entity or may include multiple entities such as in a personal area network where a user may employ audio, video and/or data I/O devices and/or body sensors and a separate wireline or wireless modem. An estimate of a location of the UE 102 may be referred to as a location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geographically or in civic form) within which the UE 102 is expected to be located with some probability or confidence level (e.g., 67%, 95%, etc.) A location of the UE 102 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 comprise NR NodeBs, also referred to as gNBs, 110-1 and 110-2 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 102 via wireless communication between the UE 102 and one or more of the gNBs 110, which may provide wireless communications access to the 5GCN 140 on behalf of the UE 102 using 5G NR. 5G NR radio access may also be referred to as NR radio access or as 5G radio access. In FIG. 1, the serving gNB for UE 102 is assumed to be gNB 110-1, although other gNBs (e.g. gNB 110-2) may act as a serving gNB if UE 102 moves to another location or may act as a secondary gNB to provide additional throughout and bandwidth to UE 102. A Location Server Surrogate (LSS) 117 within a node in the NG-RAN 135, such as in serving gNB 110-1, may perform a location server function, as discussed herein.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 102. Some gNBs 110 (e.g. gNB 110-2) and/or ng-eNB 114 in FIG. 1 may be configured to function as positioning-only beacons, which may transmit signals (e.g. PRS signals) and/or may broadcast assistance data to assist positioning of UE 102 but may not receive signals from UE 102 or from other UEs. It is noted that while only one ng-eNB 114 is shown in FIG. 1, some embodiments may include multiple ng-eNBs 114.

As noted, while FIG. 1 depicts nodes configured to communicate according to 5G NR and LTE communication protocols for an NG-RAN 135, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 102, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1.

The gNBs 110 and ng-eNB 114 can communicate with an Access and Mobility Management Function (AMF) 115, which, for positioning functionality may communicate with a Location Management Function (LMF) 120. The AMF 115 may support mobility of the UE 102, including cell change and handover and may participate in supporting a signaling connection to the UE 102 and possibly data and voice bearers for the UE 102. The LMF 120 may support scheduling for positioning of the UE 102 when UE accesses the NG-RAN 135 and may support position procedures/methods such as Assisted GNSS (A-GNSS), Uplink Time Difference of Arrival (UL-TDOA), Downlink Time Difference of Arrival (DL-TDOA), Real Time Kinematic (RTK), Precise Point Positioning (PPP), Differential GNSS (DGNSS), Enhanced Cell ID (ECID), angle of arrival (AOA), angle of departure (AOD), multi-cell RTT, and/or other positioning procedures. The LMF 120 may also process location service requests for the UE 102, e.g., received from the AMF 115 or from the GMLC 125. The LMF 120 may be connected to AMF 115 and/or to GMLC 125. In some embodiments, a node/system that implements the LMF 120 may additionally or alternatively implement other types of location-support modules, such as an Enhanced Serving Mobile Location Center (E-SMLC). It is noted that in some embodiments, at least part of the positioning functionality (including derivation of a UE 102's location) may be performed at the UE 102 (e.g., using signal measurements obtained by UE 102 for signals transmitted by wireless nodes such as gNBs 110 and ng-eNB 114, and assistance data provided to the UE 102, e.g. by LMF 120).

The Gateway Mobile Location Center (GMLC) 125 may support a location request for the UE 102 received from an external client 130 and may forward such a location request to the AMF 115 for forwarding by the AMF 115 to the LMF 120 or may forward the location request directly to the LMF 120. A location response from the LMF 120 or an LSS 117 (e.g. containing a location estimate for the UE 102) may be returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1, though only one of these connections may be supported by 5GC 140 in some implementations.

To support services including location services from external clients 130 for Internet of Things (IoT) UEs, a Network Exposure Function (NEF) 127 may be included in 5GCN 140. The NEF 127 may support secure exposure of capabilities and events concerning 5GCN 140 and UE 102 to an external client 130 and may enable secure provision of information from external client 130 to 5GCN 140. In the context of location services, NEF 127 may function to obtain a current or last known location for a UE 102, may obtain an indication of a change in location for a UE 102, or an indication of when a UE 102 becomes available (or reachable). The NEF 127 may be connected to the GMLC 125 to support last known location, current location and/or deferred periodic and triggered location for the UE 102. If desired, the NEF 127 may include, or may be combined with, the GMLC 125 and may then obtain location information for UE 102 directly from LSS 117 or LMF 120 (e.g. may be connected to the LSS 117 or the LMF 120). NEF 127 may also be connected to AMF 115 to enable NEF 127 to obtain a location for UE 102 from the AMF 115.

The User Plane Function (UPF) 126 may support voice and data bearers for UE 102 and may enable UE 102 voice and data access to other networks such as the Internet. UPF 126 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. A location report for UE 102, e.g., including a location estimate determined by the LSS 117 in or attached to the serving gNB 110-1, may be returned by gNB 110-1 to the external client 130 via the UPF 126 and a User Plane Aggregator (UPA) 128 if present.

The UPA 128 is optional and enables an external client 130 to receive location reports for a UE 102 by interacting only with the UPA 128. When a UPA 128 is not present and when an LSS 117 transfers a location for UE 102 to an external client 130 via user plane signaling, the external client 130 could need to directly interact with the gNB 110-1 for the UE 102, which may be less efficient (e.g. when the gNB 110-1 for a UE 102 is changed) and/or may be a security risk for gNBs and/or the external client 130. The UPA 128 avoids the need for a gNB 110-1 (or LSS 117) to establish location reporting sessions to multiple external clients and for external clients to establish location reporting sessions to multiple gNBs 110. The UPA 128 may also provide security for the NG-RAN 135 and/or the external client 130 by authenticating and authorizing the external client 130 and/or gNB 110-1 (or LSS 117). The UPA 128 may be part of the 5GCN 150 or may be external to the 5GCN 150 (e.g. may be associated with the external client 130). In some implementations, the UPA 128 may be part of the LMF 120, GMLC 125 or NEF 127, or may be connected to the LMF 120, GMLC 125 or NEF 127. A UPA 128 may also be referred to as a router, an IP router, a UP router or as a routing function.

The LMF 120 may communicate with the gNBs 110 and/or with the ng-eNB 114 using a New Radio Position Protocol A (which may be referred to as NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between a gNB 110 and the LMF 120, and/or between an ng-eNB 114 and the LMF 120, via the AMF 115. LMF 120 and UE 102 may communicate using an LTE Positioning Protocol (LPP), which may be defined in 3GPP TS 37.355. Here, LPP messages may be transferred between the UE 102 and the LMF 120 via the AMF 115 and a serving gNB 110-1 or serving ng-eNB 114 for UE 102. For example, LPP messages may be transferred between the LMF 120 and the AMF 115 using a service based protocol based on the Hypertext Transfer Protocol (HTTP) and may be transferred between the AMF 115 and the UE 102 using a 5G Non-Access Stratum (NAS) protocol. The LPP protocol may be used to support positioning of UE 102 using UE assisted and/or UE based position methods such as A-GNSS, RTK, DL-TDOA, AOD, multi-RTT and/or ECID. The NRPPa protocol may be used to support positioning of UE 102 using network based position methods such as ECID or UL-TDOA (e.g. when used with measurements obtained by a gNB 110 or ng-eNB 114) or position methods which use UL and DL location measurements such as multi-RTT, and/or may be used by LMF 120 to obtain location related information from gNBs 110 and/or ng-eNB 114, such as parameters defining PRS transmission from gNBs 110 and/or ng-eNB 114.

With a UE assisted position method, UE 102 may obtain location measurements and send the measurements to a location server (e.g. LMF 120, or an LSS 117 within a node in the NG-RAN 135, such as in serving gNB 110-1) for computation of a location estimate for UE 102. For example, the location measurements may include one or more of a Received Signal Strength Indication (RSSI), Round Trip signal propagation Time (RTT), Reference Signal Time Difference (RSTD), Reference Signal Received Power (RSRP), Reference Signal Received Quality (RSRQ), AOA, and/or AOD for gNBs 110, ng-eNB 114 and/or a WLAN access point (AP). The location measurements may also or instead include measurements of GNSS pseudorange, code phase and/or carrier phase for SVs 190. With a UE based position method, UE 102 may obtain location measurements (e.g. which may be the same as or similar to location measurements for a UE assisted position method) and may compute a location of UE 102 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ, AOA or Time Of Arrival (TOA)) for signals transmitted by UE 102, and/or may receive measurements obtained by UE 102, and may send the measurements to a location server (e.g. LMF 120, or an LSS 117 within a node in the NG-RAN 135, such as in serving gNB 110-1) for computation of a location estimate for UE 102.

Information provided by the gNBs 110 and/or ng-eNB 114 to the location server, e.g., LMF 120 using NRPPa or to an LSS 117 within a node in the NG-RAN 135, such as in serving gNB 110-1 using an Xn Application Protocol (XnAP), may include timing and configuration information for PRS transmission and location coordinates. The location server may then provide some or all of this information to the UE 102 as assistance data in an LPP message via the NG-RAN 135 and the 5GC 140.

An LPP message sent from a location server to a UE 102 may instruct the UE 102 to do any of a variety of things, depending on desired functionality. For example, the LPP message could contain an instruction for the UE 102 to obtain measurements for GNSS (or A-GNSS), WLAN, and/or DL-TDOA (or some other position method). In the case of DL-TDOA, the LPP message may instruct the UE 102 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 102 of a signal (e.g. a PRS signal) transmitted or broadcast by one gNB 110 and a similar signal transmitted by another gNB 110. The UE 102 may send the measurements back to the location server, e.g., to the LMF 120 in an LPP message (e.g. inside a 5G NAS message) via the serving gNB 110-1 (or serving ng-eNB 114) and the AMF 115 or to the LSS 117 within a node in the NG-RAN 135, such as in serving gNB 110-1.

As noted, while the communication system 100 is described in relation to 5G technology, the communication system 100 may be implemented to support other communication technologies, such as GSM, WCDMA, LTE, etc., that are used for supporting and interacting with mobile devices such as the UE 102 (e.g., to implement voice, data, positioning, and other functionalities). In some such embodiments, the 5GC 140 may be configured to control different air interfaces. For example, in some embodiments, 5GC 140 may be connected to a WLAN, either directly or using a Non-3GPP InterWorking Function (N3IWF, not shown FIG. 1) in the 5GC 140. For example, the WLAN may support IEEE 802.11 WiFi access for UE 102 and may comprise one or more WiFi APs. Here, the N3IWF may connect to the WLAN and to other elements in the 5GC 140 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 102. In these other embodiments, on-demand resource allocation for positioning of a UE 102 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

It should be noted that the gNBs 110 and ng-eNB 114 may not always both be present in the NG-RAN 135. Moreover, when both the gNBs 110 and ng-eNB 114 are present, an NG interface with the AMF 115 may only present for one of them.

As illustrated in FIG. 1, a gNB 110 may be allowed to control one or more Transmission Points (TPs) 111, such as broadcast-only TPs for improved support of DL position methods such as DL-TDOA or ECID. Additionally, a gNB 110 may be allowed to control one or more Reception Points (RPs) 113, such as internal Location Measurement Units (LMUs) for UL measurements for position methods such as UL-TDOA or ECID. The TPs 111 and RPs 113 may be combined into, or defined to be part of, a Transmission Reception Point (TRP) 112 to support downlink (DL) and/or uplink (UL) position methods, such as DL-TDOA, UL-TDOA and multi-cell RTT. Further, a gNB 110 may be allowed to include a Location Server Surrogate (LSS) 117 to support positioning of a UE 102 by a serving gNB 110. LSS 117 may support some or all of the same functions as LMF 120, with the difference that LSS 117 is located in NG-RAN 135, whereas LMF 120 is located in 5GCN 140. The term "Location Server Surrogate" is used herein for the NG-RAN location management functionality, but other terms may be used, such as "Local-LMF" or "NG-RAN LMF," etc. Positioning of a UE 102 by a serving gNB 110 can be used to provide a location service to a UE 102, serving AMF 115 or LMF 120 and to improve NG-RAN operation—e.g. by reducing the latency of position determination and increasing the number of UEs 102 for which location can be supported.

As illustrated, the ng-eNB 114 may control one or more TPs 109, which may use different protocols than TPs 111 in gNBs 110-1 and 110-2, e.g., the TPs 109 may use protocols related to LTE, while TPs 111 use protocols related to 5G NR. The TPs 109 may perform similar functions as TPs 111 in gNBs 110-1 and 110-2, and accordingly, TPs 111 and 109 may be collectively referred to herein as TPs.

The location management functionality in the NG-RAN 135, i.e., LSS 117, may have comparable capability to a 5GCN LMF, e.g., LMF 120. An operator could restrict an LSS 117 to support e.g., NR Radio Access Technology (RAT) dependent positioning. The LSS 117, if present, may communicate with a gNB Central Unit (gNB-CU) and may support position determination and reporting, as described later. The LMF 120 may manage the scheduling for one or more Transmission Points (TPs) 111 that are configured to transmit downlink (DL) reference signals (RSs) to be measured by the UE 102 and one or more Reception Points (RPs) 113 that are configured to receive and measure uplink (UL) Resource Signals (RSs) transmitted by the UE 102, as well as other UL transmissions by the UE 102.

The LMF 120 and the LSS 117 in a gNB 110 may perform various functions. For example, the LMF 120 may request location measurements from the UE 102, e.g., using LPP, and may manage UL location measurements by the gNB 110 or TRP 112 of the UE 102, and may manage static and dynamic scheduling of DL-PRS and broadcast of assistance data by the gNB 110. The LMF 120 may further interact with other gNBs 110 to coordinate location support (e.g. obtain UL location measurements for a UE 102 or request changes to DL-PRS broadcast). The LSS 117 may receive the location measurements and may determine a location estimate for a UE 102. The above functions are provided as examples only. Additional or different functions may be performed if desired. An LSS 117 may communicate with other gNBs 110 using XnAP or a location specific protocol above XnAP in order to coordinate support of these functions.

Thus, an LSS 117 may support NG-RAN 135 determination of a UE 102 location which can be requested by the UE 102 (e.g., using LPP), by a serving AMF 115 (e.g., using NGAP or a location specific protocol conveyed by NGAP), by another gNB 110/ng-eNB 114 (e.g. using XnAP or a location specific protocol conveyed by XnAP), or the LMF 120 (e.g., using NRPPa protocol). Such a capability would allow location support with reduced latency in position determination (since the NG-RAN 135 is closer to a UE 102 than an LMF 120) and offload location support from LMFs.

The signaling between an AMF 115 and NG-RAN 135 node may use a protocol layering as defined in 3GPP Technical Specification (TS) 38.300 and 3GPP TS 23.501 and can make use of the Next Generation Application Protocol (NGAP) at the top level as defined in 3GPP TS 38.413. An NG-RAN 135 location reporting procedure is defined in 3GPP TS 23.502 and 3GPP TS 38.413 and enables a serving AMF 115 to request a serving NG-RAN node (gNB 110 or ng-eNB 114) to report a UE 102 location once only, periodically on a change of serving cell or periodically when a UE 102 presence in an area of interest has changed. The location provided by the serving NG-RAN node may comprise an NR or LTE Cell Global Identity CGI (CGI) and a Tracking Area Code (TAC). The procedure may further be enhanced to include an optional Quality of Service (QoS) parameter in an NGAP Location Reporting Control message to enable a serving AMF 115 to request a more accurate location for a UE 102 than that corresponding to a CGI. The procedure may further include an optional list of supported Geographic Area Description (GAD) shapes in a Location Reporting Control message. The procedure may further include allowing the serving NG-RAN node to obtain a more accurate UE location when a QoS (e.g. using Enhanced Cell ID (ECID) positioning). The procedure may further permit an NG-RAN node (e.g. a gNB 110) to return a UE location to a serving AMF 115 using a GAD shape when requested in am NGAP Location Reporting Control message.

Figure 2:
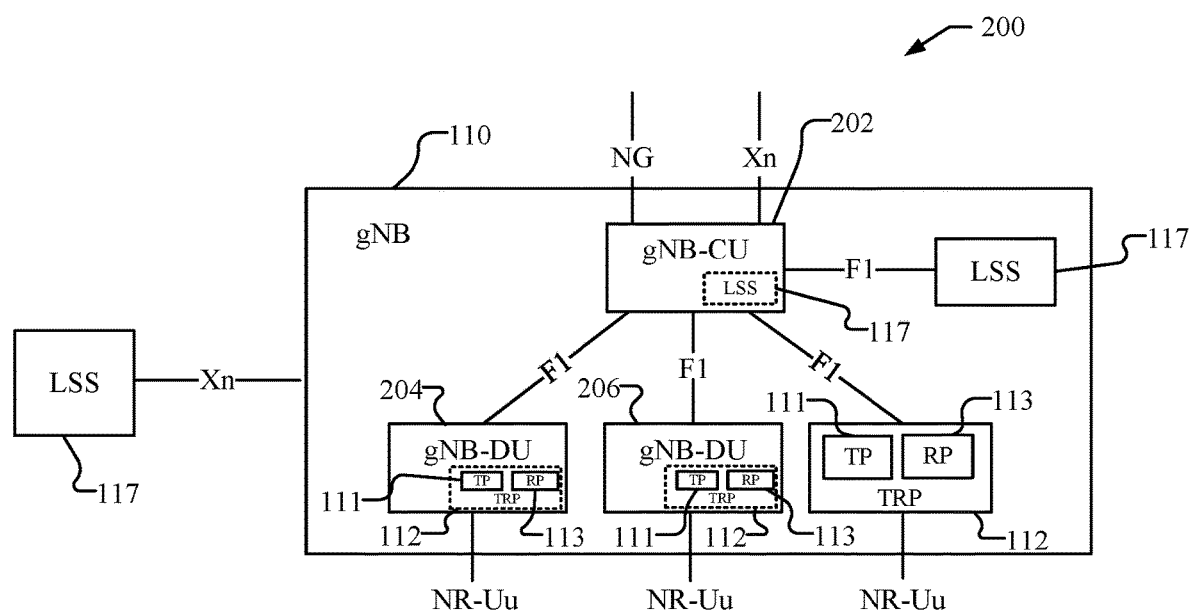
FIG. 2 shows an extended architecture diagram of an NG-RAN node that includes a Location Server Surrogate (LSS).

FIG. 2 shows an architecture diagram of an NG-RAN node 200, which may include an LSS 117 or may be coupled to an LSS 117 that is within the NG-RAN 135, e.g., as a separate entity or as part of another gNB. The NG-RAN node 200 may be a gNB 110, according to one implementation. The architecture shown in FIG. 2, for example, may be applicable to any gNB 110-1 and 110-2 in NG-RAN 135 shown in FIG. 1.

As illustrated, gNB 110 includes a gNB Central Unit (gNB-CU) 202, and gNB Distributed Units (gNB-DUs) 204 and 206, which may be physically co-located in the gNB 110 or may be physically separate. The gNB-CU 202 is a logical or physical node hosting support for Radio Resource Control (RRC), Service Data Adaptation Protocol (SDAP) and Packet Data Convergence Protocol (PDCP) protocols of the gNB 110 used over the NR Uu air interface and controlling the operation of one or more gNB-DUs. The gNB-CU 202 terminates an F1 interface connected with a gNB-DU. As illustrated, the gNB-CU 202 may communicate with an AMF 115 via an NG interface. The gNB-CU 202 may further communicate with one or more other gNBs 110 via an Xn interface. The gNB-DUs 204 and 206 are logical or physical nodes hosting support for Radio Link Control (RLC), Medium Access Control (MAC) and Physical (PHY) protocol layers used over the NR Uu air interface of the gNB 110, operation of which is partly controlled by gNB-CU 202. The gNB-DU terminates the F1 interface connected with the gNB-CU 202. The gNB-CU 202 requests positioning measurements (e.g. E-CID) to the gNB-DU 204 and 206. The gNB-DU 204 and 206 report the measurements back to the gNB-CU 202. A gNB-DU 204 or 206 may include positioning measurement functionality. It should be understood that a separate measurement node is not precluded.

The LSS 117 can be part of a gNB-CU 202 (e.g. a logical function of a gNB-CU 202). However, in order to offload positioning support from a gNB-CU 202 and to allow a multi-vendor environment, a separate LSS 117 is allowed, which may be connected to the gNB-CU 202 via an F1 interface. Additionally or alternatively, an LSS 117 within the NG-RAN 135 may be external to the gNB 110, e.g., as part of another gNB, and may be connected to the gNB 110 via an Xn interface. The gNB-CU 202 can then forward all positioning related signaling to the LSS 117 and/or gNB-DUs 204 and 206 or TRPs 112.

Additionally, as illustrated in FIG. 2, gNB 110 may include a TP 111 and an RP 113 combined into a TRP 112, and LSS 117, which may be physically or logically located in the gNB 110. The gNB-CU 202 may be configured to communicate with the TP 111, RP 113, and LSS 117, e.g., via F1 interfaces. The gNB-CU 202, thus, controls one or more TPs 111 and RPs 113, and the LSS 117 is accessible from the gNB-CU 202 via an F1 interface.

In some embodiments, the NG-RAN node 200 (or gNB 110) may comprise a subset of the elements shown in FIG. 2. For example, the NG-RAN node 200 may comprise the gNB-CU 202 and the LSS 117 but may not include one or more of gNB-DUs 204 and 206, RP 113 or TP 111. Alternatively, NG-RAN node 200 may include one or more of gNB-DUs 204 and 206, RP 113 or TP 111 but may not include LSS 117. Further, the elements shown in FIG. 2 may be logically separate but physically co-located or may be partially or completely physically separate. For example, LSS 117 may be physically separate from gNB-CU 202 or may be physically combined with gNB-CU 202. Similarly, one or more of gNB-DUs 204 and 206, RP 113 or TP 111 may be physically separate from gNB-CU 202 or may be physically combined with gNB-CU 202. In the case of physical separation, the F1 interface may define signaling over a physical link or connection between two separated elements. In some implementations, gNB-CU 202 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DUs 204 and 206 to support NR Uu air interface signaling for control plane and user plane, respectively. However, only the gNB-CU-CP may interact with LSS 117, TPs 111 and RPs 113 to support and control location related communication.

Protocol layering between the gNB-CU 202 and the TP 111, RP 113, and LSS 117 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures between the gNB-CU 202 and LSS 117 may comprise all location related procedures on NG, Xn, and NR-Uu interfaces. For example, the location procedures between AMF 115 and the NG-RAN node 200 may use NGAP. The location procedures between NG-RAN node 200 and other NG-RAN nodes, e.g., gNBs 110, may use XnAP or a protocol above XnAP, such as an extended NR Positioning Protocol A (NRPPa) as defined in 3GPP TS 38.455. The location procedures between NG-RAN node 200 and UE 102 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC(LPP) messages may be carried in an UL/DL RRC (LPP) Message Transfer.

The above support may also be realized with a single F1AP UL/DL LSS Message Transfer container and/or a new location protocol transported using F1AP. Thus, a gNB-CU 202 could forward any location related transfer messages received on NG, Xn and Uu interfaces to the LSS 117, either within the same gNB 110 (e.g. in case the gNB 110 includes an LSS 117, as illustrated in FIG. 2) or to another gNB (e.g. in case the gNB 110 has no LSS 117).

The location procedures between the LSS 117 and the gNB-DUs 204 and 206, TP 111, and RP 113, which may be coordinated by a gNB-CU 202, may include the transfer of UL/DL PRS configuration and the transfer of UL/DL PRS measurement information. The above functionality may be similar to that of LTE LMUs as specified in 3GPP TS 36.305 and TS 36.459 (SLmAP) and also similar to that between LMF 120 and NG-RAN node 200. Therefore, NRPPa could be extended to support TRP location measurement/configuration messages which can be carried inside F1AP transport messages.

Thus, the NG-RAN node 200 may support signaling and location procedures between a gNB-CU 202 and LSS 117 based on F1AP to support the same location procedures as supported on NG, Xn, and NR-Uu interfaces and, in addition, support transfer of a UL/DL PRS configuration and measurements information to/from a gNB-DU/TRP from/to the LSS.

As can be seen, the NG-RAN location functionality (LSS) may be realized using existing interfaces and protocols. However, given that there are common location procedures on Xn, NG and F1, it would be efficient to define a new generic RAN location protocol which could be transported by Xn-C or F1-C (and probably NG) transfer messages. Given that most functionality would also be required between an LMF and NG-RAN Node (i.e., to support new location methods and features by a 5GC LMF), it may also be possible to extend NRPPa to support the additional RAN location messages.

During positioning of a UE 102, it is often desirable to minimize the latency in position determination (e.g. in the context of Industrial Internet of Things (IIoT) where a UE 102 may be some moving object or tool in an automated factory or warehouse). There are many contributing components to the latency in positioning. For example, various component of latency can include: A) sending a location request to a location server, e.g. LMF 120, from the external client 130 or the UE 102; B) scheduling DL and/or UL PRS Transmissions for UL, DL and/or UL/DL NR positioning method(s); C) scheduling location measurements from the UE 102 and/or gNB(s) 110; D) waiting for DL PRS and/or UL SRS transmission to be sent; E) obtaining measurements of DL PRS (in the UE 102) and/or UL SRS (in gNBs 110); F) sending the measurements to a location server (e.g. LMF 120), for UE assisted positioning or to the UE 102 for UE based positioning; G) calculating the location; and H) sending the location to the client (e.g., the external client 130 or UE 102). As discussed herein, latency for most or all of these contributing components may be reduced or eliminated.

In one implementation, latency caused due to a location preparation phase of positioning may be eliminated by scheduling the location of the UE 102 in advance of when it is needed. Thus, latency contributing components that occur prior to performing location measurements for the UE, e.g., components A-D above, may be eliminated by requesting and scheduling the location of the UE 102 in advance of when it is needed. For example, if a specific time T is agreed in advance to obtain the location of the UE 102, latency for the positioning measurement may start from the time T, and the time associated with the location preparation phase that occurs before time T will not contribute to the latency. The 5GCN LMF 120 may be used for location coordination and management, e.g., location preparation phase, prior to time T.

In one implementation, some latency components that occur after the positioning measurements are performed, e.g., components F and H above, may be minimized by using a location server surrogate (LSS) 117 that is associated with the serving gNB 110-1. The LSS 117, for example, may be used for components F, G and H, above, all of which occur after time T, while the LMF 120 may be used for components A-C, above, which occur before time T.

In some implementations, scheduling the location of the UE 102 in advance and an LSS 117 may both be used for positioning. In other implementations, only the scheduling of the location of the UE 102 in advance may be used for positioning, e.g., where the LMF 120, instead of the LSS 117, may be used as the location server to determine the location estimate for the UE 102, which can eliminate delays due to components A-D, above. In these other implementations, location is scheduled in advance by an LMF 120 and the same LMF 120 also supports obtaining a location and transferring the location to an external client (e.g. external client 130).

In an implementation where the location of the UE 102 is requested and scheduled in advance, the LMF 120 may receive a positioning message requesting the location of the UE 102 at a time T. Specifically, in one interpretation designated here as I1, the location of the UE 102 at time T (meaning where the UE is located at the time T) may be requested, or at least expected. Other interpretations of the time T can include (I2) measuring the location of the UE 102 at or near to the time T (e.g. obtaining measurements for the UE 102 at or near to the time T); (I3) requesting at or near to the time T measurements for the UE 102; (I4) starting a location session with the UE 102 (and/or nearby gNBs 110) at or near to the time T; (I5) calculating a location for the UE 102 at or near to the time T; (I6) sending a location for the UE 102 to an external client 130 at or near to the time T. All interpretations of the time T can be used to reduce latency by enabling some or all of components A-D described above to be performed in advance and thereby not to contribute to latency. However, from an external client perspective, a useful interpretation may be I1, whereby the location of the UE 102 at time T, or near to the time T, is provided because this can eliminate uncertainty in the time to which the location applies, which may be partly present with other interpretations. Nevertheless, the techniques described herein for supporting location in advance can be used with these other interpretations, as will be obvious to those with ordinary proficiency in this art. For example, with interpretation I2, measuring the location of the UE 102 at or near to the time T may enable "a location of the UE at the time T" to be obtained as for interpretation. If any entity (e.g. UE 102 or gNB 110) which obtains measurements for the UE 102 at or near to the time T also timestamps the measurements (e.g. to enable an LSS 117 or LMF 120 to relate the time of each measurement to the time T), it may be possible for a location server (e.g. LSS 117 or LMF 120) or the UE 102 (for UE based location) to extrapolate or interpolate among the location measurements to determine "the location of the UE 102 at the time T" exactly or almost exactly.

It is noted that the term "at or near to the time T" is used herein in a number of places, e.g. such as to refer to a location of the UE 102 "at or near to the time T" or to measuring the location of the UE 102 "at or near to the time T". In these places, "at or near to the time T" can be considered to mean at a time that is within 1 to 500 milliseconds (ms) of the time T, where an implementation with very high accuracy may achieve a time that is within 1 to 5 ms of the time T, an implementation with slightly lower accuracy may achieve a time that is within 5 to 50 ms of the time T and an implementation with still lower accuracy may achieve a time that is within 50 to 500 ms of the time T.

As mentioned above, the LMF 120 may receive a positioning message requesting the location of the UE 102 at a time T (with T interpreted as discussed above). The positioning message may be from, e.g., an external client 130 or the UE 102. For example, the positioning message may be an event report that is received prior to the time T, and that indicates a periodic event scheduled to occur at the time T, a triggered event occurring at a current time, or a triggered event expected to occur later at or near to the time T. The LMF 120 may manage and coordinate the location of the UE 102 prior to the time T, e.g., during a location preparation phase. For example, the LMF 120 may send request messages to various entities, such as base stations (gNBs 110) and the UE 102, to schedule location measurements for the UE 102 by each of the entities at or near to the time T. The LMF 120 may indicate the time T at which the location for the UE 102 is to be measured and the identification of the location server, e.g., LSS 117 (if used) or LMF 120. The scheduled location measurements enable the location for the UE 102 to be measured at the time T based on one or more positioning methods. For example, the entities may include the UE 102 and the position measurements may include DL-TDOA, Downlink AOD (DL-AOD), A-GNSS, WLAN, RTT, multi-cell RTT or some combination of these. The entities may include at least one base station, e.g. the serving gNB 110-1, a number of neighboring gNBs 110 (e.g. gNB 110-2), or a combination thereof, and the position methods may include UL-TDOA, Uplink AOA (UL-AOA), RTT, multi-cell RTT or some combination of these. The LMF 120, for example, may send a message to the serving gNB 110-1 to activate transmission of UL SRS signals by the UE 102 at or near to the time T, so that at least some of the location measurements may be obtained by gNBs 110 at or near to the time T using the UL SRS signals.

In an implementation where a location server associated with the serving gNB 110-1 is used, e.g., the LSS 117, the LMF 120 may be used to coordinate the use of the location server. For example, the LMF 120 may send an assignment message to the serving gNB 110-1 for the UE 102 that enables the serving gNB 110-1 to assign the location server. The location server (e.g. LSS 117) may be associated with the serving gNB 110-1, for example, internal to the serving gNB 110-1, part of the CU for the serving gNB 110-1, connected to the CU for the serving gNB 110-1, or external to and connected to the serving gNB 110-1. The LMF 120, for example, may provide the serving gNB 110-1 and location server with information necessary for the positioning measurements, e.g., including the time T, the IDs of each entity that will perform positioning measurements, the location measurements to be performed, configuration information for DL and/or UL signals and/or an ID of the external client, if any, or a combination thereof. The location server that is associated with the serving gNB 110-1 may receive the location measurements from one or more measuring entities, such as the UE 102 and/or neighboring gNBs 110. The location server may determine the location of the UE 102 based on the location measurements or may send the location measurements to the UE 102 and receive the location after the UE 102 determines the location based on the location measurements. The location server may send the location to the UE 102 or an external client 130, e.g., based on user plane location protocols.

Figure 3A:
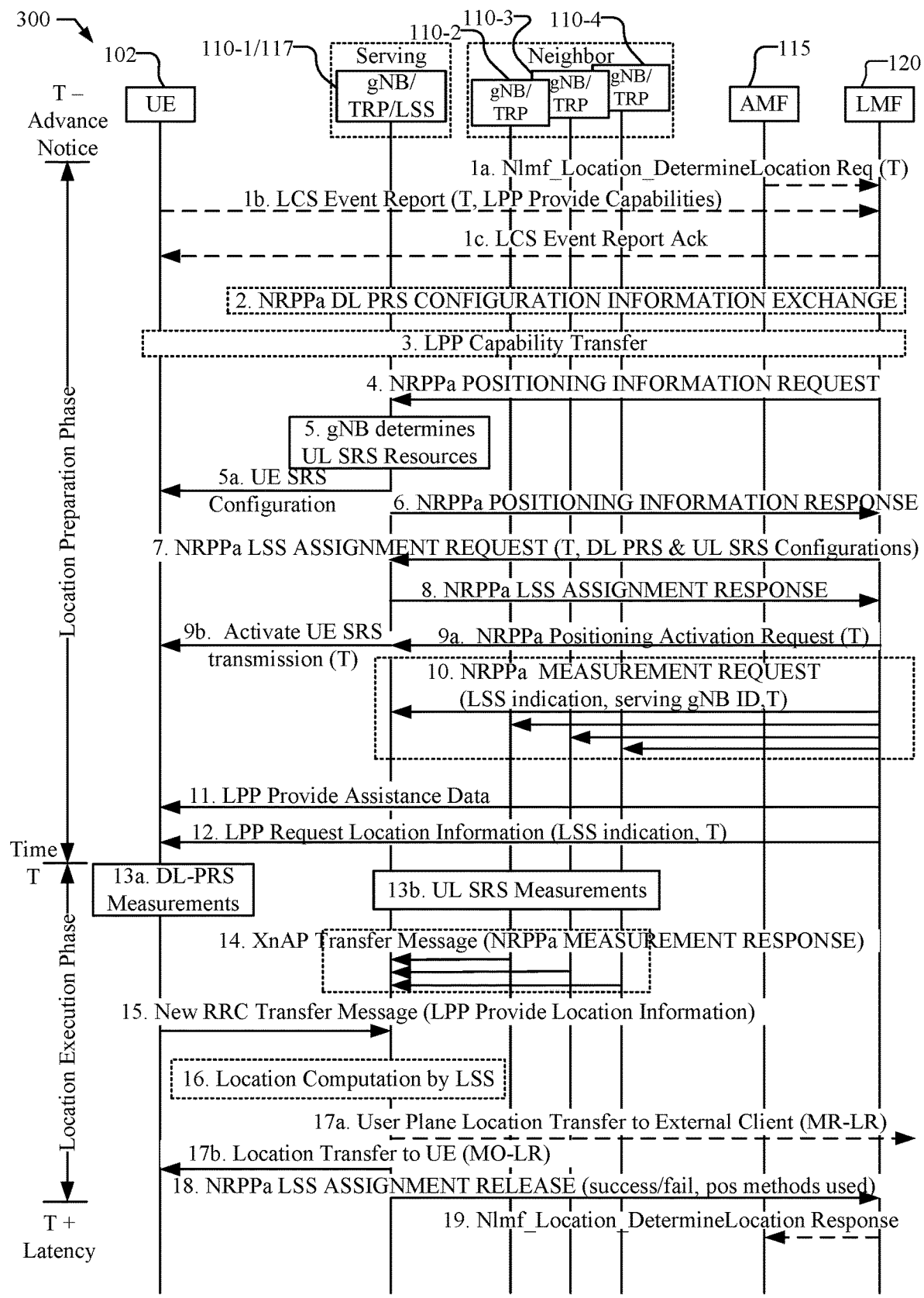
FIG. 3A is a message flow illustrating the messaging between an LMF, gNBs including an LSS, and a UE for a UE assisted positioning procedure, such as multi-RTT.

FIG. 3A is a message flow 300 illustrating messaging between the LMF 120, the gNBs 110, including the LSS 117, and the UE 102 for a UE assisted positioning procedure, such as multi-RTT. The serving gNB 110-1 and multiple neighboring gNBs 110-2, 110-3, and 110-4 may be sometimes collectively referred to as gNBs 110. The LSS 117 may be a logical function of the serving gNB 110-1 CU. In some implementations, the LSS 117 may be inside the gNB 110-1, but connected to the CU or outside the gNB 110-1. For example, if the LSS 117 is outside the gNB 110-1 or separate from the gNB 110-1 CU, additional messages (e.g. XnAP messages) may be used to transfer messages from the gNB 110-1 to the LSS 117 and back from the LSS 117 to the gNB 110-1. The positioning procedure illustrated in FIG. 3A includes both DL PRS and UL SRS for the sake of inclusiveness. The DL PRS and UL SRS measurements, for example, may be used to support a positioning method such as multi-cell RTT (also referred to as multi-RTT) in which UE 102 obtains DL measurements and gNBs 110 obtain UL measurements. It should be understood, however, that the procedure illustrated in FIG. 3A may be used with other types of positioning methods that rely, e.g., on only DL PRS by excluding the stages related to UL SRS, or that rely on only UL SRS by excluding the stages related to DL PRS. Accordingly, the procedure may be used with positioning measurements, such as UL-TDOA, UL-AOA, DL-TDOA, DL-AOD, A-GNSS, WLAN, RTT, multi-cell RTT or some combination of these. For example, to support UL position methods such as UL-TDOA or UL-AOA in which gNBs 110 measure UL SRS signals from UE 102 but UE 102 does not measure DL PRS signals from gNBs 110 or other DL signals (e.g. from SVs 190 or a WLAN AP), stages 2, 11, 12, 13a and 15 in FIG. 3A may be omitted. Similarly, to support DL position methods such as DL-TDOA, DL-AOD, A-GNSS or WLAN in which UE 102 measures DL PRS signals from gNBs 110 or other DL signals (e.g. from SVs 190 or a WLAN AP) but gNBs 110 do not measure UL SRS signals from UE 102, stages 4-6, 9-10, 13b and 14 in FIG. 3A may be omitted.

As illustrated in FIG. 3A, the positioning procedure may request and schedule the location of the UE 102 in advance of when it is needed, e.g., at time T. Accordingly, on the left side of the message flow is a time line illustrating when various stages are performed relative to the time T. As illustrated, stages 1a-12 are all part of the location preparation phase and are performed before time T. At time T, the UL and DL signals are transmitted and measured. After time T, the location execution phase occurs, which is illustrated as including stages 13-19. FIG. 3A further illustrates the use of LSS 117 in the serving gNB 110-1 to further reduce latency in the positioning procedure, e.g., during the location execution phase.

Stage 1a and stages 1b and 1c illustrate different types of messages that may be used to initiate the positioning procedure. For example, stage 1a supports a Mobile Originated Location Request (MO-LR) or Mobile Terminated Location Request (MT-LR) positioning procedure, while stages 1b and 1c support a periodic or triggered positioning procedure. It will be clear to those of ordinary skill in the art, that additional messages may be included in MO-LR, MT-LR, or periodic or triggered positioning procedures. It should be understood that stage 1a or stages 1b and 1c may be sent, if any, and that all three messages will not be typically transmitted during a positioning procedure.

At stage 1a, the AMF 115 may invoke an Nlmf_Location_DetermineLocation service operation towards the LMF 120 to request the current location of the UE 102. The Nlmf_Location_DetermineLocation message may be sent, e.g., to support an MT-LR or MO-LR. The Nlmf_Location_DetermineLocation message may include the time T at which a location for the UE 102 is to be measured and identification information for the external client 130 (e.g. an IP address or Fully Qualified Domain Name (FQDN) for external client 130 and/or a location reference that can be recognized by external client 130). The service operation may include a LCS Correlation identifier, the serving cell identity of the Primary Cell in the Master RAN node and the Primary Cell in the Secondary RAN node when available based on Dual Connectivity scenarios, and the client type and may include an indication if UE 102 supports LPP, the required QoS and Supported Geographical Area Description (GAD) shapes.

At stage 1b, if periodic or triggered location is being supported, the UE 102 may send an LCS supplementary services event report message to the LMF 120 which is transferred via the serving AMF 115 and is delivered to the LMF 120 using an Namf_Communication_N1MessageNotify service operation. The event report may indicate the time T at which a location for the UE 102 is to be measured and may include a LPP Provide Capabilities message. The event report may indicate a periodic event expected at the time T, a triggered event at a current time that is before the time T, or a triggered event expected at or near to the time T. The event report may further include the type of event being reported (e.g. whether a normal event or expiration of the maximum reporting interval) and may include an embedded positioning message, such as an LPP Provide Capabilities message. The UE 102 may also include a deferred routing identifier if previously received to transfer the event report to the LMF 120. The AMF 115 may then forward the event report to either the serving LMF 120 or any suitable LMF based on whether the deferred routing identifier indicates a particular LMF or any (default) LMF. The UE 102 may also include an (H)GMLC contact address, a Location Deferred Request (LDR) reference number, whether location estimates are to be reported and if so the location QoS in the event report. To support user plane location reporting as at stage Aja, the UE 102 may include in the event report identification information for the external client 130 such as an IP address or FQDN for external client 130 and/or a location reference that can be recognized by external client 130. The identification information may further indicate that external client 130 supports receiving a UE 102 location via a user plane.

At stage 1c, after the LMF 120 receives the event report and if it can handle this event report, the LMF 120 updates the status of event reporting (e.g. the number of event reports so far received from the UE 102 and/or the duration of event reporting so far) and returns an LCS supplementary services acknowledgment for the event report to the UE 102. The acknowledgment may optionally include a new deferred routing identifier indicating a new serving LMF or a default (any) LMF. If the UE 102 does not receive any response from the LMF 120 after a predefined time, e.g. if the current LMF 120 does not support the deferred location request (for temporary or permanent reasons) or due to some radio access failures, the UE 102 may re-send the report one or more times. If the UE 102 sends the repeated event report more than the predefined maximum resending time and the UE 102 still does not receive any response from AMF 115, the UE 102 stops resending the report and reserves the event report, then records a corresponding flag to indicate that a report has been sent unsuccessfully. When the UE 102 performs a registration update and detects the PLMN is changed, if the flag has been set, the UE 102 may send the report to the corresponding AMF, and the flag will be cleared upon successfully sending the report.

At stage 2, the LMF 120 and gNBs 110 may use a NRPPa DL PRS configuration information exchange, e.g., as described in 3GPP TS 38.305, to obtain from gNBs 110 or send to gNBs 110 DL PRS configuration information (e.g. including parameters for DL PRS transmission such as PRS frequency, bandwidth, timing, coding, muting, frequency hopping) required for a positioning method, e.g., Multi-RTT positioning. The PRS configuration information can also be sent as assistance data to UE 102 (at stage 11) and/or to LSS 117 (at stage 7). The PRS configuration information can be used by: UE 102 to assist DL PRS measurements at stage 13a; LMF 120 to request UL SRS configuration information from the serving gNB 110-1 for the UE 102 at stage 4; and/or by LSS 117 to assist calculation of the UE 102 location at stage 16.

At stage 3, the LMF 120 may request the positioning capabilities of the UE 102 (if not already obtained, e.g. as at stage 1b) using a LPP Capability Transfer procedure, e.g., described in 3GPP TS 38.305.

At stage 4, the LMF 120 sends a NRPPa POSITIONING INFORMATION REQUEST message to the serving gNB 110-1 to request UL information for the UE 102.

At stage 5, the serving gNB 110-1 determines the resources available for UL SRS and configures the UE 102 with the UL-SRS resource sets using RRC at stage 5a.

At stage 6, the serving gNB 110-1 provides the UL SRS configuration information to the LMF 120 in a NRPPa POSITIONING INFORMATION RESPONSE message.

At stage 7, the LMF 120 sends an NRPPa LSS ASSIGNMENT REQUEST message to the serving gNB 110-1. The LSS assignment message enables the serving gNB 110-1 to assign the LSS 117 that is associated with the serving gNB 110-1. The LSS assignment message may include the time T. The LSS assignment message may further include one or more of: (i) the identities of the entities (e.g. gNBs 110 and UE 102) that will perform location measurements; (ii) an identification of the location measurements to be obtained at stage 13 (e.g. an indication of one or more of RSTD, AOA, AOD, RSRP, RSRQ, Rx-Tx, GNSS pseudorange and the entities that will obtain these); (iii) configuration information for DL PRS (e.g. obtained or sent at stage 2); (iv) configuration information for UL SRS (e.g. obtained at stage 6); (v) identification information for an external client for the location of the UE 102 (e.g. an identification or indication of external client 130 or UE 102 and, in the case of external client 130, the (H)GMLC contact address, the LDR reference number, the IP address or FQDN for the external client 130 and/or the location reference and/or whether external client 130 supports receiving a location of UE 102 via a user plane); (vi) whether location estimates are to be reported and if so the location QoS; or (vii) a combination thereof. The LSS assignment may further indicate the type of positioning method to be used, e.g., UE assisted multi-RTT.

At stage 8, the serving gNB 110-1 sends an NRPPa LSS ASSIGNMENT RESPONSE message to the LMF 120 indicating assignment of the LSS 117. The LSS assignment response message may include an identity or address of the LSS 117.

At stage 9a, the LMF 120 sends an NRPPa Positioning Activation Request message to the serving gNB 110-1 to activate UL SRS transmission from UE 102. The NRPPa Positioning Activation Request message includes the time T at which the location for the UE 102 is to be measured and thus the time at which UE 102 needs to transmit UL SRS to enable the UL measurements at stage 13b to occur at or near to the time T. At stage 9b, the serving gNB 110-1 activates the UE SRS transmission, at or near to the time T. The UE 102 will wait until at or near to the time T to begin the UL SRS transmission. The serving gNB 110-1 may return an NRPPa acknowledgment to the LMF 120 (not shown in FIG. 3A).

At stage 10, the LMF 120 provides the UL information to the selected gNBs 110 in a NRPPa MEASUREMENT REQUEST message. The message includes an indication that an LSS 117 in the serving gNB 110-1 will be used, as well as the serving gNB 110-1 and/or LSS 117 identity, and the time T to perform the UL measurements. The message includes all information required to enable the gNBs/TRPs 110 to perform the UL measurements.

At stage 11, the LMF 120 sends a LPP Provide Assistance Data message to the UE 102. The message includes any required assistance data for the UE 102 to perform the necessary DL PRS measurements (e.g. includes PRS configuration information sent or received by LMF 120 at stage 2).

At stage 12, the LMF 120 sends a LPP Request Location Information message to the UE 102 to request DL measurements, e.g. of UE Receive Time-Transmission Time difference (Rx-Tx), to support the positioning method, e.g., Multi-RTT. The Request Location Information message includes an indication that an LSS 117 associated with the serving gNB 110-1 will be used, as well as the time T. The Request Location Information message may further indicate the type of positioning method to be used, e.g., UE assisted multi-RTT.

At stage 13a, at or near to the time T (e.g. within 1 to 500 ms of the time T), the UE 102 performs the DL PRS measurements from all gNBs 110 provided in the assistance data at stage 11.

At stage 13b, at or near to the time T, each gNB 110 configured at stage 10 measures the UL SRS transmissions from the UE 102.

At stage 14, each of the neighboring gNBs 110-2, 110-3, and 110-4 reports the UE SRS measurements to the serving gNB 110-1 and the LSS 117, as identified in stage 10, in XnAP transfer messages that includes NRPPa Measurement Response messages. This stage differs from a location procedure in which an LMF 120 and no LSS 117 is used in that the gNBs 110 do not send the NRPPa Measurement Response messages to LMF 120 but instead send these messages to LSS 117 which may reduce latency.

At stage 15, the UE 102 reports the DL PRS measurements for the positioning method, e.g., Multi-RTT, to the serving gNB 110-1 and the LSS 117 in an RRC Transfer Message that includes a LPP Provide Location Information message. For security, Access Stratum (AS) ciphering of the LPP Provide Location Information message may be used, as opposed to Non-Access Stratum (NAS) ciphering. This stage differs from a location procedure in which an LMF 120 and no LSS 117 is used in that the UE 102 does not send the LPP Provide Location Information message to LMF 120 but instead sends this message to LSS 117 which may reduce latency.

At stage 16, the LSS 117 uses received measurements from stages 14 and 15 to determine the positioning information and location of the UE 102. For example, the LS S 117 determines the RTT between the UE 102 and each gNB 110 from the UE 102 and gNB 110 Rx-Tx Time Difference Measurements for which corresponding UL and DL measurements were provided at stages 14 and 15 and calculates the position of the UE 102 based on the RTTs. The determination of the RTTs and the calculation of the location can be based on existing methods—e.g. with corresponding UE and gNB Rx-Tx measurements being summed to obtain an RTT between UE 102 and each gNB 110 and with RTTs and known locations of gNBs 110 being used to determine the UE 102 location via multilateration.

At stage 17a, for an MT-LR or a periodic or triggered MT-LR, the LSS 117, via the serving gNB 110-1, may transfer the location of the UE 102 to external client 130 in a User Plane Location Transfer message. The LSS 117 may send the final location over a user plane path via a UP router, e.g., UPA 128 in the 5GCN 140. Each LSS 117, for example, may have a permanent (e.g. secure Transport Layer Security (TLS)) Internet Protocol (IP), User Datagram Protocol (UDP)/IP or Transmission Control Protocol (TCP)/IP connection to the UP router. The UP router, e.g., UPA 128, may have a secure IP connection to the external client 130 and may transfer messages from the LSS 117. The UP router may be part of the LMF 120, a GMLC 125 or an NEF 127 or may be connected to one of these by proprietary means. Thus a location report may be transferred in two stages to an external client 130 with routing occurring at an IP, UDP or TCP level. Sending the location report to the external client 130 in this manner decreases latency. In order to send the UE 102 location to the correct external client 130, the LSS 117 can make use of identification information for external client 130 received at stage 7 such as the (H)GMLC contact address, the LDR reference number, the IP address, FQDN, the location reference and/or whether external client 130 supports receiving a location of UE 102 via a user plane. For example, the identification information may be sent to the UP router along with the UE 102 location to enable the UP router to identify the external client 130 and/or may be used by LSS 117 to select the UP router. The identification information may be further transferred by the UP router to the external client 130 to enable the external client 130 to identify the UE 102 for which the location is associated.

At stage 17b, for an MO-LR, the LSS 117 may transfer the position of the UE 102 to the UE 102 in, e.g., an RRC Location Transfer message.

At stage 18, the LSS 117 sends an NRPPa LSS ASSIGNMENT RELEASE message to the LMF 120, e.g., indicating success or failure of the positioning measurement, and optionally the location of UE 102 and the positioning method(s) used.

At stage 19, the LMF 120 sends an Nlmf_Location_DetermineLocation Response message to the AMF 115, e.g., for an MO-LR or MT-LR positioning procedure. The Nlmf_Location_DetermineLocation Response message enables the AMF 115 to complete the MO-LR or MT-LR procedure as described later for FIGS. 5 and 6.

Figure 3B:
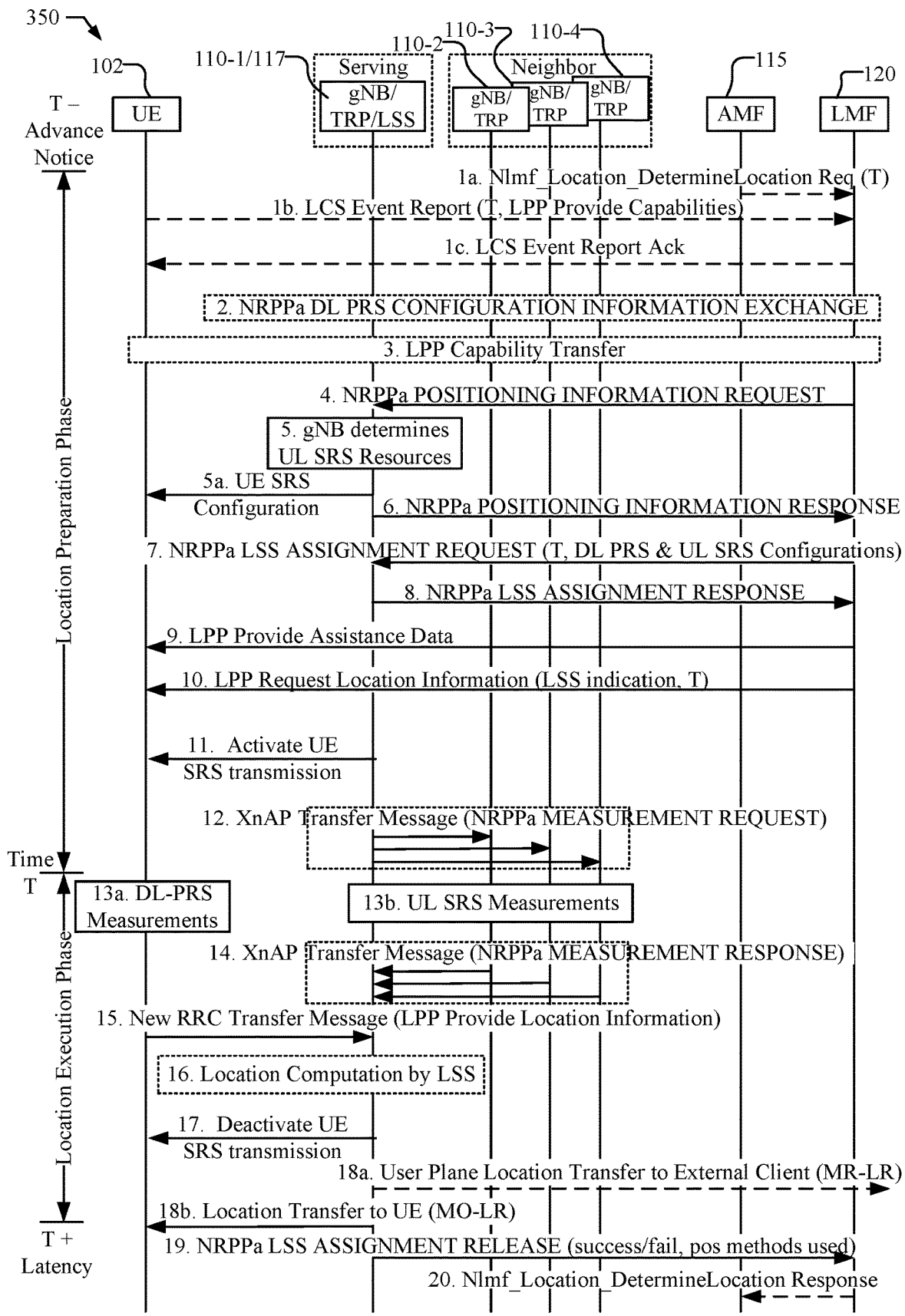
FIG. 3B is a message flow illustrating the messaging between an LMF, gNBs including an LSS, and a UE for a UE assisted positioning procedure, such as multi-RTT.

FIG. 3B is a message flow 350 illustrating another implementation of the messaging between the LMF 120, the gNBs 110, including the LSS 117, and the UE 102 for a UE assisted positioning procedure, such as multi-RTT. The positioning procedure illustrated in FIG. 3B is similar to that shown in FIG. 3A, but the SRS activation (shown in stage 9b in FIG. 3A) and the NRPPa Measurement Request (shown in stage 10 in FIG. 3A) are performed at or shortly before time T by the LSS 117 (e.g. are preformed 100 to 500 ms before the time T). In addition, the LSS 117 takes over the activation of UL SRS from the LMF 120 (at stage 11 in FIG. 3B) which provides greater control to LSS 117 and can reduce latency.

Stages 1-3 of FIG. 3B may be the same as stages 1-3 in FIG. 3A.

At stage 4, the LMF 120 sends a NRPPa POSITIONING INFORMATION REQUEST message to the serving gNB 110-1 to request UL information for the UE 102. The LMF 120 may request one or more desired SRS configurations from the serving gNB 110-1.

At stage 5, the serving gNB 110-1 determines the resources available for UL SRS and configures the UE 102 with the UL-SRS resource sets at stage 5a using RRC. The gNB 110-1 may further decide on the SRS configurations and provide them to the UE 102. The UE 102 stores the SRS configurations for later activation at or after time T.

At stage 6, the serving gNB 110-1 provides the UL SRS configuration information to the LMF 120 in a NRPPa POSITIONING INFORMATION RESPONSE message. The gNB 110-1 may further provide the SRS configurations to the LMF 120. The UE stores the configurations for later activation at or near to time T.

Stage 7 of FIG. 3B may be similar to stage 7 in FIG. 3A, but the LMF 120 may further provide the SRS configuration to the LSS 117 as part of the LSS Assignment Request. The LSS 117 stores the SRS configurations for requesting UL measurements from the gNBs 110 at or near to time T and for activating a desired SRS in the UE 102 at or near to time T. Provision of the SRS configuration to the LSS 117 at stage 7 by LMF 120 may be referred to as "preconfiguration of the LSS 117".

Stages 8, 9, and 10 of FIG. 3B may be the same as stages 8, 11 and 12, respectively of FIG. 3A.

At stage 11, when a location estimate is needed at time T, the LSS 117 activates one or more of the pre-configured SRS (from stage 5a) in the UE 102 at or near to the time T which may be based on the preconfiguration of the LSS 117 at stage 7. The UE 102 transmits the UL SRS for positioning as per the pre-configurations, e.g. at or near to the time T. Stage 11 may be performed a short time before time T (e.g. 50 to 500 ms before time T) to allow UE 102 to transmit UL SRS at or near to the time T.

At stage 12, the LSS 117 sends an NRPPa Measurement Request to the gNBs 110 to measure the UE UL SRS transmissions. The message includes all information required to enable the gNBs/TRPs 110 to perform the UL measurements and to report the measurements to the LSS 117.

At stage 13a, the UE 102 measures DL-PRS according to the configuration provided at stage 9 and performs the measurements (e.g., RSTD, Rx-Tx, etc.) requested at stage 10.

At stage 13b, each gNB 110 configured at stage 10 measures the UL SRS transmissions from the UE 102. Both stages 13a and 13b preferably occur at or near to the time T.

At stage 14, each of the neighboring gNBs 110-2, 110-3, and 110-4 reports the UE SRS measurements to the serving gNB 110-1 and the LSS 117, in XnAP transfer messages that includes NRPPa Measurement Response messages. This stage differs from a location procedure in which an LMF 120 and no LSS 117 is used in that the gNBs 110 do not send the NRPPa Measurement Response messages to LMF 120 but instead send these messages to LSS 117 which may reduce latency.

Stages 15 and 16 of FIG. 3B may the same as stages 15 and 16 of FIG. 3A.

At stage 17, the LSS 117 may deactivate the UL SRS transmissions in the UE 102, upon which the UE 102 stops the UL SRS transmissions. The SRS configurations from stages 5a and 6 may be retained or stored in the UE 102 and LSS 117 for potential later activation; e.g., when a new location is required (e.g. for periodic or triggered location of UE 102), the process may be repeated beginning at stage 11. The UE 102 and LSS 117 stored DL-PRS and SRS configurations may also be used in case the serving gNB/LSS 110-1/117 changes after a handover. For example, the serving gNB 110-1 during the location execution phase may be a different serving gNB than in the Location Preparation Phase. The UE 102 may retain the SRS configurations also after a cell change. If the serving gNB/LSS 110-1/117 changes, the old serving gNB 110-1 may provide the configuration information to the new serving gNB 110/LSS 117. The new gNB 110/LSS 117 may then still activate an UL SRS as configured in stage 5a (which was provided from a different serving gNB/LSS).

Stages 18a, 18b, 19, and 20 of FIG. 3B may the same as stages 17a, 17b, 18, and 19, respectively, of FIG. 3A.

Figure 3C:
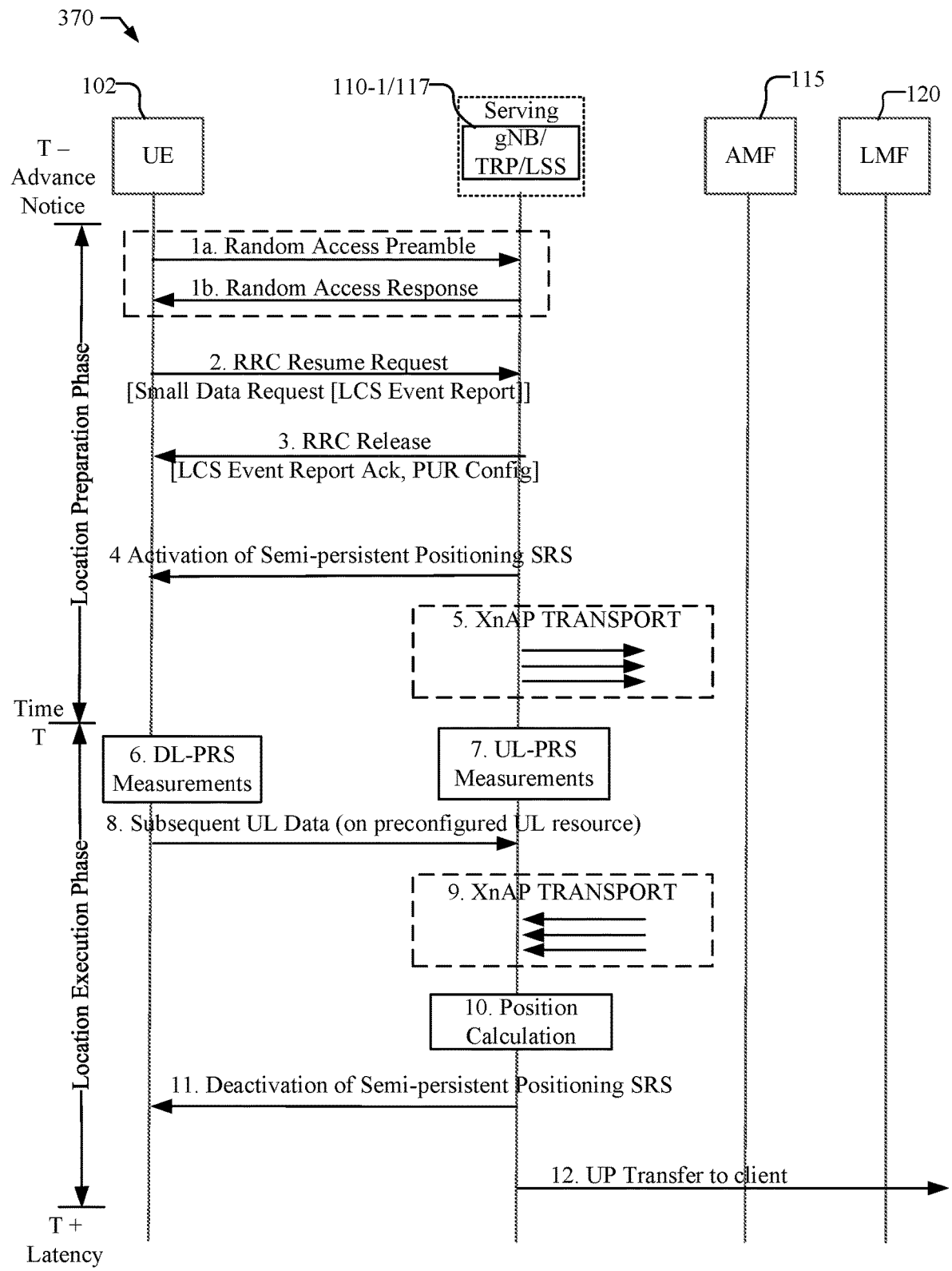
FIG. 3C is a message flow illustrating the messaging between an LMF, the NG-RAN, and a UE for a location execution phase performed in an RRC Inactive state.

FIG. 3C is a message flow 370 illustrating the messaging between the LMF 120, the gNBs 110, including the LSS 117, and the UE 102 for the location execution phase performed just before (e.g. 10-100 ms before) or at time T in an RRC_INACTIVE state. The message flow 370 may be used to support event reporting by UE 102 for a periodic or triggered MT-LR in which LSS 117 rather than LMF 120 (e.g. unlike in FIG. 3A) supports the entire procedure. This may reduce latency (e.g. compared to the procedure in FIG. 3A). The procedure makes use of preconfiguration of the LSS 117 by LMF 120. The UE 102 is also assumed to be in RRC_INACTIVE state throughout the procedure in FIG. 3C.

A Location Preparation Phase for the procedure in FIG. 3C, may occur prior to FIG. 3C, such as described in a deferred MT-LR procedure defined in 3GPP TS 23.273. In addition, LMF 120 may perform some or all of stages 2 to 10 in FIG. 3B (e.g. as part of the Location Preparation Phase, such as described in the deferred MT-LR procedure defined in 3GPP TS 23.273, which may include preconfiguring LSS 117 with an UL SRS configuration (at stage 7 in FIG. 3B) and providing the UE 102 with the UL SRS configuration at stages 4 and 5 in FIG. 3B).

The UE 102, for example, may detect an upcoming event, such as the expiration of a periodic timer, for the periodic or triggered MT-LR which will occur a short time later (e.g. 100-1000 ms later) at time T, and which requires a location estimate. The UE 102 may instead detect an event at a time T which requires a location estimate for the UE 102 as soon as possible after the time T.

At stage 1a and 1b, the UE 102 may perform a Random Access procedure (RACH), which terminates at the serving gNB 110-1. Stages 1a and 1b may be performed a short time before time T (e.g. 100-1000 ms before time T), in which case, stages 1-5 in FIG. 3C are part of the location preparation phase and do not contribute to latency as shown in FIG. 1C. Alternatively, stages 1a and 1b might be performed at time T, in which case, stages 1-5 may contribute to latency.

At stage 2, if Event Reporting is allowed in RRC_INACTIVE state (which may be indicated to the UE 102 during the Location Preparation Procedure, (e.g., as illustrated in the deferred MT-LR procedure defined in 3GPP TS 23.273, or at stage 9 or stage 10 in FIG. 3B), the UE 102 sends an LCS Event Report as part of a Small Data Request message in a message 3 (msg3) (for 4-step RACH) or a message A (msgA) (for 2-step RACH) in an RRC Resume Request message. This avoids the connection setup and subsequent release to RRC_INACTIVE for positioning measurements and reporting results, which would reduce power consumption, signaling overhead, and latency. After the gNB/LSS 110-1/117 receives the small data request message from the UE 102 with the LCS Event Report at stage 2, the gNB/LSS 110-1/117 may configure dedicated preconfigured Physical uplink shared channel (PUSCH) resources for subsequent UE 102 measurement reporting. The LCS Event Report sent at stage 2 may include an indication of the time T and/or may include an LPP message that may indicate the time T—e.g. if stage 1 is performed a short time before the time T.

At stage 3, the gNB/LSS 110-1/117 sends an LCS Event Report Acknowledgement together with the preconfigured UL resources (PUR, configured grant) to the UE 102 in a message 4 (msg4) (for 4-step RACH) or message B (msgB) (for 2-step RACH) in an RRC Release message. With the dedicated preconfigured PUSCH resources, the UE 102 may continue to transmit the subsequent LPP Provide Location Information message, e.g., at stage 8 on this PUSCH resource without moving to RRC CONNECTED state. The serving gNB/LSS 110-1/117 may also determine a new UL SRS configuration to be used by the UE 102 based on the preconfiguration of LSS 117 by LMF 120 at stage 7 in FIG. 3B. The new UL SRS configuration may be provided in the RRC Release at stage 3 (e.g. as a difference or delta-signaling compared to the already (pre-) configured UL SRS in the UE 102 or compared to the last UL SRS configuration used by UE 102 for the most recent previous event report sent by UE 102; e.g., only the SRS parameters that are changed are provided compared to those provided at stage 5a in FIG. 3B or at stage 3 in FIG. 3C for the most recent previous event report).

At stage 4, for UL-only and UL+DL positioning, the LSS 117 in the serving gNB 110-1 may activate the pre-configured SRS (e.g., from stage 5a in FIG. 3B). The activation request may also be provided in the RRC Release at stage 3. If the time T was provided at stage 2, the UL SRS can be activated to occur at or near to the time T.

At stage 5, the LSS 117 sends a NRPPa Measurement Request to each of gNBs 110 (not shown in FIG. 3C) that have been selected by LSS 117 to perform UL measurements. Each NRPPa Measurement Request can indicate measurement at or near to the time T if the time T was provided at stage 2.

At stage 6, the UE 102 measures DL-PRS according to the configuration provided (e.g., at stage 9 of FIG. 3B) and performs the measurements (e.g., RSTD, Rx-Tx, etc.) requested (e.g., as at stage 10 of FIG. 3B). The measurements may occur at or near to the time T if stage 1 occurred a short time before the time T.

At stage 7, the gNBs 110 measure the UE SRS transmissions from UE 102 and determines a position measurement, e.g., gNB Rx-Tx Time Difference measurements. The measurements may occur at or near to the time T if the time T was provided at stage 5.

At stage 8, the UE 102 sends the DL-PRS measurements obtained at stage 6 (e.g., as part of an LPP Provide Location Information message) in RRC_INACTIVE state to the LSS 117 using the preconfigured UL resources provided at stage 3.

At stage 9, each of the gNBs 110 for stage 7 that are non-serving (not shown) report the UE SRS measurements obtained at stage 7 to the serving gNB 110-1 and the LSS 117, in XnAP transfer messages that include NRPPa Measurement Response messages.

At stage 10, the LSS 117 determines a position estimate for UE 102, e.g., RTTs from the UE 102 and gNB 110 Rx-Tx Time Difference Measurements for each gNB 110 using the measurements received at stages 8 and 9. The determination of the RTTs and the calculation of the location can be based on existing methods—e.g. with corresponding UE and gNB Rx-Tx measurements being summed to obtain an RTT between UE 102 and a particular gNB 110 and with RTTs and known locations of gNBs 110 being used to determine the UE 102 location via multilateration.

At stage 11, the LSS 117 may deactivate the semi-persistent UL SRS for positioning transmissions in the UE 102, upon which the UE 102 stops the UL SRS transmissions.

At stage 12, the LSS 117, via the serving gNB 110-1, may transfer the position of the UE 102 to external client 130 in a User Plane Location Transfer message. The LSS 117 may send the final location over a user plane path via a UP router, e.g., UPA 128 in the 5GCN 140. Each LSS 117, for example, may have a permanent (e.g. secure Transport Layer Security (TLS)) Internet Protocol (IP), User Datagram Protocol (UDP)/IP or Transmission Control Protocol (TCP)/IP connection to the UP router. The UP router, e.g., UPA 128, may have a secure IP connection to the external client 130 and may transfer messages from the LSS 117. The UP router may be part of the LMF 120, a GMLC 125 or NEF 127, or may be connected to one of these via proprietary means. Thus a location report may be transferred in two stages to an external client 130 with routing occurring at an IP, UDP or TCP level. Sending the location report to the external client 130 in this manner decreases latency.

Figure 4:
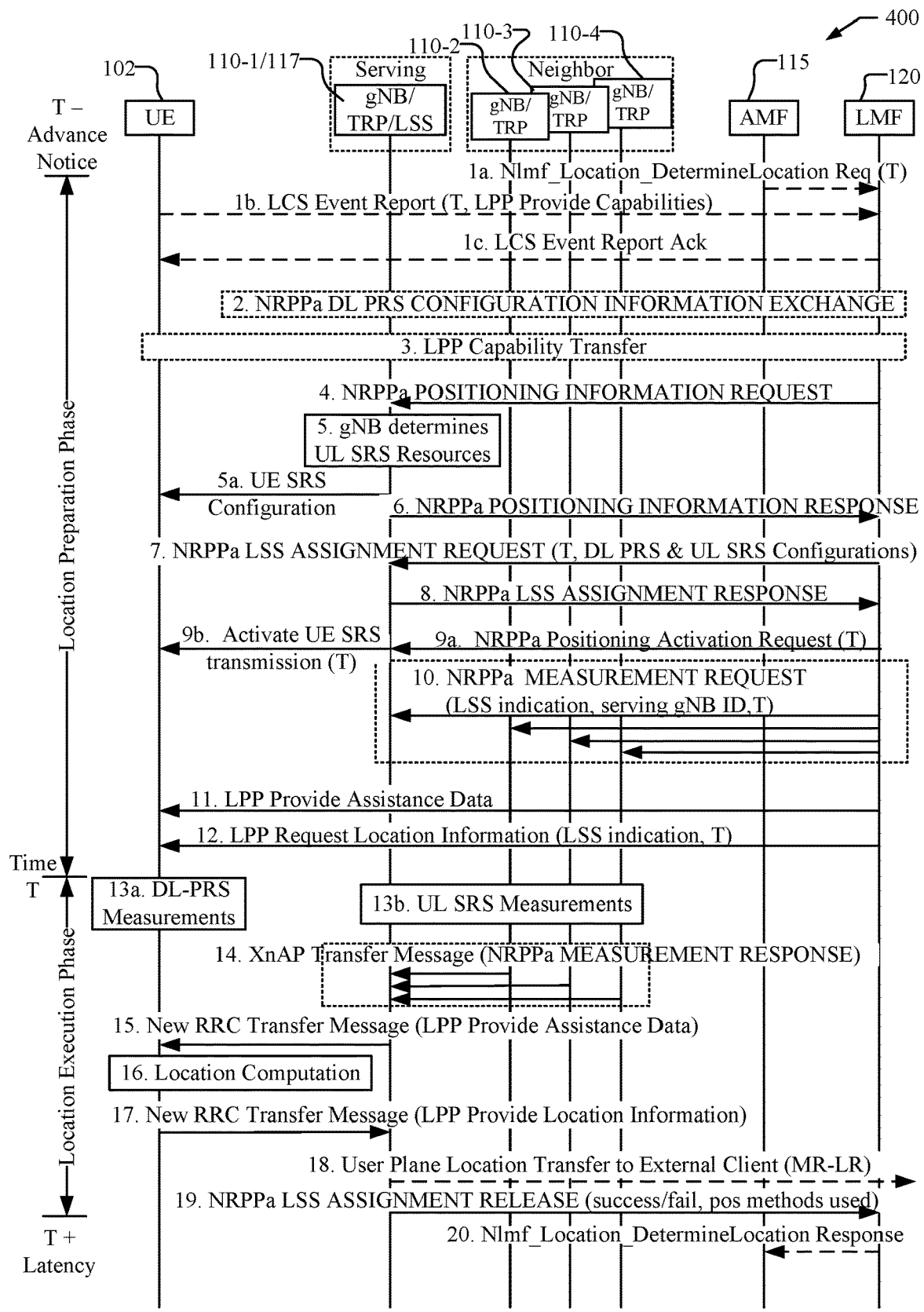
FIG. 4 is a message flow illustrating the messaging between an LMF, gNBs including an LSS, and a UE for a UE based positioning procedure, such as multi-RTT.

FIG. 4 is a message flow 400 illustrating the messaging between the LMF 120, the gNBs 110, including the LSS 117, and the UE 102 for a UE based positioning procedure, such as multi-RTT. In the positioning procedure illustrated in FIG. 4, stages 1-14 may the same as stages 1-14 illustrated in FIG. 3A, except that the LMF 120 may indicate that a UE based positioning procedure is to be used, e.g., in stages 7, 11 and 12. If preferred, a UE based positioning procedure, as illustrated in FIG. 4, may use the stages 1-14 described in FIG. 3B instead of stages 1-14 shown in FIG. 4 and FIG. 3A. In that case, references below to stages 11, 13a and 14 of FIG. 4 would instead refer to stages 9, 13a and 14, respectively, of FIG. 3B.

As illustrated, at stage 15 of FIG. 4, the LSS 117 sends the UL measurements, that were receive at stage 14, to the UE 102 in an RRC Transfer Message that includes the UL measurements in, e.g., an LPP Provide Assistance Data message or an LPP Provide Location Information message. For security, Access Stratum (AS) ciphering of the LPP Provide Assistance Data message or the LPP Provide Location Information message may be used.

At stage 16, the UE 102 uses the measurements obtained at stage 13a and received at stage 15 to determine the positioning information and location of the UE 102. For example, the UE 102 determines the RTTs from the UE 102 and gNB 110 Rx-Tx Time Difference Measurements for each gNB 110 for which corresponding UL and DL measurements were provided at stage 15 and calculates the position of the UE 102, e.g., using locations of the gNBs 110, which may be received at stage 11. The location determination at stage 16 can be the same as or similar to the location determination at stage 16 in FIG. 3A.

At stage 17, for an MT-LR or a periodic or triggered MT-LR, the UE 102 reports the estimated position to the serving gNB 110-1 and the LSS 117 in an RRC Transfer Message that includes the estimated position in a LPP Provide Location Information message. For security, AS ciphering of the LPP Provide Location Information message may be used.

At stage 18, for an MT-LR or a periodic or triggered MT-LR, the LSS 117 may transfer the position of the UE 102 to an external client 130 in a User Plane Location Transfer message. Stage 18 may be similar to or the same as stage 17a in FIG. 3A. In the case of an MO-LR, UE 102 can retain the location determined at stage 16 and does not need to transfer the location to LSS 117.

At stage 19, the LSS 117 sends an NRPPa LSS ASSIGNMENT RELEASE message to the LMF 120, e.g., indicating success or failure of the positioning measurement, and optionally the positioning method(s) used.

At stage 20, the LMF 120 sends an Nlmf_Location_DetermineLocation Response message to the AMF 115, e.g., for an MO-LR or MT-LR positioning procedure. The Nlmf_Location_DetermineLocation Response message enables the AMF 115 to complete the MO-LR or MT-LR procedure as described later for FIGS. 5 and 6.

Figure 5:
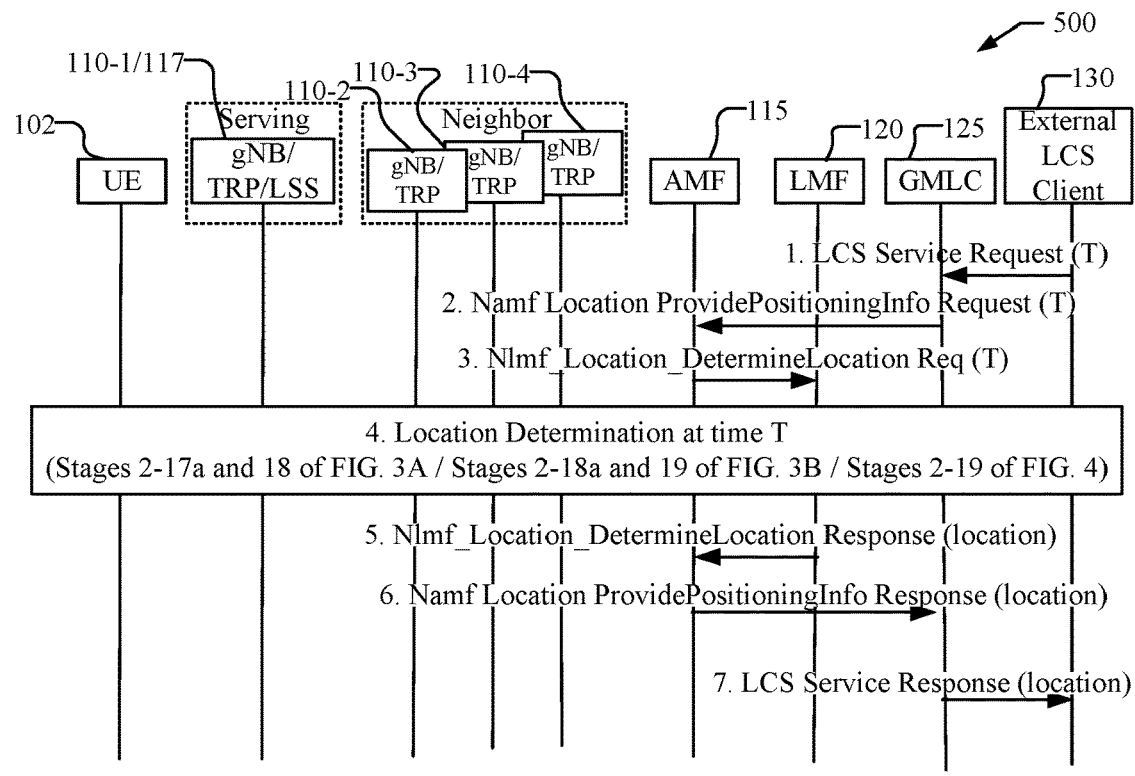
FIG. 5 is a message flow illustrating the messaging between an external client, LMF, gNBs including an LSS, and a UE for an MT-LR positioning procedure.

FIG. 5 is a message flow 500 illustrating the messaging between an external LCS client 130, the GMLC 125, the LMF 120, the gNBs 110, including the LSS 117, and the UE 102 for an MT-LR positioning procedure. In general, the 5GC MT-LR procedures are specified in 3GPP TS 23.273. The message flow 500, for example, is for a procedure applicable to a request from LCS client 130 for a single current location of the UE 102, and it is assumed that the LCS client 130 is authorized to use the location service and no privacy verification is required. The positioning procedure may be a UE-assisted or UE-based positioning procedure for RTT, as illustrated in FIGS. 3A and 3B or FIG. 4, or any other desired positioning method, which may include measurement of DL PRS, measurement of UL SRS, or measurement of both DL PRS and UL SRS.

As illustrated at stage 1 of FIG. 5, the external location services (LCS) client 130 sends a request to the GMLC 125 for a location for the UE 102. The request includes the time T at which a location for the UE 102 is to be obtained. The time T can have any of the interpretations 11-16 described previously though is preferably a time at which location measurements for the UE 102 are to be obtained or indicates that a location of the UE 102 at (or near to) the time T is to be obtained. The time T may be a local time or a global time, e.g. Coordinated Universal Time (UTC). The request may include the required QoS, Supported Geographical Area Description (GAD) shapes and client type. Preferably, the external client 130 sends the location request at stage 1 a short time (e.g. 1-5 seconds) before the occurrence of the time T. This can permit LMF 120 to schedule the transmission of UL SRS by UE 102, transmission of DL PRS by gNBs 110, measurements of DL PRS by UE 102 and measurements of UL SRS by gNBs 110, as described in FIGS. 3A, 3B and 4, before the occurrence of the time T and thereby reduce latency to a period of time between the time T and delivery of the UE 102 location to external client 130.

At stage 2, the GMLC 125 invokes the Namf_Location_ProvidePositioningInfo service operation towards the AMF 115 to request the current location of the UE. The service operation includes the time T. The service operation includes the UE 102 identifier, e.g., Subscription Permanent Identifier (SUPI), and client type and may include the required QoS and Supported GAD shapes. The service operation further includes identification information for the external client, e.g. as described for stages 1a, 1b and 7 for FIG. 3A.

As part of stage 2, if the UE 102 is in a Connection Management (CM) IDLE state, the AMF 115 initiates a network triggered Service Request procedure to establish a signaling connection with the UE (not shown in FIG. 5). The AMF 115 also selects an LMF 120 based on the available information.

At stage 3, the AMF 115 invokes the Nlmf_Location_DetermineLocation service operation towards the LMF 120 to request the current location of the UE, which may be the same as stage 1a in FIGS. 3A, 3B and 4. The service operation includes the time T and identification information for the external client 130.

At stage 4, a positioning procedure that determines the location of the UE 102 at the time T is performed, e.g., as discussed at stages 2-17a and 18 of FIG. 3A, stages 2-18a and 19 of FIG. 3B, or stages 2-19 of FIG. 4. Other positioning procedures in which a time T is requested and scheduled in advance for the location determination of UE 102 may be used, e.g., such as discussed in FIG. 8. During the location preparation phase, the LMF 120 schedules DL PRS and/or UL SRS transmission at (or around) the time T. The LMF 120 may also schedule LSS 117 support in the serving gNB 110-1 using NRPPa and requests DL measurements from the UE and UL measurements from gNBs 110-2, 110-3, and 110-4 to be sent to the LSS 117. The LMF 120 can also send information on DL PRS and UL SRS configuration to the LSS 117. When the positioning procedure is complete, LMF 120 receives a confirmation from LSS 117 as at stage 18 in FIG. 3A, stage 19 of FIG. 3B, or stage 19 in FIG. 4.

At stage 5, the LMF 120 returns the Nlmf_Location_DetermineLocation Response towards the AMF 115.

At stage 6, the AMF 115 returns the Namf_Location_ProvidePositioningInfo Response towards the GMLC 125.

At stage 7, the GMLC 125 sends the location service response to the external LCS client 130. Stages 5-7 may be used to confirm that a location was previously sent to external client 130 as part of stage 4.

Figure 6:
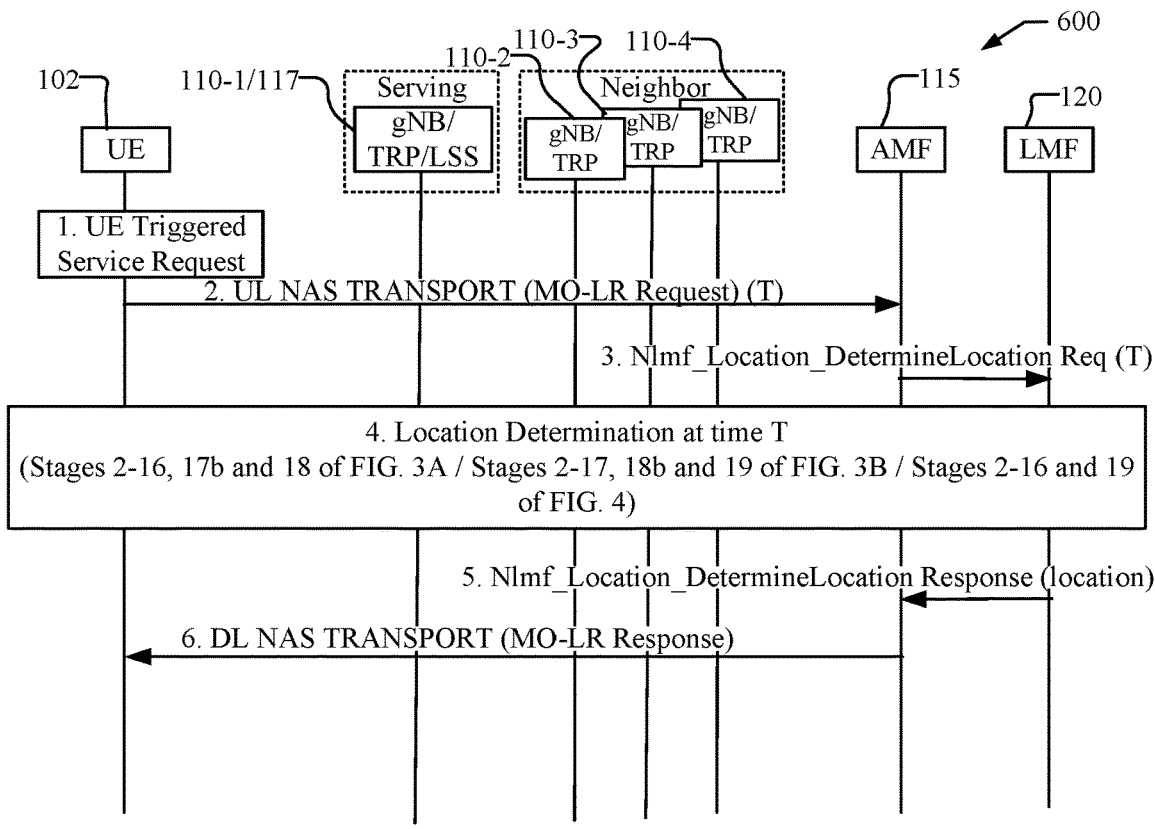
FIG. 6 is a message flow illustrating the messaging between an LMF, gNBs including an LSS, and a UE for an MO-LR positioning procedure.

FIG. 6 is a message flow 600 illustrating the messaging between the LMF 120, the gNBs 110, including the LSS 117, and the UE 102 for an MO-LR positioning procedure. In general, the 5GC MO-LR procedures are specified in 3GPP TS 23.273. The message flow 600, for example, illustrates the general network positioning requested by the UE 102 for obtaining the location related information of itself. The positioning procedure may be a UE-assisted or UE-based positioning procedure for RTT, as illustrated in FIGS. 3A and 3B or FIG. 4, or any other desired positioning method, which may include measurement of DL PRS, measurement of UL SRS, or measurement of both DL PRS and UL SRS.

At stage 1 of FIG. 6, if the UE 102 is in CM IDLE state, UE 102 instigates a UE triggered Service Request in order to establish a signaling connection with the AMF 115.

At stage 2, the UE 102 sends an MO-LR Request supplementary service message included in a UL NAS TRANSPORT message to the AMF 115. The message includes the time T at which the location of the UE 102 is to be determined and indicates that the UE 102 is requesting its own location. The time T can have any of the interpretations 11-16 described previously though is preferably a time at which location measurements for the UE 102 are to be obtained or indicates that a location of the UE 102 at (or near to) the time T is to be obtained. The time T may be, e.g., UTC or a serving gNB 110-1 local time. The MO-LR Request may optionally include an LPP positioning message. The MO-LR Request message may carry an LCS requested QoS information (e.g. accuracy, response time, LCS QoS Class). Preferably, the UE 102 sends the MO-LR Request at stage 2 a short time (e.g. 1-5 seconds) before the occurrence of the time T. This can permit LMF 120 to schedule the transmission of UL SRS by UE 102, transmission of DL PRS by gNBs 110, measurements of DL PRS by UE 102 and measurements of UL SRS by gNBs 110, as described in FIGS. 3A, 3B and 4, before the occurrence of the time T and thereby reduce latency to a period of time between the time T and delivery of the UE 102 location to UE 102.

At stage 3, the AMF 115 invokes an Nlmf_Location_DetermineLocation service operation towards the LMF 120, which may be the same as stage 1a in FIGS. 3A, 3B and 4. The service operation includes the time T.

At stage 4, a positioning procedure that determines the location of the UE 102 at the time T is performed, e.g., as discussed at stages 2-16, 17b and 18 of FIG. 3A, stages 2-17, 18b, and 19 of FIG. 3B, or stages 2-16 and 19 of FIG. 4. Other positioning procedures in which a time T is requested and scheduled in advance for the location determination of UE 102 may be used, e.g., such as discussed in FIG. 8. During the location preparation phase, the LMF 120 schedules DL PRS and/or UL SRS transmission at (or around) the time T. The LMF 120 may also schedule LSS 117 support in the serving gNB 110-1 using NRPPa and requests DL measurements from the UE 102 and UL measurements from gNBs 110-2, 110-3, and 110-4 to be sent to the LSS 117. The LMF 120 can also send information on DL PRS and UL SRS configuration to the LSS 117. When the positioning procedure is complete, LMF 120 receives a confirmation from LSS 117 as at stage 18 in FIG. 3A, stage 19 of FIG. 3B, or stage 19 in FIG. 4.

At stage 5, when the positioning procedure at stage 4 is complete, the LMF 120 returns an Nlmf_Location_DetermineLocation Response towards the AMF 115. The service operation includes the LCS Correlation identifier, and may include information about the positioning method.

At stage 6, the AMF 115 sends an MO-LR Response message included in a DL NAS TRANSPORT message to the UE 102. The MO-LR Response message may indicate that the MO-LR process is complete. In addition, AMF may record charging information.

Figure 7:
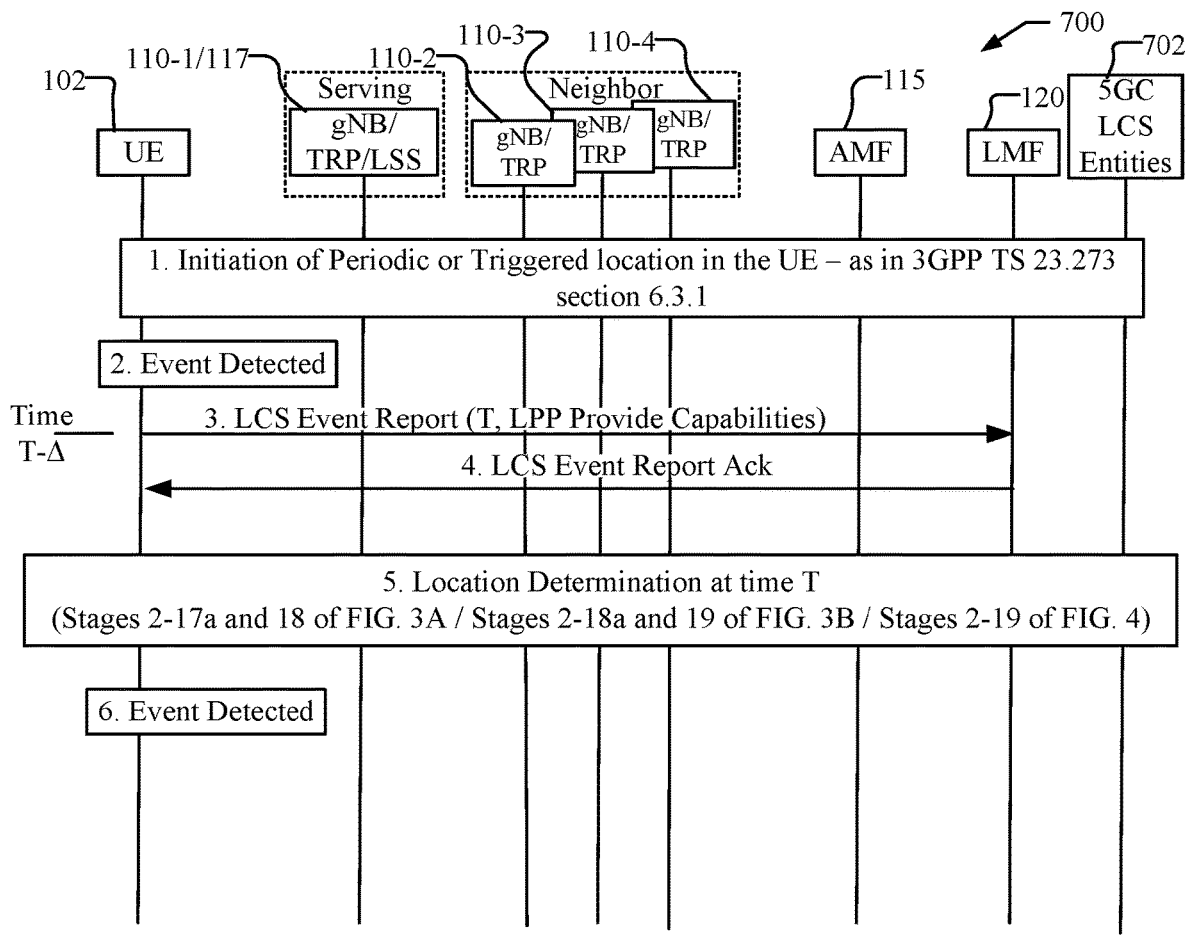
FIG. 7 is a message flow illustrating the messaging between an LMF, gNBs including an LSS, and a UE for a periodic or triggered location procedure.

FIG. 7 is a message flow 700 illustrating the messaging between the LMF 120, the gNBs 110, including the LSS 117, the UE 102, and 5GC LCS entities 702 for a periodic or triggered MT-LR location procedure. In general, the 5GC Periodic and Triggered Location procedures are specified in 3GPP TS 23.273. The message flow 700, for example, summarizes the initiation and reporting of location events for a deferred 5GC-MT-LR procedure for Periodic or Triggered Events. The positioning procedure may be a UE-assisted or UE-based positioning procedure for RTT, as illustrated in FIGS. 3A, 3B and 4, or any other desired positioning method, which may include measurement of DL PRS, measurement of UL SRS, or measurement of both DL PRS and UL SRS.

At stage 1, the initiation of periodic or triggered location for the UE 102 may be performed, e.g., as described in 3GPP TS 23.273, section 6.3.1, where the procedure is initiated by the external client 130. As part of the initiation, identification information for the external client 130 (e.g. as described for stage 1b of FIG. 3A) may be provided to UE 102 by LMF 120 along with information regarding the periodic or triggered events and the identity of LMF 120. Stage 1 is performed by external client 130, a Home HMLC (HGMLC) such as GMLC 125, AMF 115, UE 102 and LMF 120. Following stage 1, LMF 120 retains state information for the periodic or triggered MT-LR and either supports stages 3-5 in FIG. 7 or transfers the state information to another LMF 120 for support of stages 3-5 in FIG. 7. The state information can include the type of periodic or triggered location which is initiated and the identification information for the external client 130. The state information retained by LMF 120 can allow LMF 120 to validate the event report received as described later at stage 3 as being a valid event report which can enable LMF 120 to instigate the procedure described later for stage 4.

At stage 2, after a periodic or triggered location request has been initiated, the UE 102 monitors for occurrence of the requested trigger event or periodic event. For an area event or motion event, the UE 102 may monitor the requested event at intervals equal to or less than a maximum event sampling interval. Preferably, UE 102 attempts to detect an event a short time (e.g. 1-5 seconds) in advance of the occurrence of the event. For a periodic event, the UE 102 can detect the impending event by setting a timer to expire a few seconds before each periodic event. UE 102 can then equate the time T, as used in the procedure for FIGS. 3A, 3B and 4, with the occurrence of the periodic event. For an area event trigger or motion event trigger, UE 102 may need to wait until the event has occurred. In that case, UE 102 may set the time T, as used in the procedure for FIGS. 3A and 4, to a time occurrence a few seconds after the event is detected. For an event associated with preconfigured motion of an object or tool in an automated factory or warehouse (e.g. the movement of a package or a tool containing UE 102 to a new location, where the time at which the motion will be complete is known in advance), UE 102 can detect the event in advance based on the expected time at which the motion will be complete.

At stage 3, the UE 102 sends an event report message to the LMF 120 which is transferred via the serving AMF 115 and is delivered to the LMF 120 using an Namf_Communication_N1MessageNotify service operation, which may be the same as stage 1b in FIGS. 3A, 3B and 4. For a periodic event, the UE 102 may send the event report message at periodic intervals to trigger each periodic location. As described for stage 2, the event report message is sent ahead of each periodic reporting time T, at which the location of the UE 102 is to be determined, and includes the time T. For example, the event report message may be sent at time T−Δ, which may be 1-5 seconds before the time T, or sufficient time for the positioning preparation phase. In the case of trigger events, the UE 102 may send the event report message at a time T−Δ, which may be 1-5 seconds before the time T, or sufficient time for the positioning preparation phase, in the case that UE 102 knows the event time T in advance as discussed for stage 2. The time T may be, e.g., UTC or serving gNB 110-1 local time. The time T can have any of the interpretations 11-16 described previously though is preferably a time at which location measurements for the UE 102 are to be obtained or indicates that a location of the UE 102 at (or near to) the time T is to be obtained. The event report may indicate the type of event being reported (e.g. whether a normal event or expiration of a maximum reporting interval) and may include an embedded positioning message which includes any location measurements or location estimate already obtained. The AMF 115 forwards the event report to the serving LMF 120 based on a deferred routing identifier included by UE 102 which indicates the LMF 120. The UE 102 may also include the identification information for the external client 130, whether location estimates are to be reported and if so the location QoS in the event report. When forwarding the event report message to the LMF 120, the AMF 115 may include the deferred routing identifier received. The deferred routing identifier can assist the LMF 120 in identifying the periodic or triggered location session.

At stage 4, when the LMF 120 receives the event report and if it can handle this event report, the LMF 120 updates the status of event reporting (e.g. the number of event reports so far received from the UE 102 and/or the duration of event reporting so far) and returns a supplementary services acknowledgment for the event report to the UE 102, which may be the same as stage 1c in FIGS. 3A, 3B and 4.

At stage 5, a positioning procedure that determines the location of the UE 102 at the time T is performed, e.g., as discussed at stages 2-17a and 18 of FIG. 3A, stages 2-18a and 19 of FIG. 3B, or stages 2-19 of FIG. 4. Other positioning procedures in which a time T is requested and scheduled in advance for the location determination of UE 102 may be used, e.g., such as discussed in FIG. 8. During the location preparation phase, the LMF 120 schedules DL PRS and/or UL SRS transmission at (or around) the time T, which may support on demand PRS. The LMF 120 may also schedule LSS 117 support in the serving gNB 110-1 using NRPPa and requests DL measurements from the UE 102 and UL measurements from gNBs 110-2, 110-3, and 110-4 to be sent to the LSS 117. The LMF 120 can also send information on DL PRS and UL SRS configuration to the LSS 117.

At stage 6, the UE 102 continues to monitor for further periodic or trigger events as in stage 2 and instigates stages 3-5 each time a trigger event is detected.

As discussed in stage 3, if the trigger event is a periodic reporting time T, the UE 102 may send the event report message prior to the periodic reporting time T and include the time T in the event report message so that the LMF 120 can schedule the DL PRS and/or UL SRS transmission at the time T. If the trigger event is something other than a periodic reporting time, however, the trigger events may be used to schedule the location in advance of some known time T. For example, the trigger may be based on expected movement of the UE. By way of illustration, in a factory or warehouse, a UE 102 may be attached to a tool or package that is expected to be moved to a new position P. The location, thus, may be scheduled by the UE 102 to occur just after the arrival of the UE 102 at position P is expected. The trigger, thus, may be the command or decision to move the UE 102 to a new position P, and the time T would be the expected time of arrival at position P, e.g., plus a small buffer time delta.

In other implementations, the UE movement may not be known or expected in advance. For example, existing MT-LR triggers in 3GPP TS 23.273 include a change of area and UE movement by more than some threshold straight line distance. These triggers, however, may not be predictable in advance, and accordingly, the UE 102 may select a reporting time T that is some small time after the trigger is detected. This implementation still reduces latency, which has the benefit of providing location to an external client 130 (or the UE 102) at a reduced time interval following the location measurements, which would make the location more accurate and more reliable at the time of reception.

Figure 8:
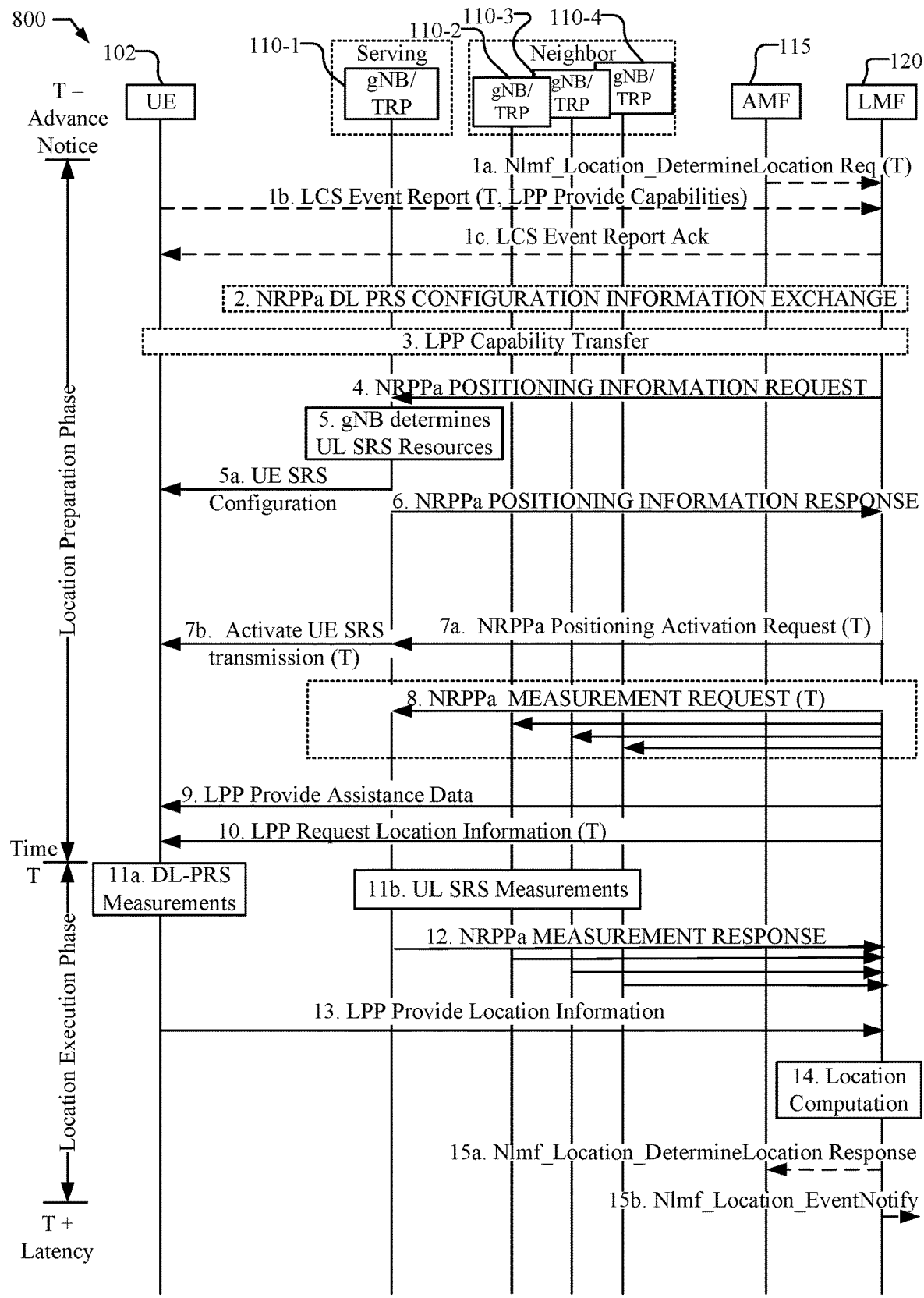
FIG. 8 is a message flow illustrating the messaging between the LMF, gNBs, and a UE for a UE assisted positioning procedure, such as multi-RTT.

FIG. 8 is a message flow 800 illustrating the messaging between the LMF 120, the gNBs 110, and the UE 102 for a UE assisted positioning procedure, such as multi-RTT, in which the time T for location determination of the UE 102 is scheduled in advance, but an LSS 117 is not used. The message flow 800 is similar to the message flow 300 illustrated in FIG. 3A, without messages related to the LSS 117. It should be understood that a message flow may be used with a UE based positioning procedure without use of an LSS 117.

At stages 1a, 1b, 1c and 2-6 in FIG. 8 may be the same as discussed in FIG. 3A. Stages 7 and 8 from FIG. 3A need not be performed in message flow 800.

Stage 7a in FIG. 8 may be similar to stage 9a in FIG. 3A, in which the LMF 120 sends an NRPPa Positioning Activation Request message to the serving gNB 110-1 to activate UL SRS transmission from UE 102. The NRPPa Positioning Activation Request message includes the time T at which the location for the UE 102 is to be measured. At stage 7b, which may be similar to stage 9b in FIG. 3A, the serving gNB 110-1 activates the UE SRS transmission, indicating the time T. The UE 102 will wait until time T to begin the UL SRS transmission. The serving gNB 110-1 may return an NRPPa acknowledgment to the LMF 120 (not shown in FIG. 8).

At stage 8, the LMF 120 provides the UL information to the selected gNBs 110 in NRPPa MEASUREMENT REQUEST messages (one message per gNB 110). The messages include the time T to perform the UL measurements. The messages include all information required to enable the gNBs/TRPs 110 to perform the UL measurements.

At stage 9, the LMF 120 sends a LPP Provide Assistance Data message to the UE 102. The message includes any required assistance data for the UE 102 to perform the necessary DL PRS measurements.

At stage 10, the LMF 120 sends a LPP Request Location Information message to the UE 102 to request Multi-RTT measurements. The Request Location Information message includes the time T. The Request Location Information message may further indicate the type of position method to be used, e.g., UE assisted multi-RTT.

At stage 11a, at or near time T, the UE 102 performs the DL PRS measurements from all gNBs 110 provided in the assistance data at stage 9.

At stage 11b, at or near time T, each gNB 110 configured at stage 8 measures the UE SRS transmissions from the UE 102.

At stage 12, each of the neighboring gNBs 110-2, 110-3, and 110-4 reports the UE SRS measurements to the LMF 120 in NRPPa Measurement Response messages.

At stage 13, the UE 102 reports the DL PRS measurements for Multi-RTT to the LMF 120 in a LPP Provide Location Information message.

At stage 14, the LMF 120 uses received measurements from stages 12 and 13 to determine the positioning information and location of the UE 102. For example, the LMF 120 determines the RTTs from the UE 102 and gNB 110 Rx-Tx Time Difference Measurements for each gNB 110 for which corresponding UL and DL measurements were provided at stages 12 and 13 and calculates the position of the UE 102.

At stage 15a, the LMF 120 returns the Nlmf_Location_DetermineLocation Response towards the AMF 115 to return the current location of the UE, e.g., for an MO-LR or MT-LR positioning procedure. The service operation includes the LCS Correlation identifier, the location estimate, its age and accuracy and may include information about the positioning method.

At stage 15b, for a periodic or triggered location, the LMF 120 invokes an Nlmf_Location_EventNotify service operation towards an external client via a GMLC 125 with an indication of the type of event being reported, the GMLC contact address and LDR reference number, the identification of the LMF 120 if this is a serving LMF, and any location estimate obtained at stage 14.

Figure 9:
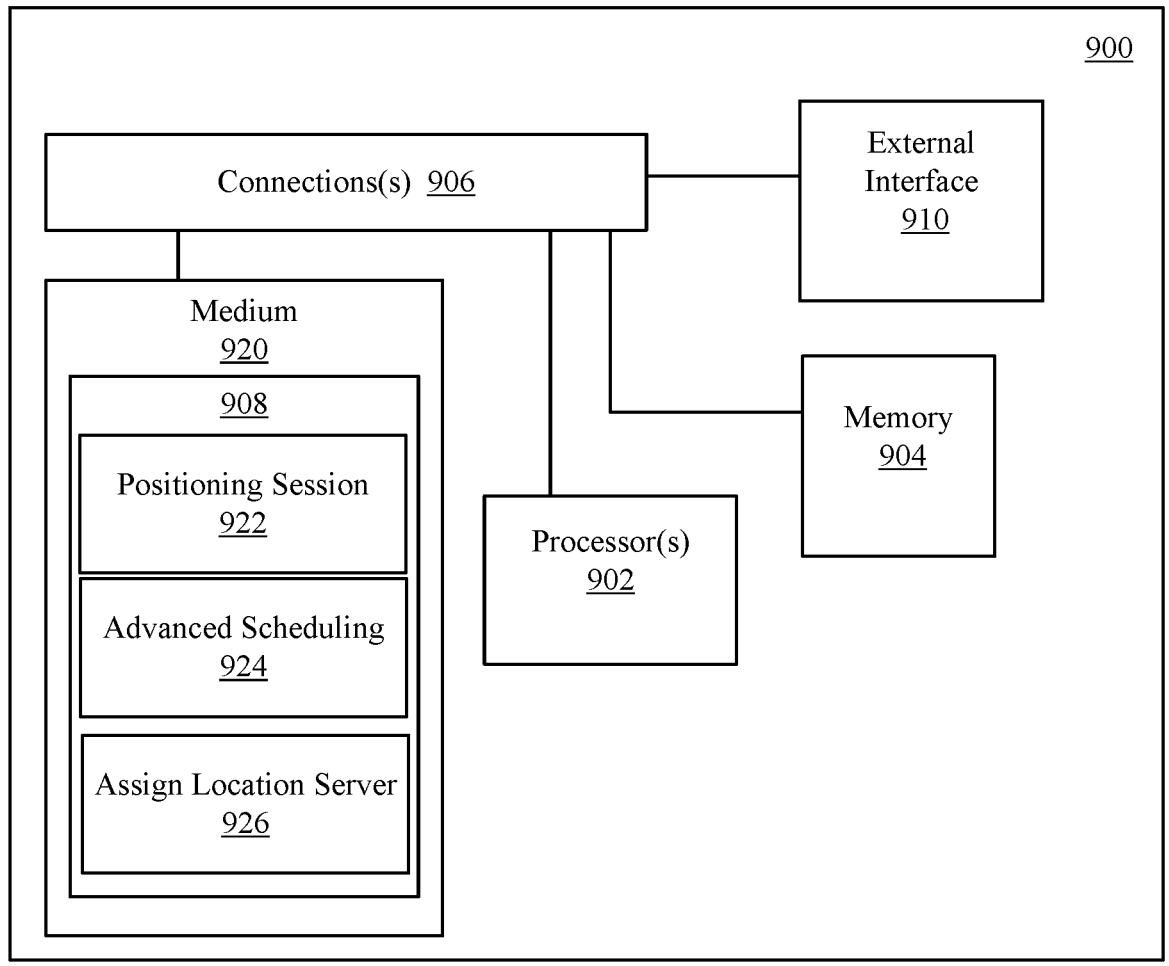
FIG. 9 shows a schematic block diagram illustrating certain exemplary features of an location management function that is configured to schedule location determination of a UE in advance and to assign a location server associated with serving gNB to determine a location of the UE.

FIG. 9 shows a schematic block diagram illustrating certain exemplary features of a location management function (LMF) 900, e.g., LMF 120, shown in FIGS. 1 and 2, that is configured to schedule location determination of the UE 102 in advance and to optionally assign a location server associated with serving gNB to determine a location of the UE 102. LMF 900 may, for example, include one or more processors 902, memory 904, an external interface 910 (e.g., wireline or wireless network interface to base stations and/or entities in the core network), which may be operatively coupled with one or more connections 906 (e.g., buses, lines, fibers, links, etc.) to non-transitory computer readable medium 920 and memory 904. In certain example implementations, all or part of LMF 900 may take the form of a chipset, and/or the like.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of LMF 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in LMF 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in LMF 900 is merely exemplary, and as such the functionality of the modules and/or data structures may be combined, separated, and/or be structured in different ways depending upon the implementation of the LMF 900.

The medium 920 and/or memory 904 may include a positioning session module 922 that when implemented by the one or more processors 902 configures the one or more processors 902 to engage in a positioning session for the UE. For example, the one or more processors 902 may be configured to engage in a positioning session by receiving positioning messages for the UE, e.g., from the UE or an externa client, via the external interface 910, that may include a time T at which the position of the UE is to be measured. The one or more processors 902 may be configured to send, via the external interface 910, request messages to entities, such as base stations and/or the UE to schedule location measurements for the UE.

The medium 920 and/or memory 904 may include an advanced scheduling module 924 that when implemented by the one or more processors 902 configures the one or more processors 902 to schedule location measurements in advance of when the location of the UE is to be determined. For example, the one or more processors 902 may be configured to receive the time T when the location of the UE is to be determined, e.g., from a positioning message, and to scheduling location measurements from base stations and/or the UE in advance of the time T. For example, the one or more processors 902 may be configured to send a message to the serving base station, via the external interface 910, to enable the serving base station to activate transmission of UL SRS signals by the UE at or near to the time T, or to the UE to enable measurement of DL PRS signals by the UE at or near the time T. The one or more processors 902 may be configured to include the time T in the request messages sent to entities, such as base stations and/or the UE to schedule location measurements for the UE.

The medium 920 and/or memory 904 may include an assign location server module 926 that when implemented by the one or more processors 902 configures the one or more processors 902 to send a message to the serving base station, via the external interface 910, to assign a location server that is associated with the serving base station. The location server, for example, may be the LSS 117 from FIGS. 1 and 2. The one or more processors 902 may be configured to include in the assignment message information for the plurality of entities and the location measurements, such as the time T, an identification of each of the entities that will perform positioning measurements, an identification of the location measurements; configuration information for DL signals transmitted by the base stations, wherein at least some of the location measurements are obtained by the UE using the DL signals when the plurality of entities includes the UE, configuration information for UL signals transmitted by the UE, wherein at least some of the location measurements are obtained by at least one base station using the UL signals when the plurality of entities includes the at least one base station, an identification of an external client for the location of the UE, or some combination thereof. The one or more processors 902 may be configured to include, in addition to the time T, the identity of the location server, in the request messages sent to entities, such as base stations and/or the UE to schedule location measurements for the UE. The one or more processors 902 may be further configured to receive a release message, via the external interface 910, from the serving base station after the location of the UE has been measured at the time T.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program code 908. For example, the non-transitory computer readable medium including program code 908 stored thereon may include program code 908 to support scheduling location determination of the UE 102 in advance and assignment of a location server associated with serving gNB in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include an external interface 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable program code 908 stored thereon, which if executed by one or more processors 902 may be operatively enabled to perform all or portions of the example operations as described herein. Computer readable medium 920 may be a part of memory 904.

Figure 10:
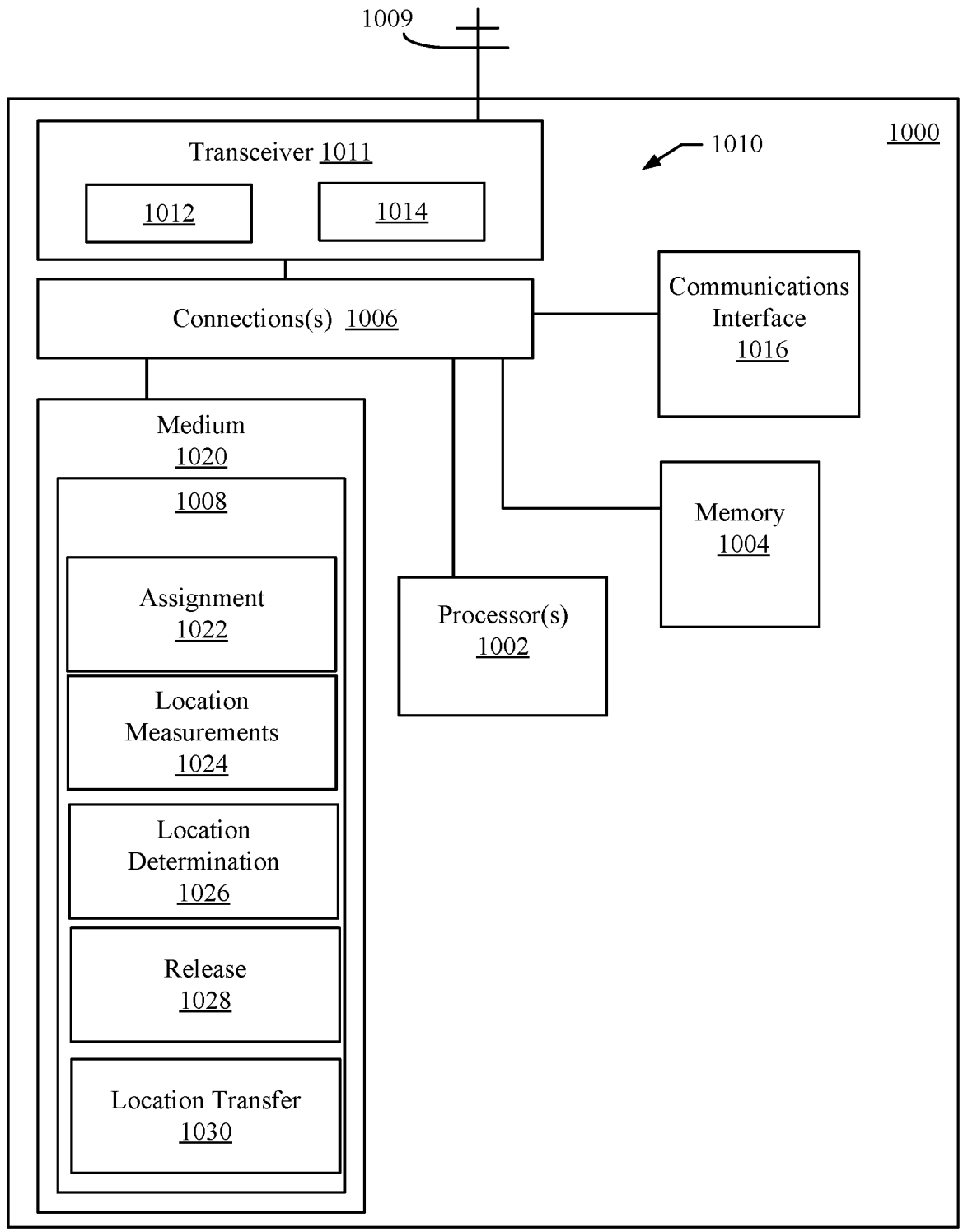
FIG. 10 shows a schematic block diagram illustrating certain exemplary features of a location server that is associated with a serving base station for a UE and is configured to receive location measurements and determine a location of the UE.

FIG. 10 shows a schematic block diagram illustrating certain exemplary features of a location server 1000, e.g., LSS 117, shown in FIGS. 1 and 2, that is associated with the serving base station for the UE 102 and is configured to receive location measurements and determine a location of the UE 102 as described herein. The location server 1000 is associated with the serving base station, e.g., gNB 110-1, for the UE as it may be internal to the serving gNB, part of a central unit (CU) for the serving gNB, connected to the CU for the serving gNB, or external to and connected to the serving gNB.

The location server 1000 may, for example, include one or more processors 1002, memory 1004, an external interface 1010 that may include a wireless transceiver 1011 and/or a communications interface 1016, which may be operatively coupled with one or more connections 1006 (e.g., buses, lines, fibers, links, etc.) to non-transitory computer readable medium 1020 and memory 1004. The wireless transceiver 1011 may be a transceiver for communicating with the UE 102, e.g., if the location server is internal to the serving gNB 110-1. The wireless transceiver 1011 may include a transmitter 1012 and receiver 1014 coupled to one or more antennas 1009 for transmitting (e.g., on one or more downlink channels) and/or receiving (e.g., on one or more uplink channels) wireless signals and transducing signals from the wireless signals to wired (e.g., electrical and/or optical) signals and from wired (e.g., electrical and/or optical) signals to the wireless signals. The communications interface 1016 may be wireline or wireless network interface to the serving gNB 110-1 or CU for the serving base station, e.g., if the location server 1000 is part of a CU for the serving gNB, connected to the CU for the serving gNB, or external to and connected to the serving gNB, and may also be for entities in the core network. In certain example implementations, all or part of location server 1000 may take the form of a chipset, and/or the like.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of location server 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in location server 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors.

A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in location server 1000 is merely exemplary, and as such the functionality of the modules and/or data structures may be combined, separated, and/or be structured in different ways depending upon the implementation of the location server 1000.

The medium 1020 and/or memory 1004 may include an assignment module 1022 that when implemented by the one or more processors 1002 configures the one or more processors 1002 to receive, via the communications interface 1016, an assignment message from the LMF 120 that includes a time T at which the location of the UE 102 is to be determined. The assignment message enables the location server 1000 to function as the location server 1000 for the UE 102 to determine the location of the UE 102 at time T. The assignment message may include information for a plurality of entities and the location measurements in the assignment message. For example, the information may include at least one of: the time at which the location for the UE is to be measured; an identification of each of the plurality of entities; an identification of the location measurements; configuration information for downlink (DL) signals transmitted by base stations, wherein at least some of the location measurements are obtained by the UE using the DL signals when the plurality of entities includes the UE; configuration information for uplink (UL) signals transmitted by the UE, wherein at least some of the location measurements are obtained by at least one base station using the UL signals when the plurality of entities includes the at least one base station; an identification of an external client for the location of the UE; or some combination of these.

The one or more processors 1002 may be further configured to return, via the communications interface 1016, an acknowledgement to the LMF indicating that the assignment is accepted.

The medium 1020 and/or memory 1004 may include a location measurements module 1024 that when implemented by the one or more processors 1002 configures the one or more processors 1002 to receive, via the external interface 1010, location measurements for the UE 102 from the plurality of entities, such as the UE 102 and neighboring base stations. The location measurements are scheduled in the plurality of entities by the LMF and are obtained by the plurality of entities at or near to the time T. The location measurements, for example, may be DL-TDOA, DL-AOD, A-GNSS, WLAN, RTT, multi-cell RTT or some combination of these, received from the UE 102 and/or UL-TDOA, UL-AOA, RTT, multi-cell RTT or some combination, received from one or more base stations.

The medium 1020 and/or memory 1004 may include a location determination module 1026 that when implemented by the one or more processors 1002 configures the one or more processors 1002 to enable a location for the UE 102 to be determined by the location server 1000 or by the UE 102 based on the location measurements and at least one position method. For example, example, the one or more processors 1002 may be configured determine the location of the UE 102 based on the received location measurements. In another example, the one or more processors 1002 may be configured to send, e.g., via the external interface 1010, location measurements received from other base stations to the UE 102 and to receive the location from the UE after the UE determines the location from the location measurements.

The medium 1020 and/or memory 1004 may include a release module 1028 that when implemented by the one or more processors 1002 configures the one or more processors 1002 to send, via the communications interface 1016 a release message to the LMF releasing the assignment of the location server after the location of the UE 102 has been determined.

The medium 1020 and/or memory 1004 may include a location transfer module 1030 that when implemented by the one or more processors 1002 configures the one or more processors 1002 to send, via the external interface 1010, the location of the UE 102 to an external client or the UE 102. The one or more processors may be configured to send the location to the external client based on user plane protocols.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program code 1008. For example, the non-transitory computer readable medium including program code 1008 stored thereon may include program code 1008 to support scheduling location determination of the UE 102 in advance and assignment of a location server associated with serving gNB in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include an external interface 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable program code 1008 stored thereon, which if executed by one or more processors 1002 may be operatively enabled to perform all or portions of the example operations as described herein. Computer readable medium 1020 may be a part of memory 1004.

Figure 11:
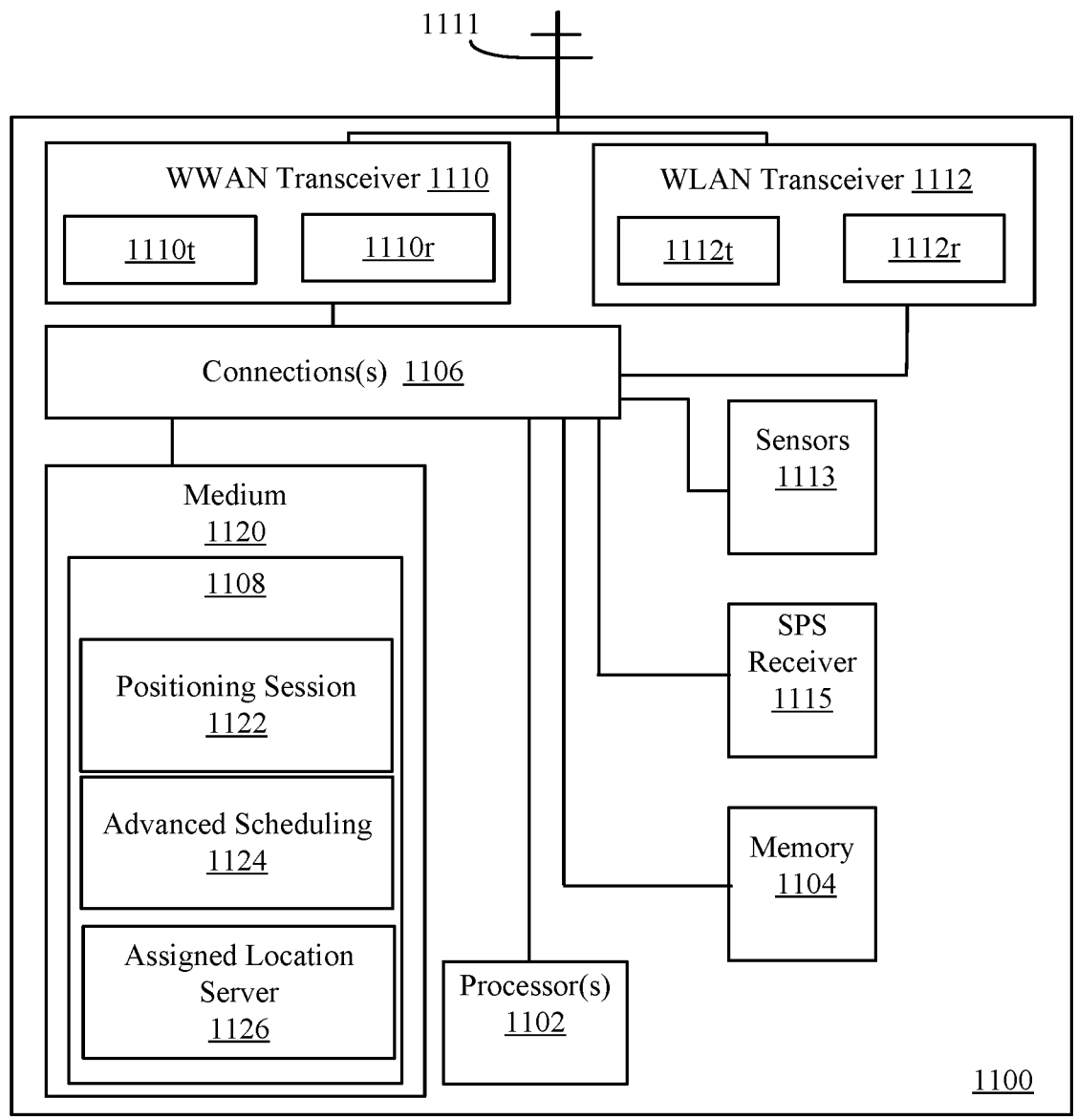
FIG. 11 shows a schematic block diagram illustrating certain exemplary features of a UE that is configured to support scheduling location determination of the UE in advance and assignment of a location server associated with serving base station.

FIG. 11 shows a schematic block diagram illustrating certain exemplary features of a UE 1100, e.g., which may be UE 102 shown in FIG. 1, that is configured to support scheduling location determination of the UE 102 in advance and assignment of a location server associated with serving base station, as discussed herein. The UE 1100, for example, may perform the signal flows shown in FIGS. 3A, 3B, 3C, 4, 5, 6, 7, and 8 and the process flow shown in FIG. 14 and algorithms disclosed herein. The UE 1100 may, for example, include one or more processors 1102, memory 1104, an external interface such as at least one wireless transceiver (e.g., wireless network interface) illustrated as Wireless Wide Area Network (WWAN) transceiver 1110 and Wireless Local Area Network (WLAN) transceiver 1112, SPS receiver 1115, and one or more sensors 1113, which may be operatively coupled with one or more connections 1106 (e.g., buses, lines, fibers, links, etc.) to non-transitory computer readable medium 1120 and memory 1104. The wireless transceiver (e.g. WWAN transceiver 1110 and/or WLAN transceiver 1112) may further include transceivers for Wireless Personal Area Network (WPAN), Wireless Metropolitan Area Network (WMAN), etc. The SPS receiver 1115, for example, may receive and process SPS signals from SVs 190 shown in FIG. 1. The one or more sensors 1113, for example, may include a barometer and/or an inertial measurement unit (IMU) that may include one or more accelerometers, one or more gyroscopes, a magnetometer, etc. The UE 1100 may further include additional items, which are not shown, such as a user interface that may include e.g., a display, a keypad or other input device, such as virtual keypad on the display, through which a user may interface with the UE. In certain example implementations, all or part of UE 1100 may take the form of a chipset, and/or the like.

The at least one wireless transceiver may be a transceiver 1110 for a WWAN communication system and a transceiver 1112 for a WLAN communication system, or may be a combined transceiver for both WWAN and WLAN. The WWAN transceiver 1110 may include a transmitter 1110t and receiver 1110r coupled to one or more antennas 1111 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 1112 may include a transmitter 1112t and receiver 1112r coupled to one or more antennas 1111 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 1110t and 1112t may include multiple transmitters that may be discrete components or combined/integrated components, and/or the receivers 1110r and 1112r may include multiple receivers that may be discrete components or combined/integrated components. The WWAN transceiver 1110 may be configured to communicate signals (e.g., with base stations and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio (NR) may use mm-wave frequencies and/or sub-6 GHz frequencies. The WLAN transceiver 1112 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The transceivers 1110 and 1112 may be communicatively coupled to a transceiver interface, e.g., by optical and/or electrical connection, which may be at least partially integrated with the transceivers 1110 and 1112.

In some embodiments, UE 1100 may include antenna 1111, which may be internal or external. UE antenna 1111 may be used to transmit and/or receive signals processed by wireless transceivers 1110 and 1112. In some embodiments, UE antenna 1111 may be coupled to wireless transceivers 1110 and 1112. In some embodiments, measurements of signals received (transmitted) by UE 1100 may be performed at the point of connection of the UE antenna 1111 and wireless transceivers 1110 and 1112. For example, the measurement point of reference for received (transmitted) RF signal measurements may be an input (output) terminal of the receiver 1110r (transmitter 1110t) and an output (input) terminal of the UE antenna 1111. In a UE 1100 with multiple UE antennas 1111 or antenna arrays, the antenna connector may be viewed as a virtual point representing the aggregate output (input) of multiple UE antennas. In some embodiments, UE 1100 may measure received signals including signal strength and TOA measurements and the raw measurements may be processed by the one or more processors 1102.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of UE 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in UE 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in UE 1100 is merely exemplary, and as such the functionality of the modules and/or data structures may be combined, separated, and/or be structured in different ways depending upon the implementation of the UE 1100.

The medium 1120 and/or memory 1104 may include a positioning session module 1122 that when implemented by the one or more processors 1102 configures the one or more processors 1102 to engage in a positioning session for the UE. For example, the one or more processors 1102 may be configured to engage in a positioning session by receiving a location request message sent from an LMF, via the transceiver 1110, that requests location measurements by the UE at or near to a time T. The one or more processors 1102 may be configured to obtain the location measurements, and may be configured to send the location measurements or a location estimate to a location server. The one or more processors 1102 may be configured to receive, via the transceiver 1110, assistance data from the LMF, that includes, e.g., configuration information for DL PRS transmitted by a plurality of based stations at or near to the time T, and to obtain the location measurements by measuring the DL PRSs at or near to the time, based on the configuration information. The one or more processors 1102 may be configured to determine the location of the UE 102 based on the location measurements. The one or more processors 1102 may be configured to receive, via the transceiver 1110, a request to transmit UL SRS at or near the time T and to transmit the UL SRS accordingly. The one or more processors 1102 may be configured to receive location measurements from the location server, via the transceiver 1110, and to determine the location of the UE 102 based on the location measurements obtained by the UE 102 and location measurements received from the location server.

The medium 1120 and/or memory 1104 may include an advanced scheduling module 1124 that when implemented by the one or more processors 1102 configures the one or more processors 1102 to receive scheduled location measurements in advance of when the location of the UE is to be determined, at a time T, and to perform the locations measurements at or near time T. The one or more processors 1102 may be further configured to receive scheduled UL SRS and to transmit the UL SRS at the time T.

The medium 1120 and/or memory 1104 may include an assigned location server module 1126 that when implemented by the one or more processors 1102 configures the one or more processors 1102 to send and receive messages to a location server that is associated with the serving base station.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program code 1108. For example, the non-transitory computer readable medium including program code 1108 stored thereon may include program code 1108 to support scheduling location determination of the UE 102 in advance and assignment of a location server associated with serving gNB in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a wireless transceiver 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable program code 1108 stored thereon, which if executed by one or more processors 1102 may be operatively enabled to perform all or portions of the example operations as described herein. Computer readable medium 1120 may be a part of memory 1104.

Figure 12:
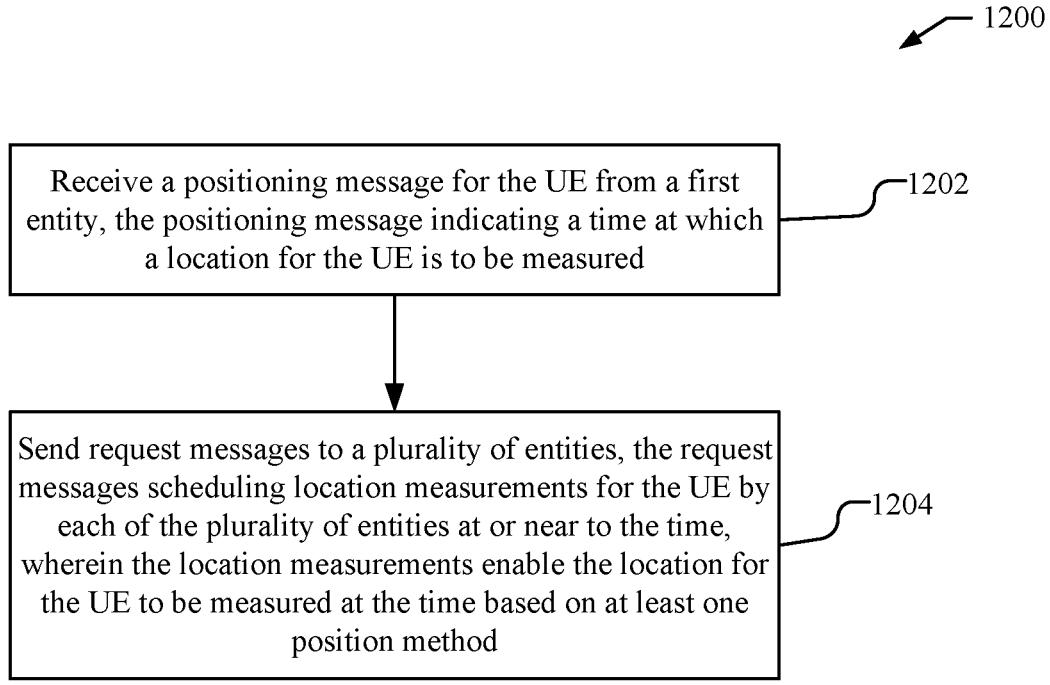
FIG. 12 shows a flowchart for an exemplary method for supporting a location session for a UE performed by an LMF.

FIG. 12 shows a flowchart for an exemplary method 1200 for supporting a location session for a user equipment (UE), such as the UE 102, performed by a Location Management Function (LMF), such as LMF 120 shown in FIG. 1, in a manner consistent with disclosed implementations.

At block 1202, the LMF receives a positioning message for the UE from a first entity, the positioning message indicating a time (e.g. a time T as described for FIGS. 3A-7) at which a location for the UE is to be measured, e.g., as discussed at stages 1a or 1b of FIG. 3A, 3B, 4, or 8. For example, in one implementation, the first entity may be the UE, where the positioning message comprises an event report, where the event report is received prior to the time, and where the event report indicates a periodic event expected at the time, a triggered event at a current time, or a triggered event expected at or near to the time, e.g., as discussed at stages 1b in FIG. 3A, 3B, 4, or 8, and stage 3 of FIG. 7. A means for receiving a positioning message for the UE from a first entity, the positioning message indicating a time at which a location for the UE is to be measured may include, e.g., the external interface 910 and one or more processors 902 with dedicated hardware or implementing executable code or software instructions in memory 904 and/or medium 920 in LMF 900, such as the positioning session module 922, shown in FIG. 9.

At block 1204, the LMF sends request messages to a plurality of entities, the request messages scheduling location measurements for the UE by each of the plurality of entities at or near to the time, where the location measurements enable the location for the UE to be measured at the time based on at least one position method, e.g., as discussed at stages 10 or 12 of FIG. 3A or 4, and stage 8 and 10 of FIG. 8. A means for sending request messages to a plurality of entities, the request messages scheduling location measurements for the UE by each of the plurality of entities at or near to the time, wherein the location measurements enable the location for the UE to be measured at the time based on at least one position method may include, e.g., the external interface 910 and one or more processors 902 with dedicated hardware or implementing executable code or software instructions in memory 904 and/or medium 920 in LMF 900, such as the positioning session module 922 and the advanced scheduling module 924, shown in FIG. 9. The plurality of entities, for example, includes the UE and the at least one position method may be DL-TDOA, DL-AOD, A-GNSS, Wireless Local Area Network (WLAN, also referred to as WiFi), RTT, multi-cell RTT or some combination of these. The plurality of entities, for example, may include at least one base station and the at least one position method comprises UL-TDOA, UL-AOA, RTT, multi-cell RTT or some combination of these. The at least one base station for example, may include a serving base station for the UE (e.g. a gNB 110-1), a plurality of neighboring base stations for the UE (e.g. gNBs 110); or both of these. The LMF may further send a message to the serving base station, where the message enables the serving base station to activate transmission of uplink SRS signals by the UE at or near to the time, where at least some of the location measurements are obtained by the at least one base station using the uplink SRS signals, e.g., as discussed at stage 9a of FIG. 3A or 4, and stage 7a of FIG. 8. A means for sending a message to the serving base station, wherein the message enables the serving base station to activate transmission of uplink SRS signals by the UE at or near to the time, wherein at least some of the location measurements are obtained by the at least one base station using the uplink SRS signals may include, e.g., the external interface 910 and one or more processors 902 with dedicated hardware or implementing executable code or software instructions in memory 904 and/or medium 920 in LMF 900, such as the positioning session module 922 and the advanced scheduling module 924, shown in FIG. 9.

In one implementation, the LMF may send an assignment message to a serving base station for the UE (e.g. a gNB 110-1), where the assignment message enables the serving base station to assign a location server associated with the serving base station, e.g., as discussed at stage 7 of FIGS. 3A and 4. The location server receives the location measurements from at least some of the plurality of entities and enables the location for the UE to be computed by the location server or by the UE based on the location measurements and the at least one position method. For example, the serving base station may be a New Radio (NR) NodeB (e.g. a gNB 110-1), wherein the location server is internal to the gNB, part of a central unit (CU) for the gNB, connected to the CU for the gNB, or external to and connected to the gNB. The location server, for example, may be the LSS 117 shown in FIGS. 1 and 2. In one implementation, the location server receives the location measurements from each of the plurality of entities, computes the location for the UE based on the location measurements and the at least one position method and sends the location to an external client (e.g. as described for FIG. 3A). A means for sending an assignment message to a serving base station for the UE, wherein the assignment message enables the serving base station to assign a location server associated with the serving base station may include, e.g., the external interface 910 and one or more processors 902 with dedicated hardware or implementing executable code or software instructions in memory 904 and/or medium 920 in LMF 900, such as the assign location server module 926, shown in FIG. 9. In some implementations, the LMF may include information for the plurality of entities and the location measurements in the assignment message. For example, the information may include at least one of: the time at which the location for the UE is to be measured; an identification of each of the plurality of entities; an identification of the location measurements; configuration information for downlink (DL) signals transmitted by base stations (e.g. DL PRS signals), wherein at least some of the location measurements are obtained by the UE using the DL signals when the plurality of entities includes the UE; configuration information for uplink (UL) signals transmitted by the UE (e.g. UL SRS signals), wherein at least some of the location measurements are obtained by at least one base station using the UL signals when the plurality of entities includes the at least one base station; an identification of an external client for the location of the UE; or some combination of these. In one implementation, the LMF includes in each request message at least one of: the time at which the location for the UE is to be measured; an identification of the location server; or both of these. The LMF may further receive a release message from the serving base station after the location for the UE has been measured at the time, e.g., as discussed at stage 18 of FIG. 3A and stage 19 of FIG. 4. The release message, for example, may include an indication of success or failure and/or the positioning method used. A means for receiving a release message from the serving base station after the location for the UE has been measured at the time may include, e.g., the external interface 910 and one or more processors 902 with dedicated hardware or implementing executable code or software instructions in memory 904 and/or medium 920 in LMF 900, such as the assign location server module 926, shown in FIG. 9.

Figure 13:
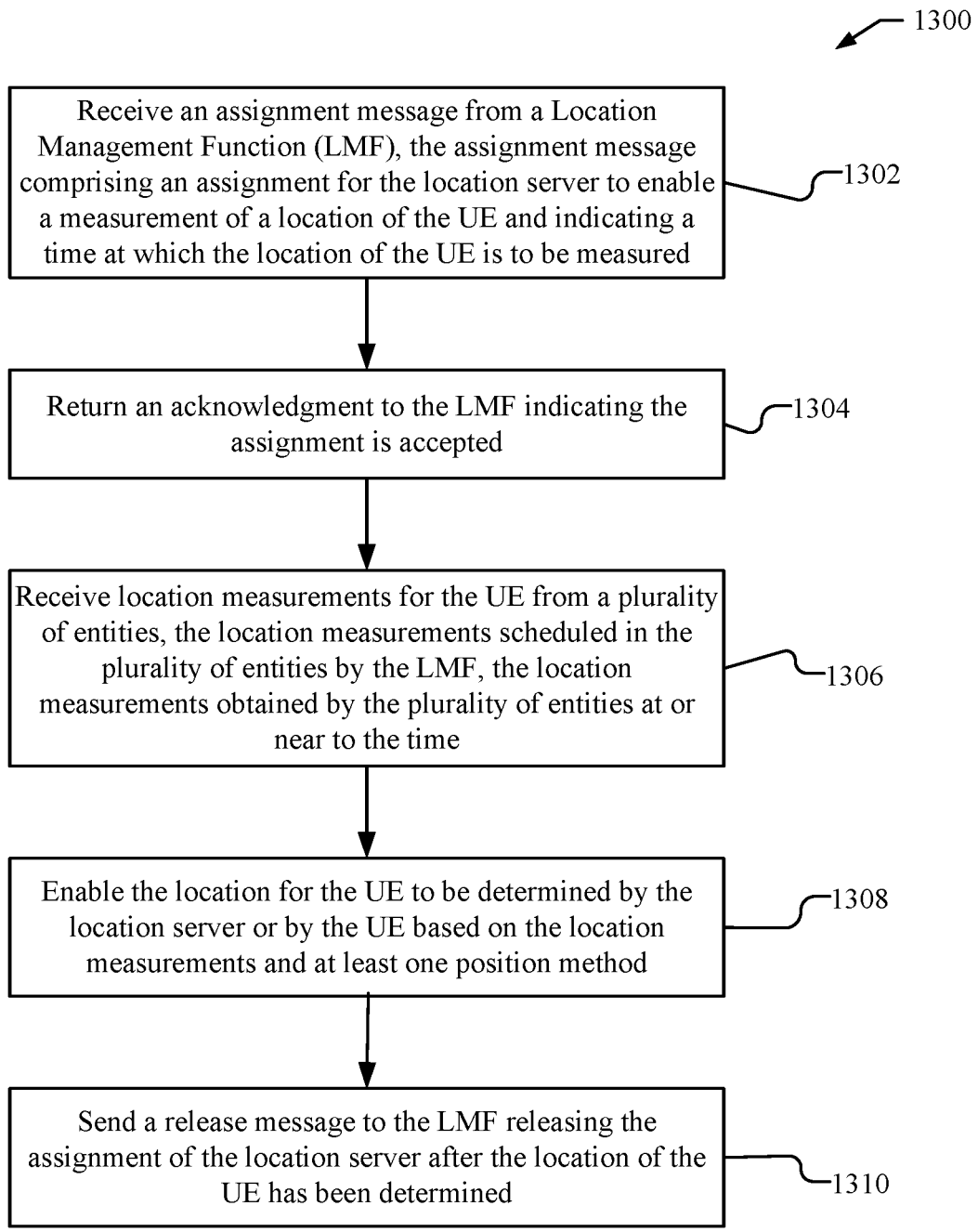
FIG. 13 shows a flowchart for an exemplary method for supporting a location session for a UE performed by a location server.

FIG. 13 shows a flowchart for an exemplary method 1300 for supporting a location session for a user equipment (e.g. UE 102) performed by a location server, such as LSS 117 shown in FIGS. 1 and 2, in a manner consistent with disclosed implementations.

At block 1302, the location server receives an assignment message from a Location Management Function (e.g. LMF 120), the assignment message comprising an assignment for the location server to enable a measurement of a location of the UE and indicating a time (e.g. a time T as described for FIGS. 3A-7) at which the location of the UE is to be measured, e.g., as discussed at stage 7 of FIGS. 3A, 3B, and 4. The location server, for example, may be internal to a serving New Radio (NR) NodeB (e.g. gNB 110-1) for the UE, part of a central unit (CU) for the serving gNB, connected to the CU for the serving gNB, or external to and connected to the serving gNB. A means for receiving an assignment message from a Location Management Function (LMF), the assignment message assigning the location server to enable a location measurement of the UE and indicating a time at which the location of the UE is to be measured may include, e.g., the external interface 1010 and one or more processors 1002 with dedicated hardware or implementing executable code or software instructions in memory 1004 and/or medium 1020 in location server 1000, such as the assignment module 1022, shown in FIG. 10.

At block 1304, the location server returns an acknowledgment to the LMF indicating the assignment is accepted, e.g., as discussed at stage 8 of FIGS. 3A, 3B, and 4. A means for returning an acknowledgment to the LMF indicating the assignment is accepted may include, e.g., the external interface 1010 and one or more processors 1002 with dedicated hardware or implementing executable code or software instructions in memory 1004 and/or medium 1020 in location server 1000, such as the assignment module 1022, shown in FIG. 10.

At block 1306, the location server receives location measurements for the UE from a plurality of entities, the location measurements scheduled in the plurality of entities by the LMF, the location measurements obtained by the plurality of entities at or near to the time, e.g., as discussed at stages 14 and 15 of FIGS. 3A and 3B and stages 14 and 17 of FIG. 4. A means for receiving location measurements for the UE from a plurality of entities, the location measurements scheduled in the plurality of entities by the LMF, the location measurements obtained by the plurality of entities at or near to the time may include, e.g., the external interface 1010 and one or more processors 1002 with dedicated hardware or implementing executable code or software instructions in memory 1004 and/or medium 1020 in location server 1000, such as the location measurements module 1024, shown in FIG. 10.

At block 1308, the location server enables the location for the UE to be determined by the location server or by the UE based on the location measurements and at least one position method, e.g., as discussed at stage 16 of FIGS. 3A and 3B and stages 15 and 16 of FIG. 4. A means for enabling a location for the UE to be determined by the location server or by the UE based on the location measurements and at least one position method may include, e.g., the external interface 1010 and one or more processors 1002 with dedicated hardware or implementing executable code or software instructions in memory 1004 and/or medium 1020 in location server 1000, such as the location determination module 1026, shown in FIG. 10. For example, the location server may enable the location for the UE to be determined by the UE based on the location measurements and the at least one position method by sending the location measurements to the UE, wherein the location for the UE is computed by the UE based, at least in part, on the location measurements and the at least one position method, e.g., as discussed at stages 15 and 16 of FIG. 4. The location server may receive the location for the UE from the UE after the location for the UE is computed by the UE, e.g., as discussed at stage 17 of FIG. 4. A means for sending the location measurements to the UE may include, e.g., the external interface 1010 and one or more processors 1002 with dedicated hardware or implementing executable code or software instructions in memory 1004 and/or medium 1020 in location server 1000, such as the location determination module 1026, shown in FIG. 10. A means for receiving the location for the UE from the UE after the location for the UE is computed by the UE may include, e.g., the external interface 1010 and one or more processors 1002 with dedicated hardware or implementing executable code or software instructions in memory 1004 and/or medium 1020 in location server 1000, such as the location determination module 1026, shown in FIG. 10.

At block 1310, the location server sends a release message to the LMF releasing the assignment of the location server after the location of the UE has been determined, e.g., as discussed at stage 18 of FIG. 3A, stage 19 of FIG. 3B, and stage 19 of FIG. 4. The release message, for example, may include an indication of success or failure and/or the positioning method used. A means for sending a release message to the LMF releasing the assignment of the location server after the location of the UE has been determined may include, e.g., the external interface 1010 and one or more processors 1002 with dedicated hardware or implementing executable code or software instructions in memory 1004 and/or medium 1020 in location server 1000, such as the release module 1028, shown in FIG. 10.

In an implementation, the plurality of entities may include the UE and the at least one position method may be DL-TDOA, DL-AOD, A-GNSS, WLAN (or WiFi), RTT, multi-cell RTT or some combination of these.

In an implementation, the plurality of entities may include at least one base station (e.g. a gNB 110) and the at least one position method comprises UL-TDOA, UL-AOA, RTT, multi-cell RTT or some combination of these. For example, the at least one base station may be a serving base station for the UE (e.g. a gNB 110-1); a plurality of neighboring base stations for the UE (e.g. other gNBs 110); or both of these.

In an implementation. the assignment message may include at least one of: an identification of each of the plurality of entities; an identification of the location measurements; configuration information for downlink (DL) signals (e.g. DL PRS signals) transmitted by base stations, wherein at least some of the location measurements are obtained by the UE using the DL signals when the plurality of entities includes the UE; configuration information for uplink (UL) signals (e.g. UL SRS signals) transmitted by the UE, wherein at least some of the location measurements are obtained by at least one base station (e.g. a gNB 110) using the UL signals when the plurality of entities includes the at least one base station; an identification of an external client (e.g. external client 130) for the location of the UE; or some combination of these.

In one implementation, the location server may further send the location of the UE to at least one of an external client (e.g. external client 130) and the UE, e.g., as discussed at stages 17a and 17b in FIG. 3A, stages 18a and 18b of FIG. 3B, or stage 18 of FIG. 4. For example, the location of the UE may be sent to the external client based on user plane protocols. A means for sending the location of the UE to at least one of an external client and the UE may include, e.g., the external interface 1010 and one or more processors 1002 with dedicated hardware or implementing executable code or software instructions in memory 1004 and/or medium 1020 in location server 1000, such as the location transfer module 1030, shown in FIG. 10.

Figure 14:
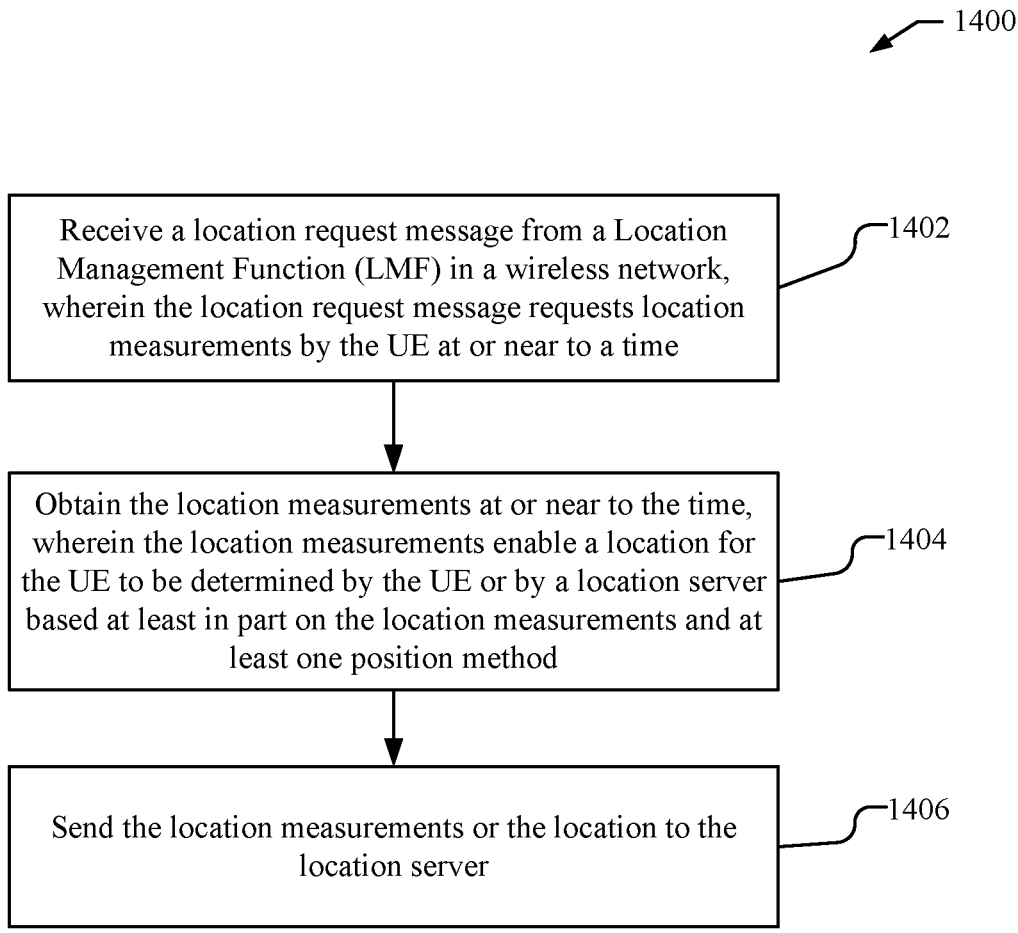
FIG. 14 shows a flowchart for an exemplary method for supporting a location session for a UE performed by the UE.

FIG. 14 shows a flowchart for an exemplary method 1400 for supporting a location session for a user equipment (UE) performed by the UE, such as UE 102 shown in FIG. 1, in a manner consistent with disclosed implementations.

At block 1402, the UE receives a location request message from a Location Management Function (e.g. LMF 120) in a wireless network, wherein the location request message requests location measurements by the UE at or near to a time (e.g. a time T as described for FIGS. 3A-8), e.g., as discussed at stage 12 of FIG. 3A, stage 10 of FIG. 3B, stage 12 of FIG. 4, or stage 10 of FIG. 8. A means for receiving a location request message from a Location Management Function (LMF) in a wireless network, wherein the location request message requests location measurements by the UE at or near to a time may include, e.g., the transceiver 1110 and one or more processors 1102 with dedicated hardware or implementing executable code or software instructions in memory 1104 and/or medium 1120 in UE 1100, such as the positioning session module 1122 and advanced scheduling module 1124, shown in FIG. 11.

At block 1404, the UE obtains the location measurements at or near to the time, wherein the location measurements enable a location for the UE to be determined by the UE or by a location server based at least in part on the location measurements and at least one position method, e.g., as discussed at stage 13a of FIGS. 3A, 3B, and 4 or stage 11a of FIG. 8. The at least one position method may be DL-TDOA, DL-AOD, A-GNSS, WLAN (or WiFi), RTT, multi-cell RTT or some combination of these. A means for obtaining the location measurements at or near to the time, wherein the location measurements enable a location for the UE to be determined by the UE or by a location server based at least in part on the location measurements and at least one position method may include, e.g., the transceiver 1110 and one or more processors 1102 with dedicated hardware or implementing executable code or software instructions in memory 1104 and/or medium 1120 in UE 1100, such as the positioning session module 1122 and advanced scheduling module 1124, shown in FIG. 11.

At block 1406, the UE sends the location measurements or the location to the location server, e.g., as discussed at stage 15 of FIGS. 3A and 3B, stage 17 of FIG. 4 or stage 13 of FIG. 8. A means for sending the location measurements or the location to the location server may include, e.g., the transceiver 1110 and one or more processors 1102 with dedicated hardware or implementing executable code or software instructions in memory 1104 and/or medium 1120 in UE 1100, such as the positioning session module 1122 and assigned location server module 1126, shown in FIG. 11.

In one implementation, the location server comprises the LMF, e.g. as described for FIG. 8. In another implementation, the location server comprises a location server (e.g. an LSS 117) in a radio access network (RAN) for the wireless network, where the location request message indicates the location server, e.g. as described for FIG. 3A, FIG. 3B and FIG. 4.

In one implementation, the UE may further receive a request to transmit uplink signals (e.g. UL SRS signals) at or near to the time, e.g., as discussed at stage 9b of FIG. 3A, stage 11 of FIG. 3B, stage 9b of FIG. 4, or stage 7b of FIG. 8. A means for receiving a request to transmit uplink signals at or near to the time may include, e.g., the transceiver 1110 and one or more processors 1102 with dedicated hardware or implementing executable code or software instructions in memory 1104 and/or medium 1120 in UE 1100, such as the positioning session module 1122 and advanced scheduling module 1124, shown in FIG. 11. The UE may transmit the uplink signals at or near to the time, wherein the uplink signals enable additional location measurements to be obtained by at least one base station (e.g. a gNB 110) at or near to the time, wherein the additional location measurements further enable the location for the UE to be determined by the UE or by the location server based at least in part on the location measurements, the additional location measurements and the at least one position method, e.g., as discussed at stage 13b of FIGS. 3A, 3B, and 4, or stage 11b of FIG. 8. A means for transmit the uplink signals at or near to the time may include, e.g., the transceiver 1110 and one or more processors 1102 with dedicated hardware or implementing executable code or software instructions in memory 1104 and/or medium 1120 in UE 1100, such as the positioning session module 1122 and advanced scheduling module 1124, shown in FIG. 11. In one implementation, the UE may receive the additional location measurements from the location server, e.g., as discussed at stage 15 of FIG. 4. A means for receiving the additional location measurements from the location server may include, e.g., the transceiver 1110 and one or more processors 1102 with dedicated hardware or implementing executable code or software instructions in memory 1104 and/or medium 1120 in UE 1100, such as the positioning session module 1122 and assigned location server module 1126, shown in FIG. 11. The UE may determine the location based on the location measurements, the additional location measurements and the at least one position method, e.g., as discussed at stage 16 of FIG. 4. A means for determining the location based on the location measurements, the additional location measurements and the at least one position method may include, e.g., the transceiver 1110 and one or more processors 1102 with dedicated hardware or implementing executable code or software instructions in memory 1104 and/or medium 1120 in UE 1100, such as the positioning session module 1122, shown in FIG. 11.

In one implementation, the UE may receive assistance data from the LMF, the assistance data comprising configuration information for downlink (DL) Positioning Reference Signals (PRSs) transmitted by a plurality of based stations at or near to the time, e.g. as discussed at stage 11 of FIG. 3A, stage 9 of FIG. 3B, stage 11 of FIG. 4, or stage 9 of FIG. 8. A means for receiving assistance data from the LMF, the assistance data comprising configuration information for downlink (DL) Positioning Reference Signals (PRSs) transmitted by a plurality of based stations at or near to the time may include, e.g., the transceiver 1110 and one or more processors 1102 with dedicated hardware or implementing executable code or software instructions in memory 1104 and/or medium 1120 in UE 1100, such as the positioning session module 1122 and advanced scheduling module 1124, shown in FIG. 11. The UE may obtain the location measurements by measuring the DL PRSs at or near to the time, based on the configuration information, e.g., as discussed at stage 13a of FIGS. 3A, 3B, and 4 and at stage 11a of FIG. 8. A means for obtaining the location measurements by measuring the DL PRSs at or near to the time, based on the configuration information may include, e.g., the transceiver 1110 and one or more processors 1102 with dedicated hardware or implementing executable code or software instructions in memory 1104 and/or medium 1120 in UE 1100, such as the positioning session module 1122 and advanced scheduling module 1124, shown in FIG. 11.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

In view of this description embodiments may include different combinations of features. Implementation examples are described in the following numbered clauses:

Clause 1. A method performed by a Location Management Function (LMF) for supporting a location session for a user equipment (UE), the method comprising: receiving a positioning message for the UE from a first entity, the positioning message indicating a time at which a location for the UE is to be measured; and sending request messages to a plurality of entities, the request messages scheduling location measurements for the UE by each of the plurality of entities at or near to the time, wherein the location measurements enable the location for the UE to be measured at the time based on at least one position method.

Clause 2. The method of clause 1, wherein the plurality of entities includes the UE and the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 3. The method of either of clauses 1 or 2, wherein the plurality of entities includes at least one base station and the at least one position method comprises uplink (UL) Time Difference of Arrival (UL-TDOA), UL Angle of Arrival (UL-AOA), Round Trip Time (RTT), multi-cell RTT or some combination of these.

Clause 4. The method of clause 3, wherein the at least one base station comprises: a serving base station for the UE; or a plurality of neighboring base stations for the UE; or both of these.

Clause 5. The method of clause 4, further comprising sending a message to the serving base station, wherein the message enables the serving base station to activate transmission of uplink SRS signals by the UE at or near to the time, wherein at least some of the location measurements are obtained by the at least one base station using the uplink SRS signals.

Clause 6. The method of any of clauses 1-5, further comprising sending an assignment message to a serving base station for the UE, wherein the assignment message enables the serving base station to assign a location server associated with the serving base station, wherein the location server receives the location measurements from at least some of the plurality of entities and enables the location for the UE to be computed by the location server or by the UE based on the location measurements and the at least one position method.

Clause 7. The method of clause 6, wherein the serving base station is a New Radio (NR) NodeB (gNB), wherein the location server is internal to the gNB, part of a central unit (CU) for the gNB, connected to the CU for the gNB, or external to and connected to the gNB.

Clause 8. The method of either of clauses 6 or 7, wherein the location server receives the location measurements from each of the plurality of entities, computes the location for the UE based on the location measurements and the at least one position method and sends the location to an external client.

Clause 9. The method of any of clauses 6-8, further comprising including information for the plurality of entities and the location measurements in the assignment message.

Clause 10. The method of clause 9, wherein the information includes at least one of: the time at which the location for the UE is to be measured; or an identification of each of the plurality of entities; or an identification of the location measurements; or configuration information for downlink (DL) signals transmitted by base stations, wherein at least some of the location measurements are obtained by the UE using the DL signals when the plurality of entities includes the UE; or configuration information for uplink (UL) signals transmitted by the UE, wherein at least some of the location measurements are obtained by at least one base station using the UL signals when the plurality of entities includes the at least one base station; or an identification of an external client for the location of the UE; or some combination of these.

Clause 11. The method of any of clauses 6-10, further comprising including in each request message at least one of: the time at which the location for the UE is to be measured; or an identification of the location server; or both of these.

Clause 12. The method of any of clauses 6-11, further comprising receiving a release message from the serving base station after the location for the UE has been measured at the time.

Clause 13. The method of any of clauses 1-12, wherein the first entity is the UE, wherein the positioning message comprises an event report, wherein the event report is received prior to the time, wherein the event report indicates a periodic event expected at the time, a triggered event at a current time, or a triggered event expected at or near to the time.

Clause 14. A Location Management Function (LMF) configured to support a location session for a user equipment (UE), comprising: an external interface configured to wirelessly communicate with a wireless network; at least one memory; and at least one processor coupled to the external interface and the at least one memory and configured to: receive, via the external interface, a positioning message for the UE from a first entity, the positioning message indicating a time at which a location for the UE is to be measured; and send, via the external interface, request messages to a plurality of entities, the request messages scheduling location measurements for the UE by each of the plurality of entities at or near to the time, wherein the location measurements enable the location for the UE to be measured at the time based on at least one position method.

Clause 15. The LMF of clause 14, wherein the plurality of entities includes the UE and the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 16. The LMF of either of clauses 14 or 15, wherein the plurality of entities includes at least one base station and the at least one position method comprises uplink (UL) Time Difference of Arrival (UL-TDOA), UL Angle of Arrival (UL-AOA), Round Trip Time (RTT), multi-cell RTT or some combination of these.

Clause 17. The LMF of clause 16, wherein the at least one base station comprises: a serving base station for the UE; or a plurality of neighboring base stations for the UE; or both of these.

Clause 18. The LMF of clause 17, wherein the at least one processor is further configured to send, via the external interface, a message to the serving base station, wherein the message enables the serving base station to activate transmission of uplink SRS signals by the UE at or near to the time, wherein at least some of the location measurements are obtained by the at least one base station using the uplink SRS signals.

Clause 19. The LMF of any of clauses 14-18, wherein the at least one processor is further configured to send, via the external interface, an assignment message to a serving base station for the UE, wherein the assignment message enables the serving base station to assign a location server associated with the serving base station, wherein the location server receives the location measurements from at least some of the plurality of entities and enables the location for the UE to be computed by the location server or by the UE based on the location measurements and the at least one position method.

Clause 20. The LMF of clause 19, wherein the serving base station is a New Radio (NR) NodeB (gNB), wherein the location server is internal to the gNB, part of a central unit (CU) for the gNB, connected to the CU for the gNB, or external to and connected to the gNB.

Clause 21. The LMF of either of clauses 19 or 20, wherein the location server receives the location measurements from each of the plurality of entities, computes the location for the UE based on the location measurements and the at least one position method and sends the location to an external client.

Clause 22. The LMF of any of clauses 19-21, wherein the at least one processor is further configured to include information for the plurality of entities and the location measurements in the assignment message.

Clause 23. The LMF of clause 22, wherein the information includes at least one of: the time at which the location for the UE is to be measured; or an identification of each of the plurality of entities; or an identification of the location measurements; or configuration information for downlink (DL) signals transmitted by base stations, wherein at least some of the location measurements are obtained by the UE using the DL signals when the plurality of entities includes the UE; or configuration information for uplink (UL) signals transmitted by the UE, wherein at least some of the location measurements are obtained by at least one base station using the UL signals when the plurality of entities includes the at least one base station; or an identification of an external client for the location of the UE; or some combination of these.

Clause 24. The LMF of any of clauses 19-23, wherein the at least one processor is further configured to include in each request message at least one of: the time at which the location for the UE is to be measured; or an identification of the location server; or both of these.

Clause 25. The LMF of any of clauses 19-24, wherein the at least one processor is further configured to receive, via the external interface, a release message from the serving base station after the location for the UE has been measured at the time.

Clause 26. The LMF of any of clauses 14-25, wherein the first entity is the UE, wherein the positioning message comprises an event report, wherein the event report is received prior to the time, wherein the event report indicates a periodic event expected at the time, a triggered event at a current time, or a triggered event expected at or near to the time.

Clause 27. A Location Management Function (LMF) configured for supporting a location session for a user equipment (UE), comprising: means for receiving a positioning message for the UE from a first entity, the positioning message indicating a time at which a location for the UE is to be measured; and means for sending request messages to a plurality of entities, the request messages scheduling location measurements for the UE by each of the plurality of entities at or near to the time, wherein the location measurements enable the location for the UE to be measured at the time based on at least one position method.

Clause 28. The LMF of clause 27, wherein the plurality of entities includes the UE and the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 29. The LMF of either of clauses 27 or 28, wherein the plurality of entities includes at least one base station and the at least one position method comprises uplink (UL) Time Difference of Arrival (UL-TDOA), UL Angle of Arrival (UL-AOA), Round Trip Time (RTT), multi-cell RTT or some combination of these.

Clause 30. The LMF of clause 29, wherein the at least one base station comprises: a serving base station for the UE; or a plurality of neighboring base stations for the UE; or both of these.

Clause 31. The LMF of clause 30, further comprising means for sending a message to the serving base station, wherein the message enables the serving base station to activate transmission of uplink SRS signals by the UE at or near to the time, wherein at least some of the location measurements are obtained by the at least one base station using the uplink SRS signals.

Clause 32. The LMF of any of clauses 27-31, further comprising means for sending an assignment message to a serving base station for the UE, wherein the assignment message enables the serving base station to assign a location server associated with the serving base station, wherein the location server receives the location measurements from at least some of the plurality of entities and enables the location for the UE to be computed by the location server or by the UE based on the location measurements and the at least one position method.

Clause 33. The LMF of clause 32, wherein the serving base station is a New Radio (NR) NodeB (gNB), wherein the location server is internal to the gNB, part of a central unit (CU) for the gNB, connected to the CU for the gNB, or external to and connected to the gNB.

Clause 34. The LMF of either of clauses 32 of 33, wherein the location server receives the location measurements from each of the plurality of entities, computes the location for the UE based on the location measurements and the at least one position method and sends the location to an external client.

Clause 35. The LMF of any of clauses 32-34, further comprising means for including information for the plurality of entities and the location measurements in the assignment message.

Clause 36. The LMF of clause 35, wherein the information includes at least one of: the time at which the location for the UE is to be measured; or an identification of each of the plurality of entities; or an identification of the location measurements; or configuration information for downlink (DL) signals transmitted by base stations, wherein at least some of the location measurements are obtained by the UE using the DL signals when the plurality of entities includes the UE; or configuration information for uplink (UL) signals transmitted by the UE, wherein at least some of the location measurements are obtained by at least one base station using the UL signals when the plurality of entities includes the at least one base station; or an identification of an external client for the location of the UE; or some combination of these.

Clause 37. The LMF of any of clauses 32-36, further comprising means for including in each request message at least one of: the time at which the location for the UE is to be measured; or an identification of the location server; or both of these.

Clause 38. The LMF of any of clauses 32-37, further comprising means for receiving a release message from the serving base station after the location for the UE has been measured at the time.

Clause 39. The LMF of any of clauses 27-38, wherein the first entity is the UE, wherein the positioning message comprises an event report, wherein the event report is received prior to the time, wherein the event report indicates a periodic event expected at the time, a triggered event at a current time, or a triggered event expected at or near to the time.

Clause 40. A non-transitory computer-readable storage medium including program code stored thereon, the program code is operable to configure at least one processor in a Location Management Function (LMF) for supporting a location session for a user equipment (UE), the program code comprising instructions to: receive a positioning message for the UE from a first entity, the positioning message indicating a time at which a location for the UE is to be measured; and send request messages to a plurality of entities, the request messages scheduling location measurements for the UE by each of the plurality of entities at or near to the time, wherein the location measurements enable the location for the UE to be measured at the time based on at least one position method.

Clause 41. The non-transitory computer-readable storage medium of clause 40, wherein the plurality of entities includes the UE and the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 42. The non-transitory computer-readable storage medium of either of clauses 40 or 41, wherein the plurality of entities includes at least one base station and the at least one position method comprises uplink (UL) Time Difference of Arrival (UL-TDOA), UL Angle of Arrival (UL-AOA), Round Trip Time (RTT), multi-cell RTT or some combination of these.

Clause 43. The non-transitory computer-readable storage medium of clause 42, wherein the at least one base station comprises: a serving base station for the UE; or a plurality of neighboring base stations for the UE; or both of these.

Clause 44. The non-transitory computer-readable storage medium of clause 43, wherein the program code further comprises instructions to send a message to the serving base station, wherein the message enables the serving base station to activate transmission of uplink SRS signals by the UE at or near to the time, wherein at least some of the location measurements are obtained by the at least one base station using the uplink SRS signals.

Clause 45. The non-transitory computer-readable storage medium of any of clauses 40-44, wherein the program code further comprises instructions to send an assignment message to a serving base station for the UE, wherein the assignment message enables the serving base station to assign a location server associated with the serving base station, wherein the location server receives the location measurements from at least some of the plurality of entities and enables the location for the UE to be computed by the location server or by the UE based on the location measurements and the at least one position method.

Clause 46. The non-transitory computer-readable storage medium of clause 45, wherein the serving base station is a New Radio (NR) NodeB (gNB), wherein the location server is internal to the gNB, part of a central unit (CU) for the gNB, connected to the CU for the gNB, or external to and connected to the gNB.

Clause 47. The non-transitory computer-readable storage medium of either of clauses 45 or 46, wherein the location server receives the location measurements from each of the plurality of entities, computes the location for the UE based on the location measurements and the at least one position method and sends the location to an external client.

Clause 48. The non-transitory computer-readable storage medium of any of clauses 45-47, wherein the program code further comprises instructions to include information for the plurality of entities and the location measurements in the assignment message.

Clause 49. The non-transitory computer-readable storage medium of clause 48, wherein the information includes at least one of: the time at which the location for the UE is to be measured; or an identification of each of the plurality of entities; or an identification of the location measurements; or configuration information for downlink (DL) signals transmitted by base stations, wherein at least some of the location measurements are obtained by the UE using the DL signals when the plurality of entities includes the UE; or configuration information for uplink (UL) signals transmitted by the UE, wherein at least some of the location measurements are obtained by at least one base station using the UL signals when the plurality of entities includes the at least one base station; or an identification of an external client for the location of the UE; or some combination of these.

Clause 50. The non-transitory computer-readable storage medium of any of clauses 45-49, wherein the program code further comprises instructions to include in each request message at least one of: the time at which the location for the UE is to be measured; or an identification of the location server; or both of these.

Clause 51. The non-transitory computer-readable storage medium of any of clauses 45-50, wherein the program code further comprises instructions to receive a release message from the serving base station after the location for the UE has been measured at the time.

Clause 52. The non-transitory computer-readable storage medium of any of clauses 40-51, wherein the first entity is the UE, wherein the positioning message comprises an event report, wherein the event report is received prior to the time, wherein the event report indicates a periodic event expected at the time, a triggered event at a current time, or a triggered event expected at or near to the time.

Clause 53. A method performed by a location server in a radio access network (RAN) for supporting a location session for a user equipment (UE), the method comprising: receiving an assignment message from a Location Management Function (LMF), the assignment message comprising an assignment for the location server to enable a measurement of a location of the UE and indicating a time at which the location of the UE is to be measured; returning an acknowledgment to the LMF indicating the assignment is accepted; receiving location measurements for the UE from a plurality of entities, the location measurements scheduled in the plurality of entities by the LMF, the location measurements obtained by the plurality of entities at or near to the time; enabling the location for the UE to be determined by the location server or by the UE based on the location measurements and at least one position method; and sending a release message to the LMF releasing the assignment of the location server after the location of the UE has been determined.

Clause 54. The method of clause 53, wherein the location server is internal to a serving New Radio (NR) NodeB (gNB) for the UE, part of a central unit (CU) for the serving gNB, connected to the CU for the serving gNB, or external to and connected to the serving gNB.

Clause 55. The method of either of clauses 53 or 54, wherein the plurality of entities includes the UE and the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 56. The method of any of clauses 53-55, wherein the plurality of entities includes at least one base station and the at least one position method comprises uplink (UL) Time Difference of Arrival (UL-TDOA), UL Angle of Arrival (UL-AOA), Round Trip Time (RTT), multi-cell RTT or some combination of these.

Clause 57. The method of clause 56, wherein the at least one base station comprises: a serving base station for the UE; or a plurality of neighboring base stations for the UE; or both of these.

Clause 58. The method of any of clauses 53-57, wherein enabling the location for the UE to be determined by the UE based on the location measurements and the at least one position method comprises sending the location measurements to the UE, wherein the location for the UE is computed by the UE based, at least in part, on the location measurements and the at least one position method.

Clause 59. The method of clause 58, further comprising receiving the location for the UE from the UE after the location for the UE is computed by the UE.

Clause 60. The method of any of clauses 53-59, wherein the assignment message further includes at least one of: an identification of each of the plurality of entities; or an identification of the location measurements; or configuration information for downlink (DL) signals transmitted by base stations, wherein at least some of the location measurements are obtained by the UE using the DL signals when the plurality of entities includes the UE; or configuration information for uplink (UL) signals transmitted by the UE, wherein at least some of the location measurements are obtained by at least one base station using the UL signals when the plurality of entities includes the at least one base station; or an identification of an external client for the location of the UE; or some combination of these.

Clause 61. The method for any of clauses 53-60, further comprising sending the location of the UE to at least one of an external client and the UE.

Clause 62. The method of clause 61, further comprising sending the location of the UE to the external client based on user plane protocols.

Clause 63. A location server in a radio access network (RAN) configured to support a location session for a user equipment (UE), comprising: an external interface configured to wirelessly communicate with a wireless network; at least one memory; and at least one processor coupled to the external interface and the at least one memory and configured to: receive, via the external interface, an assignment message from a Location Management Function (LMF), the assignment message comprising an assignment for the location server to enable a measurement of a location of the UE and indicating a time at which the location of the UE is to be measured; return, via the external interface, an acknowledgment to the LMF indicating the assignment is accepted; receive, via the external interface, location measurements for the UE from a plurality of entities, the location measurements scheduled in the plurality of entities by the LMF, the location measurements obtained by the plurality of entities at or near to the time; enable a location for the UE to be determined by the location server or by the UE based on the location measurements and at least one position method; and send, via the external interface, a release message to the LMF releasing the assignment of the location server after the location of the UE has been determined.

Clause 64. The location server of clause 63, wherein the location server is internal to a serving New Radio (NR) NodeB (gNB) for the UE, part of a central unit (CU) for the serving gNB, connected to the CU for the serving gNB, or external to and connected to the serving gNB.

Clause 65. The location server of either of clauses 63 or 64, wherein the plurality of entities includes the UE and the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 66. The location server of any of clauses 63-65, wherein the plurality of entities includes at least one base station and the at least one position method comprises uplink (UL) Time Difference of Arrival (UL-TDOA), UL Angle of Arrival (UL-AOA), Round Trip Time (RTT), multi-cell RTT or some combination of these.

Clause 67. The location server of clause 66, wherein the at least one base station comprises: a serving base station for the UE; or a plurality of neighboring base stations for the UE; or both of these.

Clause 68. The location server of any of clauses 63-67, wherein the at least one processor is configured to enable the location for the UE to be determined by the UE based on the location measurements and the at least one position method by being configured to send, via the external interface, the location measurements to the UE, wherein the location for the UE is computed by the UE based, at least in part, on the location measurements and the at least one position method.

Clause 69. The location server of clause 68, wherein the at least one processor is further configured to receive, via the external interface, the location for the UE from the UE after the location for the UE is computed by the UE.

Clause 70. The location server of any of clauses 63-69, wherein the assignment message further includes at least one of: an identification of each of the plurality of entities; or an identification of the location measurements; or configuration information for downlink (DL) signals transmitted by base stations, wherein at least some of the location measurements are obtained by the UE using the DL signals when the plurality of entities includes the UE; or configuration information for uplink (UL) signals transmitted by the UE, wherein at least some of the location measurements are obtained by at least one base station using the UL signals when the plurality of entities includes the at least one base station; or an identification of an external client for the location of the UE; or some combination of these.

Clause 71. The location server for any of clauses 63-70, wherein the at least one processor is further configured to send, via the external interface, the location of the UE to at least one of an external client and the UE.

Clause 72. The location server of clause 71, wherein the at least one processor is further configured to send, via the external interface, the location of the UE to the external client based on user plane protocols.

Clause 73. A location server in a radio access network (RAN) configured for supporting a location session for a user equipment (UE), comprising: means for receiving an assignment message from a Location Management Function (LMF), the assignment message comprising an assignment for the location server to enable a measurement of a location of the UE and indicating a time at which the location of the UE is to be measured; means for returning an acknowledgment to the LMF indicating the assignment is accepted; means for receiving location measurements for the UE from a plurality of entities, the location measurements scheduled in the plurality of entities by the LMF, the location measurements obtained by the plurality of entities at or near to the time; means for enabling the location for the UE to be determined by the location server or by the UE based on the location measurements and at least one position method; and means for sending a release message to the LMF releasing the assignment of the location server after the location of the UE has been determined.

Clause 74. The location server of clause 73, wherein the location server is internal to a serving New Radio (NR) NodeB (gNB) for the UE, part of a central unit (CU) for the serving gNB, connected to the CU for the serving gNB, or external to and connected to the serving gNB.

Clause 75. The location server of either of clauses 73 or 74, wherein the plurality of entities includes the UE and the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 76. The location server of any of clauses 73-75, wherein the plurality of entities includes at least one base station and the at least one position method comprises uplink (UL) Time Difference of Arrival (UL-TDOA), UL Angle of Arrival (UL-AOA), Round Trip Time (RTT), multi-cell RTT or some combination of these.

Clause 77. The location server of clause 76, wherein the at least one base station comprises: a serving base station for the UE; or a plurality of neighboring base stations for the UE; or both of these.

Clause 78. The location server of any of clauses 73-77, wherein the means for enabling the location for the UE to be determined by the UE based on the location measurements and the at least one position comprises means for sending the location measurements to the UE, wherein the location for the UE is computed by the UE based, at least in part, on the location measurements and the at least one position method.

Clause 79. The location server of clause 78, further comprising means for receiving the location for the UE from the UE after the location for the UE is computed by the UE.

Clause 80. The location server of any of clauses 73-79, wherein the assignment message further includes at least one of: an identification of each of the plurality of entities; or an identification of the location measurements; or configuration information for downlink (DL) signals transmitted by base stations, wherein at least some of the location measurements are obtained by the UE using the DL signals when the plurality of entities includes the UE; or configuration information for uplink (UL) signals transmitted by the UE, wherein at least some of the location measurements are obtained by at least one base station using the UL signals when the plurality of entities includes the at least one base station; or an identification of an external client for the location of the UE; or some combination of these.

Clause 81. The location server for any of clauses 73-80, further comprising means for sending the location of the UE to at least one of an external client and the UE.

Clause 82. The location server of clause 81, further comprising means for sending the location of the UE to the external client based on user plane protocols.

Clause 83. A non-transitory computer-readable storage medium including program code stored thereon, the program code is operable to configure at least one processor in a location server in a radio access network (RAN) for supporting a location session for a user equipment (UE), the program code comprising instructions to: receive an assignment message from a Location Management Function (LMF), the assignment message comprising an assignment for the location server to enable a measurement of a location of the UE and indicating a time at which the location of the UE is to be measured; return an acknowledgment to the LMF indicating the assignment is accepted; receive location measurements for the UE from a plurality of entities, the location measurements scheduled in the plurality of entities by the LMF, the location measurements obtained by the plurality of entities at or near to the time; enable a location for the UE to be determined by the location server or by the UE based on the location measurements and at least one position method; and send a release message to the LMF releasing the assignment of the location server after the location of the UE has been determined.

Clause 84. The non-transitory computer-readable storage medium of clause 83, wherein the location server is internal to a serving New Radio (NR) NodeB (gNB) for the UE, part of a central unit (CU) for the serving gNB, connected to the CU for the serving gNB, or external to and connected to the serving gNB.

Clause 85. The non-transitory computer-readable storage medium of either of clauses 83 or 84, wherein the plurality of entities includes the UE and the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 86. The non-transitory computer-readable storage medium of any of clauses 83-85, wherein the plurality of entities includes at least one base station and the at least one position method comprises uplink (UL) Time Difference of Arrival (UL-TDOA), UL Angle of Arrival (UL-AOA), Round Trip Time (RTT), multi-cell RTT or some combination of these.

Clause 87. The non-transitory computer-readable storage medium of clause 86, wherein the at least one base station comprises: a serving base station for the UE; or a plurality of neighboring base stations for the UE; or both of these.

Clause 88. The non-transitory computer-readable storage medium of any of clauses 83-87, wherein the instructions to enable the location for the UE to be determined by the UE based on the location measurements and the at least one position method comprises instructions to send the location measurements to the UE, wherein the location for the UE is computed by the UE based, at least in part, on the location measurements and the at least one position method.

Clause 89. The non-transitory computer-readable storage medium of clause 88, wherein the program code further comprises instructions to receive the location for the UE from the UE after the location for the UE is computed by the UE.

Clause 90. The non-transitory computer-readable storage medium of any of clauses 83-89, wherein the assignment message further includes at least one of: an identification of each of the plurality of entities; or an identification of the location measurements; or configuration information for downlink (DL) signals transmitted by base stations, wherein at least some of the location measurements are obtained by the UE using the DL signals when the plurality of entities includes the UE; or configuration information for uplink (UL) signals transmitted by the UE, wherein at least some of the location measurements are obtained by at least one base station using the UL signals when the plurality of entities includes the at least one base station; or an identification of an external client for the location of the UE; or some combination of these.

Clause 91. The non-transitory computer-readable storage medium for any of clauses 83-90, wherein the program code further comprises instructions to send the location of the UE to at least one of an external client and the UE.

Clause 92. The non-transitory computer-readable storage medium of clause 91, wherein the program code further comprises instructions to send the location of the UE to the external client based on user plane protocols.

Clause 93. A method performed by a user equipment (UE) for supporting a location session for the UE, the method comprising: receiving a location request message from a Location Management Function (LMF) in a wireless network, wherein the location request message requests location measurements by the UE at or near to a time; obtaining the location measurements at or near to the time, wherein the location measurements enable a location for the UE to be determined by the UE or by a location server based at least in part on the location measurements and at least one position method; and sending the location measurements or the location to the location server.

Clause 94. The method of clause 93, wherein the location server comprises the LMF.

Clause 95. The method of clause 93, wherein the location server comprises a location server in a radio access network (RAN) for the wireless network, wherein the location request message indicates the location server.

Clause 96. The method of any of clauses 93-95, further comprising: receiving a request to transmit uplink signals at or near to the time; and transmitting the uplink signals at or near to the time, wherein the uplink signals enable additional location measurements to be obtained by at least one base station at or near to the time, wherein the additional location measurements further enable the location for the UE to be determined by the UE or by the location server based at least in part on the location measurements, the additional location measurements and the at least one position method.

Clause 97. The method of clause 96, further comprising: receiving the additional location measurements from the location server; and determining the location based on the location measurements, the additional location measurements and the at least one position method.

Clause 98. The method of any of clauses 93-97, wherein the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 99. The method of any of clauses 93-98, further comprising: receiving assistance data from the LMF, the assistance data comprising configuration information for downlink (DL) Positioning Reference Signals (PRSs) transmitted by a plurality of based stations at or near to the time; and obtaining the location measurements by measuring the DL PRSs at or near to the time, based on the configuration information.

Clause 100. A user equipment (UE) configured to support a location session for the UE, comprising: a wireless transceiver configured to wirelessly communicate with a wireless network; at least one memory; and at least one processor coupled to the wireless transceiver and the at least one memory and configured to: receive, via the wireless transceiver, a location request message from a Location Management Function (LMF) in the wireless network, wherein the location request message requests location measurements by the UE at or near to a time; obtain the location measurements at or near to the time, wherein the location measurements enable a location for the UE to be determined by the UE or by a location server based at least in part on the location measurements and at least one position method; and send, via the wireless transceiver, the location measurements or the location to the location server.

Clause 101. The UE of clause 93, wherein the location server comprises the LMF.

Clause 102. The UE of clause 93, wherein the location server comprises a location server in a radio access network (RAN) for the wireless network, wherein the location request message indicates the location server.

Clause 103. The UE of any of clauses 100-102, wherein the at least one processor is further configured to: receive, via the wireless transceiver, a request to transmit uplink signals at or near to the time; and transmit, via the wireless transceiver, the uplink signals at or near to the time, wherein the uplink signals enable additional location measurements to be obtained by at least one base station at or near to the time, wherein the additional location measurements further enable the location for the UE to be determined by the UE or by the location server based at least in part on the location measurements, the additional location measurements and the at least one position method.

Clause 104. The UE of clause 103, wherein the at least one processor is further configured to: receive, via the wireless transceiver, the additional location measurements from the location server; and determine the location based on the location measurements, the additional location measurements and the at least one position method.

Clause 105. The UE of any of clauses 100-104, wherein the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 106. The UE of any of clauses 100-105, wherein the at least one processor is further configured to: receive, via the wireless transceiver, assistance data from the LMF, the assistance data comprising configuration information for downlink (DL) Positioning Reference Signals (PRSs) transmitted by a plurality of based stations at or near to the time; and obtain the location measurements by measuring the DL PRSs at or near to the time, based on the configuration information.

Clause 107. A user equipment (UE) configured for supporting a location session for the UE, comprising: means for receiving a location request message from a Location Management Function (LMF) in a wireless network, wherein the location request message requests location measurements by the UE at or near to a time; means for obtaining the location measurements at or near to the time, wherein the location measurements enable a location for the UE to be determined by the UE or by a location server based at least in part on the location measurements and at least one position method; and means for sending the location measurements or the location to the location server.

Clause 108. The UE of clause 107, wherein the location server comprises the LMF.

Clause 109. The UE of clause 107, wherein the location server comprises a location server in a radio access network (RAN) for the wireless network, wherein the location request message indicates the location server.

Clause 110. The UE of any of clauses 107-109, further comprising: means for receiving a request to transmit uplink signals at or near to the time; and means for transmitting the uplink signals at or near to the time, wherein the uplink signals enable additional location measurements to be obtained by at least one base station at or near to the time, wherein the additional location measurements further enable the location for the UE to be determined by the UE or by the location server based at least in part on the location measurements, the additional location measurements and the at least one position method.

Clause 111. The UE of clause 110, further comprising: means for receiving the additional location measurements from the location server; and means for determining the location based on the location measurements, the additional location measurements and the at least one position method.

Clause 112. The UE of any of clauses 107-111, wherein the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 113. The UE of any of clauses 107-112, further comprising: means for receiving assistance data from the LMF, the assistance data comprising configuration information for downlink (DL) Positioning Reference Signals (PRSs) transmitted by a plurality of based stations at or near to the time; and means for obtaining the location measurements by measuring the DL PRSs at or near to the time, based on the configuration information.

Clause 114. A non-transitory computer-readable storage medium including program code stored thereon, the program code is operable to configure at least one processor in a user equipment (UE) for supporting a location session for the UE, the program code comprising instructions to: receive a location request message from a Location Management Function (LMF) in a wireless network, wherein the location request message requests location measurements by the UE at or near to a time; obtain the location measurements at or near to the time, wherein the location measurements enable a location for the UE to be determined by the UE or by a location server based at least in part on the location measurements and at least one position method; and send the location measurements or the location to the location server.

Clause 115. The non-transitory computer-readable storage medium of clause 114, wherein the location server comprises the LMF.

Clause 116. The non-transitory computer-readable storage medium of clause 114, wherein the location server comprises a location server in a radio access network (RAN) for the wireless network, wherein the location request message indicates the location server.

Clause 117. The non-transitory computer-readable storage medium of any of clauses 114-116, wherein the program code further comprises instructions to: receive a request to transmit uplink signals at or near to the time; and transmit the uplink signals at or near to the time, wherein the uplink signals enable additional location measurements to be obtained by at least one base station at or near to the time, wherein the additional location measurements further enable the location for the UE to be determined by the UE or by the location server based at least in part on the location measurements, the additional location measurements and the at least one position method.

Clause 118. The non-transitory computer-readable storage medium of clause 117, wherein the program code further comprises instructions to: receive the additional location measurements from the location server; and determine the location based on the location measurements, the additional location measurements and the at least one position method.

Clause 119. The non-transitory computer-readable storage medium of any of clauses 114-118, wherein the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

Clause 120. The non-transitory computer-readable storage medium of any of clauses 114-119, wherein the program code further comprises instructions to: receive assistance data from the LMF, the assistance data comprising configuration information for downlink (DL) Positioning Reference Signals (PRSs) transmitted by a plurality of based stations at or near to the time; and obtain the location measurements by measuring the DL PRSs at or near to the time, based on the configuration information.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a Location Management Function (LMF) for supporting a location session for a user equipment (UE), the method comprising:

receiving a positioning message for the UE from a first entity, the positioning message indicating a time T at which a location for the UE is to be measured; and sending a request message scheduling location measurements for the UE by a second entity, wherein the request message indicates the time T using a local or global time indication and the location measurements enable the location for the UE to be measured at the time T based on at least one position method.

2. The method of claim 1, wherein the local or global time indication comprises a Coordinated Universal Time (UTC) or a serving gNB local time.

3. The method of claim 1, wherein the positioning message indicates the time T using UTC.

4. The method of claim 1, wherein the second entity includes the UE and the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

5. The method of claim 1, wherein the second entity includes at least one base station and the at least one position method comprises uplink (UL) Time Difference of Arrival (UL-TDOA), UL Angle of Arrival (UL-AOA), Round Trip Time (RTT), multi-cell RTT or some combination of these.

6. The method of claim 5, wherein the at least one base station comprises:
a serving base station for the UE; or
a plurality of neighboring base stations for the UE; or both of these.

7. The method of claim 1, further comprising sending an assignment message to a serving base station for the UE, wherein the assignment message enables the serving base station to assign a location server associated with the serving base station, wherein the location server receives the location measurements from the second entity and enables the location for the UE to be computed by the location server or by the UE based on the location measurements and the at least one position method.

8. The method of claim 7, wherein the location server receives the location measurements from the second entity, computes the location for the UE based on the location measurements and the at least one position method and sends the location to an external client.

9. The method of claim 7, further comprising including information for the second entity and the location measurements in the assignment message.

10. The method of claim 7, further comprising receiving a release message from the serving base station after the location for the UE has been measured at the time T.

11. The method of claim 1, wherein the first entity is the UE, wherein the positioning message comprises an event report, wherein the event report is received prior to the time T, wherein the event report indicates a periodic event expected at the time T, a triggered event at a current time, or a triggered event expected at the time T.

12. The method of claim 1, wherein the time T is indicated using the local time, and the local time comprises a time local to a serving base station for the UE.

13. The method of claim 1, wherein the time T is indicated using the global time and the global time comprises coordinated universal time (UTC).

14. A Location Management Function (LMF) configured to support a location session for a user equipment (UE), comprising:
an external interface configured to wirelessly communicate with a wireless network;
at least one memory; and
at least one processor coupled to the external interface and the at least one memory and configured to:
receive, via the external interface, a positioning message for the UE from a first entity, the positioning message indicating a time T at which a location for the UE is to be measured; and
send, via the external interface, a request message scheduling location measurements for the UE by a second entity, wherein the request message indicates the time T using a local or global time indication and the location measurements enable the location for the UE to be measured at the time T based on at least one position method.

15. The LMF of claim 14, wherein the at least one processor is configured to include, in the request message, a Coordinated Universal Time (UTC) or a serving gNB local time as the local or global time indication.

16. The LMF of claim 14, wherein the at least one processor is configured to receive the indication of the time T in the positioning message using UTC.

17. The LMF of claim 14, wherein the second entity includes the UE and the at least one position method comprises downlink (DL) Time Difference of Arrival (DL-TDOA), DL Angle of Departure (DL-AOD), Assisted Global Navigation Satellite System (A-GNSS), Wireless Local Area Network (WLAN), Round Trip Time (RTT), multi-cell RTT or some combination of these.

18. The LMF of claim 14, wherein the second entity includes at least one base station and the at least one position method comprises uplink (UL) Time Difference of Arrival (UL-TDOA), UL Angle of Arrival (UL-AOA), Round Trip Time (RTT), multi-cell RTT or some combination of these.

19. The LMF of claim 14, wherein the at least one processor is further configured to send, via the external interface, an assignment message to a serving base station for the UE, wherein the assignment message enables the serving base station to assign a location server associated with the serving base station, wherein the location server receives the location measurements from the second entity and enables the location for the UE to be computed by the location server or by the UE based on the location measurements and the at least one position method.

20. The LMF of claim 19, wherein the at least one processor is further configured to receive, via the external interface, a release message from the serving base station after the location for the UE has been measured at the time T.

21. The LMF of claim 14, wherein, the at least one processor is configured to indicate the time T using the local time and the local time comprises a time local to a serving base station for the UE.

22. The LMF of claim 14, wherein the at least one processor is configured to indicate the time T using the global time and the global time comprises coordinated universal time (UTC).

* * * * *